(12) United States Patent
Huang et al.

(10) Patent No.: US 8,912,820 B2
(45) Date of Patent: Dec. 16, 2014

(54) SYSTEM AND METHOD FOR REDUCING RECONFIGURATION POWER

(75) Inventors: Randy R. Huang, Morgan Hill, CA (US); Martin Voogel, Los Altos, CA (US); Jingcao Hu, Sunnyvale, CA (US); Steven Teig, Menlo Park, CA (US)

(73) Assignee: Tabula, Inc., Mountain View, CA (US)

( * ) Notice: Subject to any disclaimer, the term of this patent is extended or adjusted under 35 U.S.C. 154(b) by 0 days.

(21) Appl. No.: 13/638,934

(22) PCT Filed: Oct. 21, 2010

(86) PCT No.: PCT/US2010/053487
§ 371 (c)(1),
(2), (4) Date: Oct. 1, 2012

(87) PCT Pub. No.: WO2011/123151
PCT Pub. Date: Oct. 6, 2011

(65) Prior Publication Data
US 2013/0021058 A1    Jan. 24, 2013

Related U.S. Application Data

(60) Provisional application No. 61/320,697, filed on Apr. 2, 2010, provisional application No. 61/321,128, filed on Apr. 5, 2010, provisional application No. 61/321,498, filed on Apr. 6, 2010, provisional application No. 61/323,352, filed on Apr. 12, 2010, provisional application No. 61/355,546, filed on Jun. 16, 2010.

(51) Int. Cl.
*H03K 19/173* (2006.01)
*G06F 17/50* (2006.01)
*H03K 19/177* (2006.01)

(52) U.S. Cl.
CPC ........ *G06F 17/5081* (2013.01); *G06F 17/5054* (2013.01); *H03K 19/17756* (2013.01); *H03K 19/17784* (2013.01); *H03K 19/17796* (2013.01); *H03K 19/1737* (2013.01); *G06F 17/50* (2013.01); *G06F 17/5072* (2013.01); *G06F 17/5077* (2013.01); *G06F 2217/78* (2013.01)
USPC .................................. 326/38; 326/41; 326/47

(58) Field of Classification Search
USPC ................................................ 326/37–41.47
See application file for complete search history.

(56) References Cited

U.S. PATENT DOCUMENTS

| | | | |
|---|---|---|---|
| 5,245,575 | A | 9/1993 | Sasaki et al. |
| 5,325,329 | A | 6/1994 | Inoue et al. |

(Continued)

FOREIGN PATENT DOCUMENTS

| | | |
|---|---|---|
| EP | 2201569 | 6/2010 |
| EP | 2553815 | 2/2013 |

(Continued)

OTHER PUBLICATIONS

International Search Report for PCT/US2010/053487, Feb. 1, 2011 (mailing date), Tabula, Inc.

(Continued)

*Primary Examiner* — Jason M Crawford
(74) *Attorney, Agent, or Firm* — Adeli LLP

(57) ABSTRACT

A system and method for reducing power consumption in a reconfigurable integrated circuit. Some embodiments provide placement and routing programs that reduce the number of bits to be reconfigured. Some embodiments provide placement and routing programs that increase the number of groups of circuits that do not need reconfiguration at some times. Some embodiments include circuits that selectively block reconfiguration.

25 Claims, 32 Drawing Sheets

(56) References Cited

U.S. PATENT DOCUMENTS

| | | |
|---|---|---|
| 5,426,378 A | 6/1995 | Ong |
| 5,452,239 A | 9/1995 | Dai et al. |
| 5,596,743 A | 1/1997 | Bhat et al. |
| 5,600,263 A | 2/1997 | Trimberger et al. |
| 5,610,829 A | 3/1997 | Trimberger |
| 5,629,637 A | 5/1997 | Trimberger et al. |
| 5,640,107 A | 6/1997 | Kruse |
| 5,646,544 A | 7/1997 | Iadanza |
| 5,646,545 A | 7/1997 | Trimberger et al. |
| 5,650,734 A | 7/1997 | Chu et al. |
| 5,692,147 A | 11/1997 | Larsen et al. |
| 5,721,703 A | 2/1998 | Habersetzer et al. |
| 5,737,235 A | 4/1998 | Kean et al. |
| 5,760,602 A | 6/1998 | Tan |
| 5,761,483 A | 6/1998 | Trimberger |
| 5,768,178 A | 6/1998 | McLaury |
| 5,815,726 A | 9/1998 | Cliff |
| 5,847,577 A | 12/1998 | Trimberger |
| 5,914,906 A | 6/1999 | Iadanza et al. |
| 5,982,655 A | 11/1999 | Doyle |
| 6,020,758 A | 2/2000 | Patel et al. |
| 6,044,031 A | 3/2000 | Iadanza et al. |
| 6,049,222 A | 4/2000 | Lawman |
| 6,069,489 A | 5/2000 | Iwanczuk et al. |
| 6,075,745 A | 6/2000 | Gould et al. |
| 6,086,631 A | 7/2000 | Chaudhary et al. |
| 6,091,263 A | 7/2000 | New et al. |
| 6,118,707 A | 9/2000 | Gould et al. |
| 6,130,854 A | 10/2000 | Gould et al. |
| 6,134,154 A | 10/2000 | Iwaki et al. |
| 6,150,838 A | 11/2000 | Wittig et al. |
| 6,163,168 A | 12/2000 | Nguyen et al. |
| 6,169,416 B1 | 1/2001 | Eaton et al. |
| 6,172,521 B1 | 1/2001 | Motomura |
| 6,173,379 B1 | 1/2001 | Poplingher et al. |
| 6,184,707 B1 | 2/2001 | Norman et al. |
| 6,184,709 B1 | 2/2001 | New |
| 6,204,687 B1 | 3/2001 | Schultz et al. |
| 6,255,849 B1 | 7/2001 | Mohan |
| 6,292,019 B1 | 9/2001 | New et al. |
| 6,381,732 B1 | 4/2002 | Burnham et al. |
| 6,404,224 B1 | 6/2002 | Azegami et al. |
| 6,411,128 B2 | 6/2002 | Maeda |
| 6,430,730 B1 | 8/2002 | Ghatate et al. |
| 6,430,736 B1 | 8/2002 | Levi et al. |
| 6,459,646 B1 | 10/2002 | Yee et al. |
| 6,460,166 B1 | 10/2002 | Reddy et al. |
| 6,480,954 B2 | 11/2002 | Trimberger et al. |
| 6,487,709 B1 | 11/2002 | Keller et al. |
| 6,496,918 B1 | 12/2002 | Dehon et al. |
| 6,515,505 B1 | 2/2003 | Rees |
| 6,515,509 B1 | 2/2003 | Baxter |
| 6,529,040 B1 | 3/2003 | Carberry et al. |
| 6,593,771 B2 | 7/2003 | Bailis et al. |
| 6,603,330 B1 | 8/2003 | Snyder |
| 6,614,703 B2 | 9/2003 | Pitts et al. |
| 6,636,070 B1 | 10/2003 | Altaf |
| 6,650,142 B1 | 11/2003 | Agrawal et al. |
| 6,667,635 B1 | 12/2003 | Pi et al. |
| 6,668,237 B1 | 12/2003 | Guccione et al. |
| 6,711,729 B1 | 3/2004 | McElvain et al. |
| 6,714,041 B1 | 3/2004 | Darling et al. |
| 6,717,436 B2 | 4/2004 | Kress et al. |
| 6,747,478 B2 | 6/2004 | Madurawe |
| 6,768,337 B2 | 7/2004 | Kohno et al. |
| 6,798,240 B1 | 9/2004 | Pedersen |
| 6,810,513 B1 | 10/2004 | Vest |
| 6,829,756 B1 | 12/2004 | Trimberger |
| 6,831,479 B2 | 12/2004 | Lo |
| 6,838,902 B1 | 1/2005 | Elftmann et al. |
| 6,898,776 B1 | 5/2005 | Jacobson et al. |
| 6,920,627 B2 | 7/2005 | Blodget et al. |
| 6,924,663 B2 | 8/2005 | Masui et al. |
| 6,956,399 B1 | 10/2005 | Bauer |
| 6,990,598 B2 | 1/2006 | Sherburne, Jr. |
| 6,992,505 B1 | 1/2006 | Zhou |
| 6,998,872 B1 | 2/2006 | Chirania et al. |
| 7,010,667 B2 | 3/2006 | Vorbach et al. |
| 7,028,281 B1 | 4/2006 | Agrawal et al. |
| 7,064,577 B1 | 6/2006 | Lee |
| 7,075,333 B1 | 7/2006 | Chaudhary et al. |
| 7,084,666 B1 | 8/2006 | Madurawe |
| 7,085,858 B1 | 8/2006 | Fox et al. |
| 7,109,752 B1 | 9/2006 | Schmit et al. |
| 7,112,992 B1 | 9/2006 | Guzman et al. |
| 7,116,131 B1 | 10/2006 | Chirania et al. |
| 7,124,391 B1 | 10/2006 | Patterson |
| 7,126,372 B2 | 10/2006 | Vadi et al. |
| 7,126,373 B1 | 10/2006 | Schmit et al. |
| 7,126,381 B1 * | 10/2006 | Schmit et al. .................. 326/101 |
| 7,129,746 B1 | 10/2006 | Balasubramanian et al. |
| 7,135,886 B2 | 11/2006 | Schlacter |
| 7,136,308 B2 | 11/2006 | Kant et al. |
| 7,138,827 B1 | 11/2006 | Trimberger |
| 7,143,329 B1 | 11/2006 | Trimberger et al. |
| 7,154,299 B2 | 12/2006 | Swami et al. |
| 7,167,025 B1 | 1/2007 | Schmit et al. |
| 7,193,432 B1 | 3/2007 | Schmit et al. |
| 7,193,440 B1 | 3/2007 | Schmit et al. |
| 7,199,608 B1 | 4/2007 | Trimberger |
| 7,203,100 B2 | 4/2007 | Kant et al. |
| 7,212,448 B1 | 5/2007 | Trimberger |
| 7,218,137 B2 | 5/2007 | Vadi et al. |
| 7,224,182 B1 | 5/2007 | Hutchings et al. |
| 7,260,218 B2 | 8/2007 | Réblewski et al. |
| 7,268,586 B1 | 9/2007 | Redgrave |
| 7,295,037 B2 | 11/2007 | Schmit et al. |
| 7,325,179 B2 | 1/2008 | Sasakura |
| 7,328,384 B1 | 2/2008 | Kulkarni et al. |
| 7,330,050 B2 | 2/2008 | Redgrave |
| 7,330,912 B1 | 2/2008 | Fox et al. |
| 7,425,841 B2 | 9/2008 | Schmit et al. |
| 7,439,766 B2 | 10/2008 | Schmit et al. |
| 7,492,187 B2 | 2/2009 | Kamp et al. |
| 7,514,957 B2 | 4/2009 | Schmit et al. |
| 7,525,344 B2 | 4/2009 | Teig et al. |
| 7,529,992 B1 | 5/2009 | Teig et al. |
| 7,532,030 B2 | 5/2009 | Redgrave |
| 7,532,032 B2 | 5/2009 | Schmit et al. |
| 7,570,077 B2 | 8/2009 | Redgrave |
| 7,571,303 B2 | 8/2009 | Smith et al. |
| 7,656,188 B2 | 2/2010 | Teig et al. |
| 7,667,486 B2 | 2/2010 | Schmit et al. |
| 7,669,097 B1 | 2/2010 | Teig et al. |
| 7,694,265 B2 | 4/2010 | Rohe et al. |
| 7,746,111 B1 | 6/2010 | Gaide et al. |
| 7,825,685 B2 | 11/2010 | Chandler et al. |
| 7,825,687 B2 | 11/2010 | Redgrave |
| 7,904,867 B2 | 3/2011 | Burch et al. |
| 7,928,761 B2 | 4/2011 | Voogel et al. |
| 7,948,266 B2 | 5/2011 | Schmit et al. |
| 8,138,789 B2 | 3/2012 | Chandler et al. |
| 8,159,264 B2 | 4/2012 | Redgrave |
| 8,248,101 B2 | 8/2012 | Voogel et al. |
| 8,305,110 B2 | 11/2012 | Schmit et al. |
| 8,324,931 B2 | 12/2012 | Voogel et al. |
| 8,344,755 B2 | 1/2013 | Chandler et al. |
| 8,598,907 B2 | 12/2013 | Chandler et al. |
| 8,698,518 B2 | 4/2014 | Redgrave |
| 2002/0010853 A1 | 1/2002 | Trimberger et al. |
| 2002/0125914 A1 | 9/2002 | Kim |
| 2002/0157071 A1 | 10/2002 | Schiefele et al. |
| 2002/0161568 A1 | 10/2002 | Sample et al. |
| 2002/0169990 A1 | 11/2002 | Sherburne, Jr. |
| 2003/0033584 A1 | 2/2003 | Zaveri et al. |
| 2003/0079192 A1 | 4/2003 | Cheong et al. |
| 2003/0080777 A1 | 5/2003 | Baxter |
| 2003/0122578 A1 | 7/2003 | Masui et al. |
| 2004/0008055 A1 | 1/2004 | Khanna et al. |
| 2004/0098630 A1 | 5/2004 | Masleid |
| 2004/0103265 A1 | 5/2004 | Smith |
| 2004/0113655 A1 | 6/2004 | Curd et al. |
| 2004/0222817 A1 | 11/2004 | Madurawe |
| 2004/0225980 A1 | 11/2004 | Cappelli et al. |

(56) References Cited

U.S. PATENT DOCUMENTS

| | | | |
|---|---|---|---|
| 2005/0110518 | A1 | 5/2005 | Kanno et al. |
| 2005/0128789 | A1 | 6/2005 | Houston |
| 2005/0216671 | A1 | 9/2005 | Rothman et al. |
| 2005/0246520 | A1 | 11/2005 | Vadi et al. |
| 2005/0248364 | A1 | 11/2005 | Vadi et al. |
| 2005/0280449 | A1 | 12/2005 | Kelkar et al. |
| 2006/0010415 | A1 | 1/2006 | Curtin et al. |
| 2006/0095732 | A1 | 5/2006 | Tran et al. |
| 2006/0176075 | A1 | 8/2006 | Or-Bach |
| 2007/0143577 | A1 | 6/2007 | Smith |
| 2007/0214445 | A1 | 9/2007 | DeHon et al. |
| 2008/0061834 | A1 | 3/2008 | Tetsukawa et al. |
| 2008/0127000 | A1 | 5/2008 | Majumder et al. |
| 2008/0272801 | A1 | 11/2008 | Hutchings et al. |
| 2009/0037862 | A1* | 2/2009 | Rohe et al. .......... 716/8 |
| 2010/0199068 | A1 | 8/2010 | Egger et al. |
| 2010/0281448 | A1 | 11/2010 | He |
| 2012/0185809 | A1 | 7/2012 | Kadiyala et al. |
| 2013/0002287 | A1 | 1/2013 | Pedersen et al. |
| 2013/0093460 | A1 | 4/2013 | Voogel et al. |
| 2013/0099819 | A1 | 4/2013 | Schmit et al. |
| 2013/0099821 | A1* | 4/2013 | Huang et al. .......... 326/41 |
| 2013/0104093 | A1* | 4/2013 | Huang et al. .......... 716/120 |
| 2013/0147514 | A1 | 6/2013 | Chandler et al. |
| 2013/0162291 | A1 | 6/2013 | Voogel et al. |
| 2013/0305199 | A1 | 11/2013 | He et al. |

FOREIGN PATENT DOCUMENTS

| | | |
|---|---|---|
| WO | WO 2009/035586 | 3/2009 |
| WO | WO 2011/123151 | 10/2011 |

OTHER PUBLICATIONS

Written Opinion for PCT/US2010/053487, Feb. 1, 2011 (mailing date), Tabula, Inc.

International Preliminary Report on Patentability for PCT/US2010/053487, Oct. 11, 2012 (mailing date), Tabula, Inc.

Portions of prosecution history of U.S. Appl. No. 10/883,486, Aug. 12, 2008, Schmit, Herman, et al.

Portions of prosecution history of U.S. Appl. No. 10/882,946, Sep. 28, 2006, Schmit, Herman, et al.

Portions of prosecution history of U.S. Appl. No. 10/882,839, Sep. 13, 2006, Schmit, Herman, et al.

Portions of prosecution history of U.S. Appl. No. 11/535,058, Jul. 10, 2008, Schmit, Herman, et al.

Portions of prosecution history of U.S. Appl. No. 10/883,051, Sep. 7, 2006, Schmit, Herman, et al.

Portions of prosecution history of U.S. Appl. No. 11/608,790, Sep. 30, 2009, Schmit, Herman, et al.

Portions of prosecution history of U.S. Appl. No. 12/685,673, Apr. 8, 2011, Schmit Herman, et al.

Portions of prosecution history of U.S. Appl. No. 13/083,491 Oct. 10, 2012, Schmit, Herman, et al.

Portions of prosecution history of U.S. Appl. No. 13/621,145, Apr. 15, 2014, Schmit, Herman, et al.

Portions of prosecution history of U.S. Appl. No. 11/082,230, Jul. 27, 2007, Redgrave, Jason.

Portions of prosecution history of U.S. Appl. No. 11/781,224, Dec. 30, 2008, Redgrave, Jason.

Portions of prosecution history of U.S. Appl. No. 11/082,203, Dec. 17, 2007, Redgrave, Jason.

Portions of prosecution history of U.S. Appl. No. 11/963,771, Mar. 20, 2009, Redgrave, Jason.

Portions of prosecution history of U.S. Appl. No. 12/498,356, Sep. 9, 2010, Redgrave, Jason.

Portions of prosecution history of U.S. Appl. No. 12/901,487, Mar. 8, 2012, Redgrave, Jason.

Portions of prosecution history of U.S. Appl. No. 13/424,364, Dec. 9, 2013, Redgrave, Jason.

Portions of prosecution history of U.S. Appl. No. 11/390,973, Mar. 27, 2009, Teig, Steven, et al.

Portions of prosecution history of U.S. Appl. No. 11/391,000, Sep. 29, 2009, Teig, Steven, et al.

Portions of prosecution history of U.S. Appl. No. 12/206,718, Feb. 24, 2011, Voogel, Martin, et al.

Portions of prosecution history of U.S. Appl. No. 13/089,265, Nov. 1, 2012, Voogel, Martin, et al.

Portions of prosecution history of U.S. Appl. No. 13/666,211, Jun. 17, 2014, Tabula, Inc.

Portions of prosecution history of U.S. Appl. No. 12/206,729, Sep. 28, 2010, Chandler, Trevis, et al.

Portions of prosecution history of U.S. Appl. No. 12/897,778, Feb. 7, 2012, Chandler, Trevis, et al.

Portions of prosecution history of U.S. Appl. No. 13/360,646, Jul. 24, 2013, Chandler, Trevis, et al.

Portions of prosecution history of U.S. Appl. No. 12/283,130, Jul. 10, 2012, Voogel, Martin, et al.

Portions of prosecution history of U.S. Appl. No. 12/676,892, Nov. 15, 2012, Chandler, Trevis, et al.

Portions of prosecution history of U.S. Appl. No. 13/679,981, Jun. 17, 2014, Tabula, Inc.

Portions of prosecution history of U.S. Appl. No. 13/540,591, May 16, 2014, Voogel, Martin, et al.

Portions of prosecution history of 13/621,124, Mar. 19, 2013, Huang, Randy R., et al.

Portions of prosecution history of 13/621,125, Jun. 12, 2014, Huang, Randy R., et al.

International Search Report and Written Opinion for PCT/US2008/010526, Dec. 10, 2008, Tabula, Inc.

International Preliminary Report on Patentability for PCT/US2008/010526, Mar. 9, 2010, Tabula, Inc.

Portions of prosecution history of EP 08831209, Jan. 12, 2012, Tabula, Inc.

Portions of prosecution history of EP 10849164, Dec. 4, 2012 (mailing date), Tabula, Inc.

Amerson, R., et al., "Teramac—Configurable Custom Computing," Proceedings of the IEEE Symposium on FPGA's for Custom Computing Machines, Apr. 19-21, 1995, pp. 32-38.

Caspi, E., et al., "Stream Computations Organized for Reconfigurable Execution (SCORE): Introduction and Tutorial," Aug. 25, 2000, pp. 1-31, Version 1.0.

Dehon, A., "DPGA Utilization and Application," Proceedings of the 1996 ACM Fourth International Symposium on Field-Programmable Gate Arrays FPGA, Feb. 11-13, 1996, 7 pages, Monterey, California, USA.

Dehon, A., "Dynamically Programmable Gate Arrays: A Step Toward Increased Computational Density," Proceedings of the Fourth Canadian Workshop on Field-Programmable Devices, May 1996, pp. 47-54.

Enzler, R., et al., "Virtualizing Hardware with Multi-Context Reconfigurable Arrays," Lecture Notes in Computer Science, Sep. 2003, pp. 151-160.

Ghosh, A., et al., "Estimation of Average Switching Activity in Combinational and Sequential Circuits," $29^{TH}$ ACM/IEEE Design Automation Conference, 1992, pp. 253-259, Paper 15.4, IEEE.

Hauser, J., et al., "Garp: A MIPS Processor with a Reconfigurable Coprocessor", FPGAs for Custom Computing Machines, 1997. Proceedings. The 5th Annual IEEE Symposium on FPGA-Based Custom Computing Machines, Apr. 16-18, 1997, pp. 12-21.

Lehn, D.I., et al., "Evaluation of Rapid Context Switching on a CSRC Device," Proceedings of the International Conference on Engineering of Reconfigurable Systems and Algorithms, Jun. 24-27, 2002, 7 pages.

Lin, J.Y., et al., "Placement-Driven Technology Mapping for LUT-Based FPGAs," FPGA '03, Feb. 23-25, 2003, pp. 121-126, ACM, Monterey, California, USA.

Markovskiy, Y., et al., "Analysis of Quasi-Static Scheduling Techniques in a Virtualized Reconfigurable Machine," FPGA '02, Feb. 24-26, 2002, 10 pages, ACM, Monterey, California, USA.

Nelson, B.E., "Reconfigurable Computing: An Introduction and Overview," Sep. 23, 1998, pp. 1-43.

(56) References Cited

OTHER PUBLICATIONS

Niedzielski, D., "An Overview of Reconfigurable Computing," NPL Date Unknown, 26 slides.

Scalera, S., et al., "The Design and Implementation of a Context Switching FPGA", FPGAs for Custom Computing Machines, 1998. Proceedings. IEEE Symposium on FPGAs for Custom Computing Machines, Apr. 15-17, 1998, pp. 78-85.

Scalera, S.M., et al., "A Mathematical Benefit Analysis of Context Switching Reconfigurable Computing," Proceedings of the $5^{th}$ Reconfigurable Architectures Workshop (RAW), Mar. 30, 1998, vol. 1388 of Lecture Notes in Computer Science, pp. 73-78.

Schaumont, P., et al., "A Quick Safari Through the Reconfiguration Jungle," $38^{th}$ Design Automation Conference, Jun. 2001, 7 pages, Las Vegas, Nevada, USA.

Schmit, H., "Incremental Reconfiguration for Pipelined Applications," Proceedings of the $5^{th}$ IEEE Symposium on FPGA-Based Custom Computing Machines, Apr. 16-18, 1997, 9 pages.

Schmit, H., et al., "FPGA Switch Block Layout and Evaluation," FPGA '02, Feb. 24-26, 2002, 8 pages, ACM, Monterey, California, USA.

Schmit, H., et al., "Queue Machines: Hardware Compilation in Hardware," Proceedings of the $10^{th}$ Annual IEEE Symposium on Field-Programmable Custom Computing Machines, Apr. 22-24, 2002, 9 pages.

Slade, A.L., et al., "Reconfigurable Computing Application Frameworks," $11^{th}$ Annual IEEE Symposium on Field-Programmable Custom Computer Machines, Apr. 9-11, 2003, 10 pages.

Tau, E., et al., "A First Generation DPGA Implementation," Proceedings of the Third Canadian Workshop on Field-Programmable Devices, May 1995, pp. 138-143.

Tau, E., et al., "Transit Note #114: A First Generation DPGA Implementation," M.I.T. Transit Project, Jan. 1995, pp. 1-8.

Taylor, R., et al., "Enabling Energy Efficiency in Via-Patterned Gate Array Devices", Proceedings of the $41^{st}$ annual conference on Design automation, Jun. 7-11, 2004, 4 pages, San Diego, California, USA.

Vuillemin, J., et al., "Programmable Active Memories: Reconfigurable Systems Come of Age," Very Large Scale Integration (VLSI) Systems, IEEE Transactions on vol. 4, Issue 1, Mar. 1996, 15 pages.

\* cited by examiner

B AND C
1110

| 1112 | 1114 | 1116 | 1118 |
| --- | --- | --- | --- |
| A | B | C | Output |
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

Subcycle 1

B AND C
1120

| 1122 | 1124 | 1126 | 1128 |
| --- | --- | --- | --- |
| A | B | C | Output |
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

Subcycle 2

*Figure 11*

B AND C
1210

| 1212 | 1214 | 1216 | 1218 |   |
| --- | --- | --- | --- | --- |
| A | B | C | Output |   |
| 0 | 0 | 0 | 0 |   |
| 0 | 0 | 1 | 0 | 1232 |
| 0 | 1 | 0 | 0 | 1234 |
| 0 | 1 | 1 | 1 |   |
| 1 | 0 | 0 | 0 |   |
| 1 | 0 | 1 | 0 | 1236 |
| 1 | 1 | 0 | 0 | 1238 |
| 1 | 1 | 1 | 1 |   |

Subcycle 1

B OR C
1220

| 1222 | 1224 | 1226 | 1228 |   |
| --- | --- | --- | --- | --- |
| A | B | C | Output |   |
| 0 | 0 | 0 | 0 |   |
| 0 | 0 | 1 | 1 | 1242 |
| 0 | 1 | 0 | 1 | 1244 |
| 0 | 1 | 1 | 1 |   |
| 1 | 0 | 0 | 0 |   |
| 1 | 0 | 1 | 1 | 1246 |
| 1 | 1 | 0 | 1 | 1248 |
| 1 | 1 | 1 | 1 |   |

Subcycle 2

*Figure 12*

B AND C
1310

| A | B | C | Output |
|---|---|---|--------|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

Subcycle 1

B NAND C
1320

| A | B | C | Output |
|---|---|---|--------|
| 0 | 0 | 0 | 1 |
| 0 | 0 | 1 | 1 |
| 0 | 1 | 0 | 1 |
| 0 | 1 | 1 | 0 |
| 1 | 0 | 0 | 1 |
| 1 | 0 | 1 | 1 |
| 1 | 1 | 0 | 1 |
| 1 | 1 | 1 | 0 |

Subcycle 2

*Figure 13*

B AND C
1410

| A | B | C | Output |
|---|---|---|--------|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

Subcycle 1

A AND B
1420

| A | B | C | Output |
|---|---|---|--------|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 1 |
| 1 | 1 | 1 | 1 |

Subcycle 2

*Figure 14*

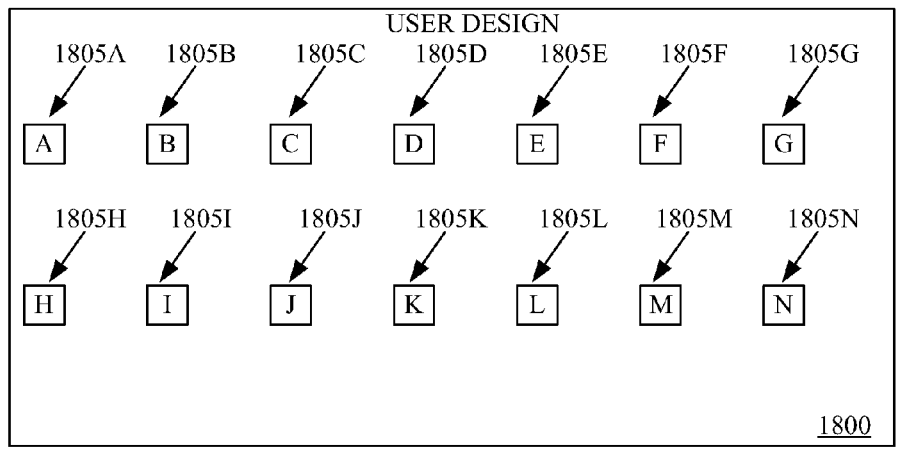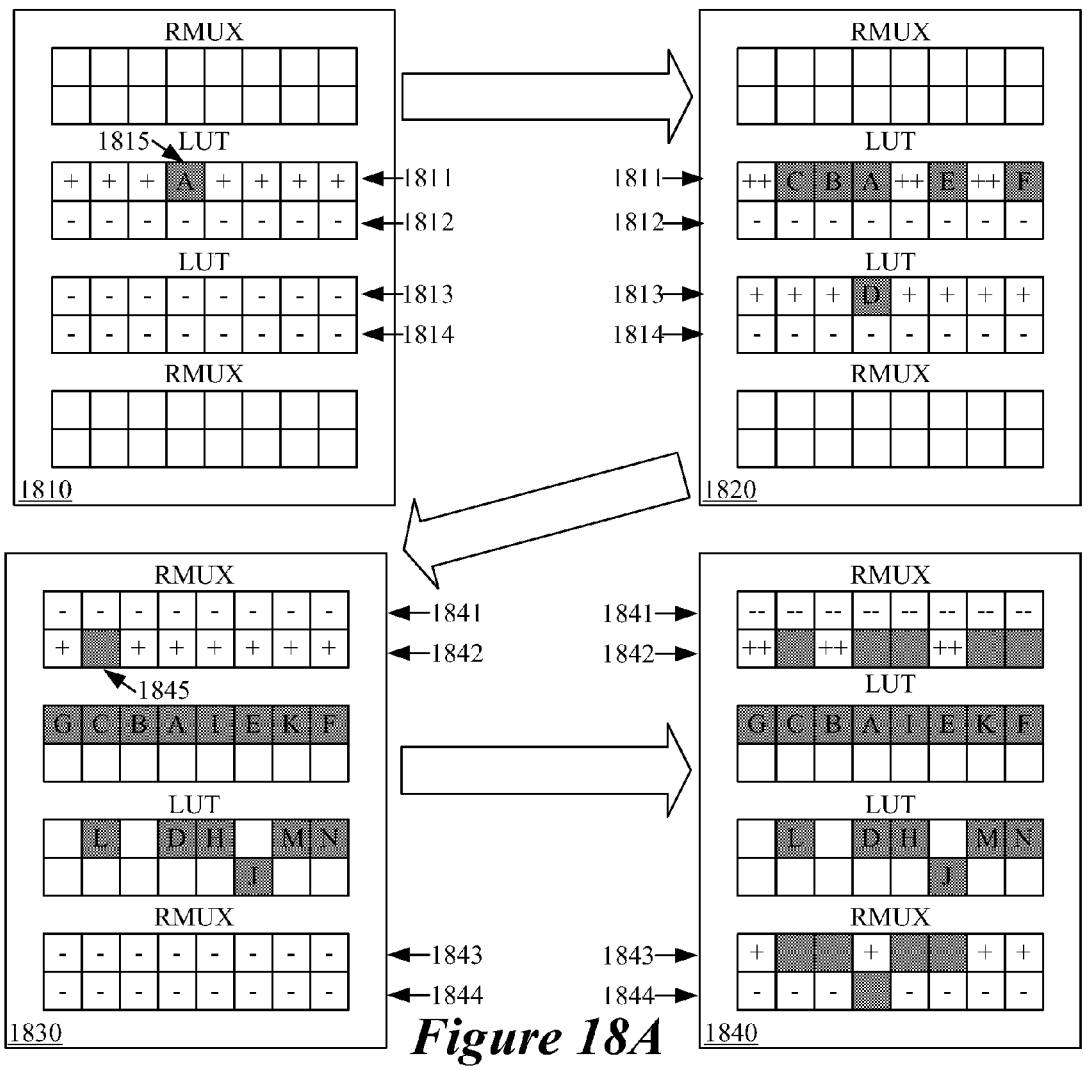
Figure 18A

LUT ROW LAYOUT

| | | | | | | |
|---|---|---|---|---|---|---|
| SC0 | A | B | u | C | u | u |
| SC1 | A | u | D | u | u | u |
| SC2 | u | u | u | u | u | u |
| SC3 | F | F | F | F | F | F |

2410

CONFIGURATION DATA STORED IN CONFIGURATION STORAGE CELLS DURING RUNTIME

| | | | | | | |
|---|---|---|---|---|---|---|
| SC0 | A | B | u | C | u | u |
| SC1 | A | u | D | u | u | u |
| SC2 | u | u | u | u | u | u |
| SC3 | F | F | F | F | F | F |

2420

CONFIGURATION DATA PRESENTED TO LUTS DURING RUNTIME

| | | | | | | |
|---|---|---|---|---|---|---|
| SC0 | A | B | u | C | u | u |
| SC1 | A | u | D | u | u | u |
| SC2 | A | u | D | u | u | u |
| SC3 | F | F | F | F | F | F |

2430

SELECT LINE TIMING DIAGRAM

LUT ROW LAYOUT

|     |      |      |      |      |      |      |
|-----|------|------|------|------|------|------|
| SC0 | A    | B    | u->D | C    | u->F | u->F |
| SC1 | A    | u->B | D    | u->C | u->F | u->F |
| SC2 | u->A | u->B | u->D | u->C | u->F | u->F |
| SC3 | F    | F    | F    | F    | F    | F    |

2510

CONFIGURATION DATA STORED IN CONFIGURATION STORAGE CELLS DURING RUNTIME

| SC0 | A | B | D | C | F | F |
|-----|---|---|---|---|---|---|
| SC1 | u | u | u | u | u | u |
| SC2 | u | u | u | u | u | u |
| SC3 | F | F | F | F | F | F |

2520

CONFIGURATION DATA PRESENTED TO LUTS DURING RUNTIME

| SC0 | A | B | D | C | F | F |
|-----|---|---|---|---|---|---|
| SC1 | A | B | D | C | F | F |
| SC2 | A | B | D | C | F | F |

| SC3 | F | F | F | F | F | F |
|-----|---|---|---|---|---|---|

2530

SELECT LINE TIMING DIAGRAM

|      | SC0 | SC1 | SC2 | SC3 |
|------|-----|-----|-----|-----|
| SEL0 | on  | on  | on  | off |
| SEL1 | off | off | off | off |
| SEL2 | off | off | off | off |
| SEL3 | off | off | off | on  |

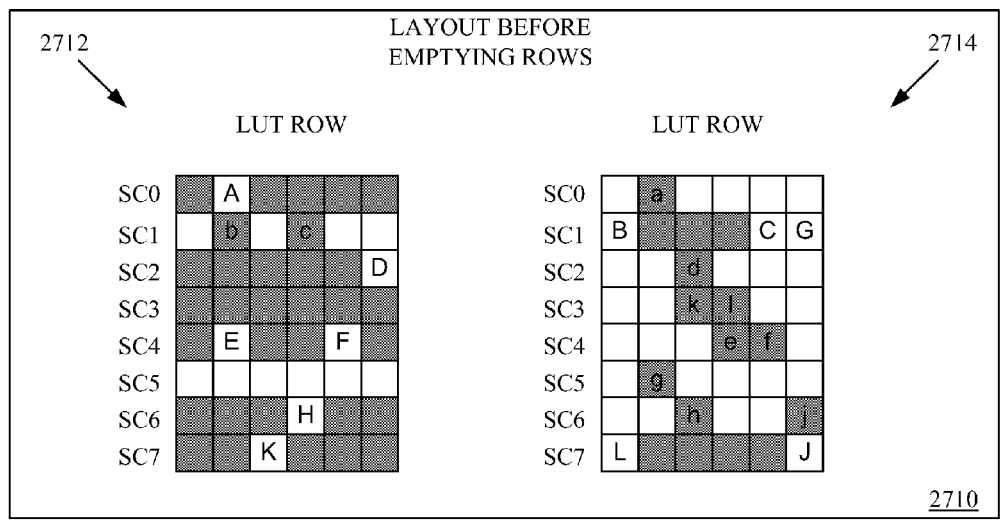
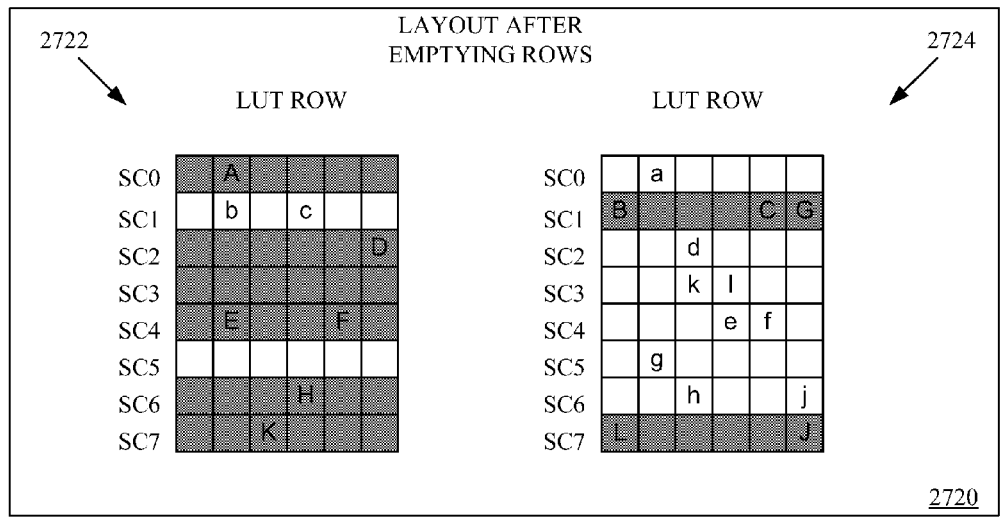
Figure 27

SYSTEM AND METHOD FOR REDUCING RECONFIGURATION POWER

CLAIM OF BENEFIT TO PRIOR APPLICATIONS

This Application is a national stage application of PCT Patent Application PCT/US2010/053487, entitled "System and Method for Reducing Reconfiguration Power Usage" filed Oct. 21, 2010, now published as WO 2011/123151. PCT Patent Application PCT/US2010/053487 claims the benefit of U.S. Provisional Patent Application 61/320,697, entitled "System and Method for Reducing Reconfiguration Power Usage," filed Apr. 2, 2010; U.S. Provisional Patent Application 61/321,128, entitled "System and Method for Reducing Reconfiguration Power Usage," filed Apr. 5, 2010; U.S. Provisional Patent Application 61/321,498, entitled "System and Method for Reducing Reconfiguration Power Usage," filed Apr. 6, 2010; U.S. Provisional Patent Application 61/323,352, entitled "System and Method for Reducing Reconfiguration Power Usage," filed Apr. 12, 2010; and U.S. Provisional Patent Application 61/355,546, entitled "System and Method for Reducing Reconfiguration Power Usage," filed Jun. 16, 2010. U.S. Provisional Patent Applications 61/320,697, 61/321,128, 61/321,498, 61/323,352, 61/355,546 and PCT Patent Application PCT/US2010/053487, published as WO 2011/123151, are incorporated herein by reference.

FIELD OF THE INVENTION

The present invention is directed towards placement and routing of configurations of reconfigurable circuits to optimize power savings.

BACKGROUND

The use of configurable integrated circuits ("ICs") has dramatically increased in recent years. One example of a configurable IC is a field programmable gate array ("FPGA"). An FPGA is a field programmable IC that often has logic circuits, interconnect circuits, and input/output ("I/O") circuits. The logic circuits (also called logic blocks) are typically arranged as an internal array of repeated arrangements of circuits. These logic circuits are typically connected together through numerous interconnect circuits (also called interconnects). The logic and interconnect circuits are often surrounded by the I/O circuits.

FIG. 1 illustrates an example of a configurable logic circuit 100. This logic circuit can be configured to perform a number of different functions. As shown in FIG. 1, the logic circuit 100 receives a set of input data 105 and a set of configuration data 110. The configuration data set is stored in a set of SRAM cells 115. From the set of functions that the logic circuit 100 can perform, the configuration data set specifies a particular function that this circuit has to perform on the input data set. Once the logic circuit performs its function on the input data set, it provides the output of this function on a set of output lines 120. The logic circuit 100 is said to be configurable, as the configuration data set "configures" the logic circuit to perform a particular function, and this configuration data set can be modified by writing new data in the SRAM cells. Multiplexers and look-up tables are two examples of configurable logic circuits.

FIG. 2 illustrates an example of a configurable interconnect circuit 200. This interconnect circuit 200 connects a set of input data 205 to a set of output data 210. This circuit receives configuration data 215 that are stored in a set of SRAM cells 220. The configuration data specify how the interconnect circuit should connect the input data set to the output data set. The interconnect circuit 200 is said to be configurable, as the configuration data set "configures" the interconnect circuit to use a particular connection scheme that connects the input data set to the output data set in a desired manner. Moreover, this configuration data set can be modified by writing new data in the SRAM cells. Multiplexers are one example of interconnect circuits.

In some configurable ICs, configurable interconnect and configurable logic circuits are arranged in an array with multiple configurable interconnects and/or multiple configurable logic circuits in a given section of the array. These sections can draw power even when some of the configurable circuits in the section are not in use. These sections draw even larger amounts of power when they are being reconfigured; therefore there is a use for methods and systems that reduce the amount of power drawn by these reconfiguring circuits.

SUMMARY OF THE INVENTION

Some embodiments provide an integrated circuit ("IC") that has configurable circuits and implements a user designed circuit ("user design") using those configurable circuits. The sets of configurations that cause the IC to implement the user design are determined in some embodiments by a placement and routing process. The placement and routing process generates a layout. The layout is used (during the runtime of the IC) to set configuration values that implement the user design. The configurable circuits of some embodiments include circuits that are reconfigurable circuits that are reconfigured cyclically. The ICs of some such embodiments implement the user design at one frequency of operations, but reconfigure the reconfigurable circuits at a higher frequency of operations. That is, the reconfiguration cycles of such ICs are implemented in multiple sub-cycles in one user design cycle. Thus, in each clock period of the user design, the integrated circuit runs multiple configurations in different reconfiguration cycles.

In the ICs of some embodiments, configuration cells store the configuration values that set the configurations of the reconfigurable circuits. In such embodiments, a reconfigurable circuit is initially connected to one set of configuration cells. The reconfigurable circuit is reconfigured when the reconfigurable circuit's connection to one set of configuration cells is terminated and a connection between the reconfigurable circuit and another set of configuration cells is established (e.g., by a "select driver" as described below).

During the operation of the IC of some embodiments, when a reconfigurable circuit switches from one configuration cell to another configuration cell, the act of switching consumes energy. Even switching between two configuration cells that both have the same configuration value consumes some amount of energy. Switching between configuration cells with different configuration values (sometimes called "toggling") consumes more energy than switching between configuration cells that store the same value. Accordingly, reducing the amount of toggling performed during the operation of an IC results in reducing the energy consumption. The amount of toggling performed during the operation of the IC depends on the number of times the configuration values of the reconfigurable circuits in the IC change from one reconfiguration cycle to the next reconfiguration cycle.

As mentioned above, the layout for the IC determines the configuration values in each reconfiguration cycle. A layout can include a different set of configuration values for a given reconfigurable circuit in adjacent reconfiguration cycles. A layout can also include the same set of configuration values for a given reconfigurable circuit in adjacent reconfiguration cycles. Therefore, the layout determines how many times each configuration value will toggle during the implementation of the user design on the IC. Placement and routing processes (performed by programs) generate layouts in some embodiments. Accordingly, to reduce energy consumption during operation of the IC, some embodiments provide placement and routing programs that design layouts that reduce the amount of toggling performed during operation of the IC.

The reconfigurable circuits of some embodiments are grouped into sets of reconfigurable circuits called "rows". The rows of some embodiments each contain multiple reconfigurable circuits (although the reconfigurable circuits in the rows of some embodiments may not be physically aligned with each other). Each of the reconfigurable circuits in a row is selectably connected to multiple sets of configuration cells.

"Select drivers" of the ICs of some embodiments determine which of the multiple sets of configuration cells will provide configuration values to each reconfigurable circuit in a row. Each select driver is associated with a particular row of reconfigurable circuits in some embodiments. A particular select driver includes select lines for sending configuration signals to all the reconfigurable circuits in its associated row at the same time. In a given reconfiguration cycle, each of the select drivers of some such embodiments provide a configuration signal that causes one of the multiple different sets of configuration cells of each reconfigurable circuit to communicatively connect to the reconfigurable circuit. In some embodiments, each select driver changes the active select line in each reconfiguration cycle (e.g., each sub-cycle of a user design clock cycle).

As previously mentioned, switching from one set of configuration cells to another set of configuration cells consumes energy. For example, in embodiments that provide ICs with select drivers, changing the active select line from one set of configuration cells to another consumes energy. In fact, such a change of active select lines consumes energy even when all the configuration cells in the first set of configuration cells store the same configuration values as the corresponding configuration cells in the second set of configuration cells (i.e., when no configuration values toggle). Therefore, energy can be saved by not changing the active select line. Accordingly, the ICs of some embodiments contain gating circuits that selectively prevent select drivers from changing the active select line in some reconfiguration cycles. Selectively preventing a select driver from changing the active select line is sometimes referred to as "gating the select driver", "gating a reconfiguration signal", or "clock gating".

When a gating circuit permits a select driver to change the active select line from one reconfiguration cycle to the next reconfiguration cycle, the reconfigurable circuits in the row associated with that select driver are communicatively connected to a different set of configuration cells in each reconfiguration cycle. However, when a gating circuit prevents a select driver from changing the active select line from one reconfiguration cycle to the next reconfiguration cycle, the reconfigurable circuits in the row associated with that select driver are communicatively connected to the same set of configuration cells in both reconfiguration cycles. Therefore, gating the select driver of a row causes all of the reconfigurable circuits in that row to have the same configuration in both of the reconfiguration cycles. The gating circuits of some embodiments can gate a select driver in multiple sequential reconfiguration cycles. In such embodiments, gating the select driver of a row for multiple reconfiguration cycles causes all of the reconfigurable circuits in that row to have the same configuration in all of those multiple sequential reconfiguration cycles.

As previously mentioned, the ICs of some embodiments are used to implement user designs. The user designs are implemented by setting particular configuration values for various reconfigurable circuits of the IC in particular reconfiguration cycles. If implementing the user design requires a change in the configuration of at least one reconfigurable circuit in a row during a given reconfiguration cycle, then gating the select driver during that reconfiguration cycle would prevent the implementation of the user design. Therefore, the methods of some embodiments gate the select driver of a row if the user design can be implemented without changing the configuration of that row during that reconfiguration cycle but do not gate the select driver in reconfiguration cycles in which any circuit driven by that select driver requires reconfiguration.

In some embodiments, there are at least three conditions in which the user design can be implemented without changing the configuration of any reconfigurable circuit in a particular set of sequential reconfiguration cycles. The first condition is when the output values of all the configurable circuits in that row are irrelevant (e.g., the configuration is a "don't care" configuration) to the operation of the user design during that reconfiguration cycle. The second condition is when the same set of configurations is required for all reconfigurable circuits in a row in sequential reconfiguration cycles. The third condition is when all the configurations of the reconfigurable circuits in the row are either don't care or required to be the same in sequential reconfiguration cycles. When any of these three conditions are met, the row is "empty" for that reconfiguration cycle and a select driver for the "empty" row can be gated without disrupting the implementation of the user design. The term "empty row", as used herein, sometimes refers to a row for which no reconfiguration is necessary (in a particular reconfiguration cycle) in order for the IC to implement the user design. For brevity, the term "empty row" is used when referring to the row and the particular reconfiguration cycle in which the row does not need to be reconfigured. However, one of ordinary skill in the art will understand that the reconfigurable circuits that make up an "empty row" (in a particular reconfiguration cycle) may be reconfigured (i.e., the same reconfigurable circuits provide non-empty rows) in other reconfiguration cycles.

It is possible for the placement and routing processes of the computer programs of some embodiments to incidentally generate empty rows in the course of generating a layout of some embodiments. In some embodiments, such processes are "aware" of (i.e., contain data identifying) which reconfigurable circuits are in which rows of the IC. Therefore, the placement and routing process of such embodiments can identify the empty rows. Such a placement and routing process configures the gating circuits of such embodiments to block the reconfiguration signal in the reconfiguration cycles in which the rows are empty.

In addition to the incidental occurrence of empty rows, empty rows can also be deliberately produced by placement and routing processes of some embodiments. That is, some embodiments provide placement and routing processes that are designed to increase the number of empty rows when generating a layout to implement a user design on an IC. The placement and routing processes of some embodiments place configuration values for the configurable circuits in a layout based on a cost system that takes various factors into account. The placement and routing processes of some embodiments increase the cost of placing a configuration that will result in any reconfigurable circuit in a row requiring reconfiguration from one reconfiguration cycle to a subsequent reconfiguration cycle. Similarly, placement and routing processes in some embodiments decrease the cost of placing a configuration that will not result in reconfiguration (of any reconfigurable circuit in a row) from one reconfiguration cycle to a subsequent reconfiguration cycle.

Some embodiments provide a post-placement and routing process that increases the number of empty rows, either as a supplement to, or instead of an initial placement and routing process (such as the placement and routing process described above) that increases the number of empty rows (i.e., rows in which no circuit requires reconfiguration in one or more sequential reconfiguration cycles). Such post-placement and routing processes modify an existing layout in order to increase the number of empty rows. Regardless of whether empty rows are generated in an initial placement and routing process or in a post-placement and routing process, the empty rows allow the gating of reconfiguration signals without disrupting the implementation of the user design.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for the purpose of explanation, several embodiments of the invention are set forth in the following figures.

FIG. 11 illustrates configurations of a reconfigurable LUT maintaining the same configuration from one sub-cycle to the next.
FIG. 12 illustrates configurations of a reconfigurable LUT that reconfigures from an AND-gate to an OR-gate.
FIG. 13 illustrates configurations of a reconfigurable LUT that reconfigures from an AND-gate to a NAND-gate.
FIG. 14 illustrates configurations of a reconfigurable LUT that reconfigures from an AND-gate to an AND-gate acting on different inputs of the LUT.
FIGS. 18A and 18B illustrate increasing the cost of reconfiguring in an empty row.
FIG. 24 illustrates gating of a reconfiguration signal of a reconfigurable circuit without filling in unused configurations in the layout.
FIG. 25 illustrates gating of a reconfiguration signal of a reconfigurable circuit after filling in unused configurations in the layout.
FIG. 27 conceptually illustrates post-processing moving of configurations to unconfigured tiles.

DETAILED DESCRIPTION

Figure 1:
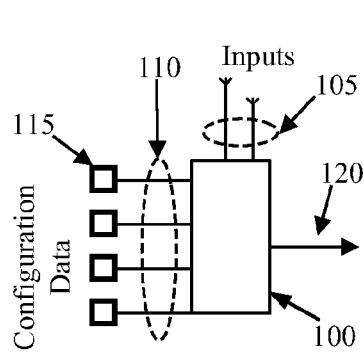
FIG. 1 illustrates an example of a configurable logic circuit.
Figure 2:
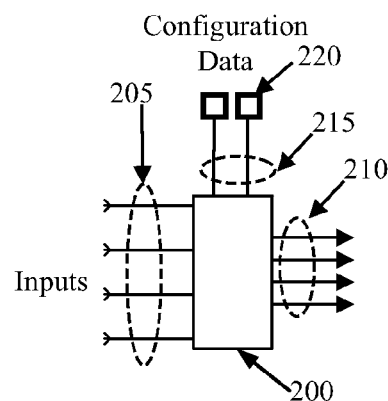
FIG. 2 illustrates an example of a configurable interconnect circuit.

In the following description, numerous details are set forth for purpose of explanation. However, one of ordinary skill in the art will realize that the invention may be practiced without the use of these specific details. For instance, not all embodiments of the invention need to be practiced with the specific number of bits and/or specific devices (e.g., multiplexers) referred to below. In other instances, well-known structures and devices are shown in block diagram form in order not to obscure the description of the invention with unnecessary detail.

I. Overview

Some embodiments provide an integrated circuit ("IC") that implements a user designed circuit ("user design") using configurable circuits. The sets of configurations that cause the IC to implement the user design are determined in some embodiments by a placement and routing process. The placement and routing process generates a layout for an IC by "placing" configurations that are used to implement the user design on available configurable circuits in a simulation of the IC. When a configuration has been "placed" in a configurable circuit in the layout, that circuit is no longer available. The routing process then routes connections between the circuits in which the configurations have been "placed". The layout is used (during the runtime of the IC) to set configuration values that implement the user design. The IC of some embodiments includes circuits that are reconfigured multiple times during the runtime of the IC. During the runtime of the IC, the IC reconfigures such circuits at a reconfiguration frequency, providing a new configuration for each reconfigurable circuit as often as once per reconfiguration cycle. The placement and routing process of such embodiments can "place" different configurations on the same reconfigurable circuit in different reconfiguration cycles. The reconfigurable circuits of some such embodiments are reconfigured cyclically. The IC uses such reconfigurable circuits to implement the user design at a lower frequency of operations than the reconfiguration frequency. Thus, in each clock period of the user design (sometimes called a "cycle" or a "user clock cycle"), the IC runs multiple reconfiguration cycles (sometimes called "sub-cycles").

The reconfigurable circuits of some embodiments are configured using configuration values stored in sets of configuration cells. Each set of configuration cells stores a configuration for one reconfigurable circuit. The reconfigurable circuits of such embodiments are selectively connected to the sets of configuration cells. In any given sub-cycle, each reconfigurable circuit is communicatively connected to one set of configuration cells out of multiple sets of configuration cells associated with that reconfigurable circuit. A reconfigurable circuit is reconfigured when its connection to one set of configuration cells is terminated and a connection with another set of configuration cells is established. Terminating one such connection and establishing another is sometimes referred to as switching between configuration cells.

The reconfigurable circuits of some embodiments are communicatively connected to a different set of configuration cells in each different sub-cycle in a given user clock cycle. For example, the reconfigurable circuit of some embodiments is communicatively connected to one set of configuration cells in a first sub-cycle, communicatively connected to a second set of configuration cells in a second sub-cycle, and so on. In other embodiments, a reconfigurable circuit may be communicatively connected to one set of configuration cells in more than one sub-cycle in a given user clock cycle.

During the runtime of a reconfigurable IC, switching from a configuration cell that stores one value to a configuration cell that stores a different value consumes more energy than switching between configuration cells that store the same value. Accordingly, the placement and routing programs of some embodiments are designed to reduce the number of times that configuration bits switch from one value to a different value in the course of reconfiguring the IC. A reduced number of configuration bit changes from one sub-cycle to the next in the layout results in reduced energy consumption when the layout is implemented on the IC. Accordingly, the placement and routing processes of some embodiments account for whether adding a configuration to a reconfigurable circuit (e.g., a configurable look-up table (LUT)) in a given sub-cycle will entail flipping a configuration bit (also called "toggling the configuration value"). Such placement and routing processes reduce the numbers of configuration bits that flip from one sub-cycle to the next by placing similar configurations in adjacent sub-cycles. In some embodiments, the placement and routing processes lower the "cost" of placing similar configurations or increase the cost of placing dissimilar configurations.

Select drivers in some embodiments reconfigure the reconfigurable circuits. Such select drivers reconfigure the circuits by providing configuration signals that cause different sets of configuration cells to communicatively connect to a particular configurable circuit. Individual select drivers in some embodiments provide reconfiguration signals for ("drive") multiple reconfigurable circuits. The multiple reconfigurable circuits driven by a given select driver are aligned in a row on a tile of the IC of some embodiments. Accordingly, a group of reconfigurable circuits driven by a given select driver are sometimes referred to herein as a "row" of circuits. Although some embodiments provide individual select drivers that drive the configurations of multiple physically aligned reconfigurable circuits, one of ordinary skill in the art will understand that other embodiments provide select drivers that drive multiple reconfigurable circuits that are not physically aligned. Accordingly, the term "row" as used herein refers to any set of reconfigurable circuits driven by a common select driver, not just reconfigurable circuits that are both driven by a common select driver and physically aligned.

Select drivers in some embodiments ordinarily reconfigure their associated rows (change the active select lines for the rows) in each sub-cycle. However, changing from one active select line to another active select line consumes energy. For example, energy can be consumed to turn one select line on and another select line off (e.g., by changing the voltages of the select lines). Therefore, the ICs of some embodiments contain circuits that selectively prevent a select driver from changing the active select line in some sub-cycles. When the active select line is unchanged, the reconfigurable circuits of some embodiments are communicatively connected to the same set of configuration cells for multiple sub-cycles. Accordingly, blocking the reconfiguration keeps the configuration of the reconfigurable circuit the same from one sub-cycle to the next. Preventing a configuration signal from changing is sometimes referred to as "clock gating", "gating the select driver", "reconfiguration signal gating", or simply "gating". Circuits that selectively stop the reconfiguration of reconfigurable circuits are sometimes referred to herein as "gating circuits".

Gating is appropriate only under certain conditions. Gating a select driver causes the reconfigurable circuits driven by that select driver to maintain the same active configuration from one sub-cycle to the next. The active configuration of a reconfigurable circuit affects the output value of that reconfigurable circuit. Providing the wrong active configuration can result in a wrong output value. In some cases, the configuration determined by the layout for one sub-cycle may not be the same as the configuration determined by the layout in the following sub-cycle. Accordingly, if the layout for implementing the user design requires that a reconfigurable circuit has different configurations in two consecutive sub-cycles, then keeping the same configuration (for that reconfigurable circuit) from one sub-cycle to the next could cause the reconfigurable circuit to produce the wrong output. Therefore, the gating circuits of some embodiments block reconfigurations (changes of the select lines of a particular select driver) only in sub-cycles in which no circuit driven by that select driver requires reconfiguration. Rows that have sub-cycles in which no circuit in that row needs to be reconfigured are sometimes called "empty rows".

Rows can be "empty" under various different conditions, as described below. One way for a row to be empty is if all the reconfigurable circuits in the row are unused in a particular sub-cycle. As mentioned above, the placement and routing processes "place" configurations that are used to implement the user design. The configurations are "placed" on the reconfigurable circuits in available sub-cycles. The placement and routing processes define the configuration for the reconfigurable circuit in that sub-cycle. When a reconfigurable circuit has not had a configuration defined for it in a given sub-cycle, the "configuration" of the reconfigurable circuit in that sub-cycle is not used to implement the user design and is sometimes called a "don't care" or "logical don't care" configuration. The configurations are called "don't care" because the operations of the user design don't "care" about the configuration of that circuit in that sub-cycle (i.e., the results of the overall user design are not affected by the output of that circuit in that sub-cycle). A row is considered empty when all reconfigurable circuits in the row have "don't care" configurations.

Rows of some embodiments are also considered "empty rows" (in a particular reconfiguration cycle) when some or all of the configurable circuits in that row are "matching" configurations (in consecutive reconfiguration cycles). In some embodiments, when two configurations are "matching" configurations, the reconfigurable circuits of the row have the same configuration values in the same relative positions in two or more consecutive reconfiguration cycles. That is, in order to implement the user design, the reconfigurable circuits of a row use the same (matching) configurations from one reconfiguration cycle to the next.

In addition to "empty rows" that are all "don't care" configurations or all matching configurations, rows in some embodiments are considered "empty rows" (in a later reconfigurable cycle of two or more consecutive reconfiguration cycles) when some of the configurations for the row are matching and the rest of the configurations are "don't care" in one or the other (or both) of two consecutive reconfiguration cycles. In some embodiments described herein, a row of some embodiments is described as an "empty row" if it is "empty" in at least one sub-cycle, although a particular "empty" row might or might not be empty in all sub-cycles.

Some embodiments provide placement and routing processes that identify empty rows (e.g., rows with all "don't care" configurations or a mixture of "don't care" and matching configurations) and defines (in the layout) configuration values that cause the gating circuits to gate the select driver of those rows (i.e., prevent reconfiguration of the rows in the sub-cycles in which the rows are empty). The ICs of such embodiments implement the configurations in the layout and gate the reconfiguration signals of the designated select drivers in the designated sub-cycles. The reconfigurable circuits during a sub-cycle that correspond to an empty row can simply maintain the previous configuration (without affecting the user design), because the user design "doesn't care" about the configuration of any of the reconfigurable circuits in the row. Alternately, the reconfigurable circuits during a sub-cycle that correspond to an empty row can simply maintain the previous configuration (without affecting the user design), because the configurations of the reconfigurable circuits in the row are supposed to be the same in both sub-cycles. Similarly, the reconfigurable circuits during a sub-cycle that correspond to an empty row can simply maintain the previous configuration (without affecting the user design), because some configurations are "don't care" and some are matching configurations.

In addition to identifying empty rows, the placement and routing processes of some embodiments are designed to increase the number of rows that are empty in various sub-cycles. That is, the placement and routing processes arrange (or rearrange) the configurations in the layout to increase the number of empty rows. In addition to or instead of a placement and routing process that increases the number of empty rows, some embodiments provide a post-placement and routing process that (further) changes the layout to increase the number of empty TOWS.

For the unused (don't care) sub-cycles of rows of reconfigurable circuits of some embodiments, the placement and routing processes define configurations in the layout for at least some reconfigurable circuits in order to make the configurations of the reconfigurable circuits in that sub-cycle match the configurations of the same reconfigurable circuits in a previous or later sub-cycle. These configurations of the reconfigurable circuits are not used to implement the user design in the particular sub-cycles in which the user design "doesn't care" about the output of the reconfigurable circuits. Instead, these configurations are provided to allow gating of the reconfigurations in order to conserve power. Power is conserved because the IC that implements the layout consumes less energy when configuration values for a reconfigurable circuit match from one sub-cycle to the next. That is, when the IC is running, the select driver could activate the next set of configuration cells, but because the configurations have been made identical in both sub-cycles, the reconfiguration is unnecessary and can be gated.

The description herein often refers to sub-cycles, however one of ordinary skill in the art will understand that the inventions described with respect to sub-cycles can be used with other reconfiguration cycles that are not sub-cycles. The values stored in the configuration cells may be referred to as "configuration bits" or "configuration data". The configuration data intended to be used in a particular sub-cycle may be referred to as the configuration data "for" that sub-cycle or the configuration data "of" that sub-cycle. Similarly, the configuration cells that are intended to be active during a given sub-cycle are sometimes referred to as the configuration cells "for" or "of" that sub-cycle. However, in some embodiments, each set of configuration cells stores its respective configuration data during all sub-cycles, not just in the sub-cycles in which the configuration data stored in those configuration cells are used.

As mentioned above, some embodiments provide a placement and routing computer program that generates a layout for configuring and reconfiguring the integrated circuit. Such a layout contains a set of configuration bit values for the reconfigurable circuits of the integrated circuit. The layouts of some particular embodiments potentially include different sets of configuration bits for each sub-cycle for a given reconfigurable circuit. However, one of ordinary skill in the art will understand that in such embodiments, the layout does not necessarily have to define configurations for every reconfigurable circuit in every sub-cycle.

The following sections further describe the above concepts. Section II provides descriptions of some examples of the architectures of such ICs. Section III describes some examples of reconfigurable IC architecture. Section IV describes reduction of energy based on reducing the amount of toggling. Section V describes reconfiguration signal gating. Section VI describes placement and routing processes that increase the number of rows that can be gated (in various sub-cycles). Section VII describes electronic systems that use such configurable ICs.

II. Configurable Ic Architecture

An IC is a device that includes numerous electronic components (e.g., transistors, resistors, diodes, etc.) that are embedded typically on the same substrate, such as a single piece of semiconductor wafer. These components are connected with one or more layers of wiring to form multiple circuits, such as Boolean gates, memory cells, arithmetic units, controllers, decoders, etc. An IC is often packaged as a single IC chip in one IC package, although some IC chip packages can include multiple pieces of substrate or wafer.

A configurable IC is an integrated circuit that has configurable circuits. A configurable circuit is a circuit that can "configurably" perform a set of operations. Specifically, a configurable circuit receives a configuration data set that specifies the operation that the configurable circuit has to perform in the set of operations that it can perform. In some embodiments, configuration data is generated outside of the configurable IC. In these embodiments, a set of software tools typically converts a high-level user design (e.g., a circuit representation or a hardware description language design) into a set of configuration data bits that can configure the configurable IC (or more accurately, the configurable IC's configurable circuits) to implement the user design.

Examples of configurable circuits include configurable interconnect circuits and configurable logic circuits. A logic circuit is a circuit that can perform a logical operation on a set of input data that it receives. A configurable logic circuit is a logic circuit that can be configured to perform different logical operations on its input data set.

A configurable interconnect circuit is a circuit that can configurably connect an input set to an output set in a variety of ways. An interconnect circuit can connect two terminals or pass a signal from one terminal to another by establishing an electrical path between the terminals. Alternatively, an interconnect circuit can establish a connection or pass a signal between two terminals by having the value of a signal that appears at one terminal appear at the other terminal. In connecting two terminals or passing a signal between two terminals, an interconnect circuit in some embodiments might invert the signal (i.e., might have the signal appearing at one terminal inverted by the time it appears at the other terminal). In other words, the interconnect circuit of some embodiments implements a logic inversion operation in conjunction to its connection operation. Other embodiments, however, do not build such an inversion operation in some or all of their interconnect circuits.

The configurable IC of some embodiments includes configurable logic circuits and configurable interconnect circuits for routing the signals to and from the configurable logic circuits. In addition to configurable circuits, a configurable IC also typically includes non-configurable circuits (e.g., non-configurable logic circuits, interconnect circuits, memories, etc.).

Figure 3:
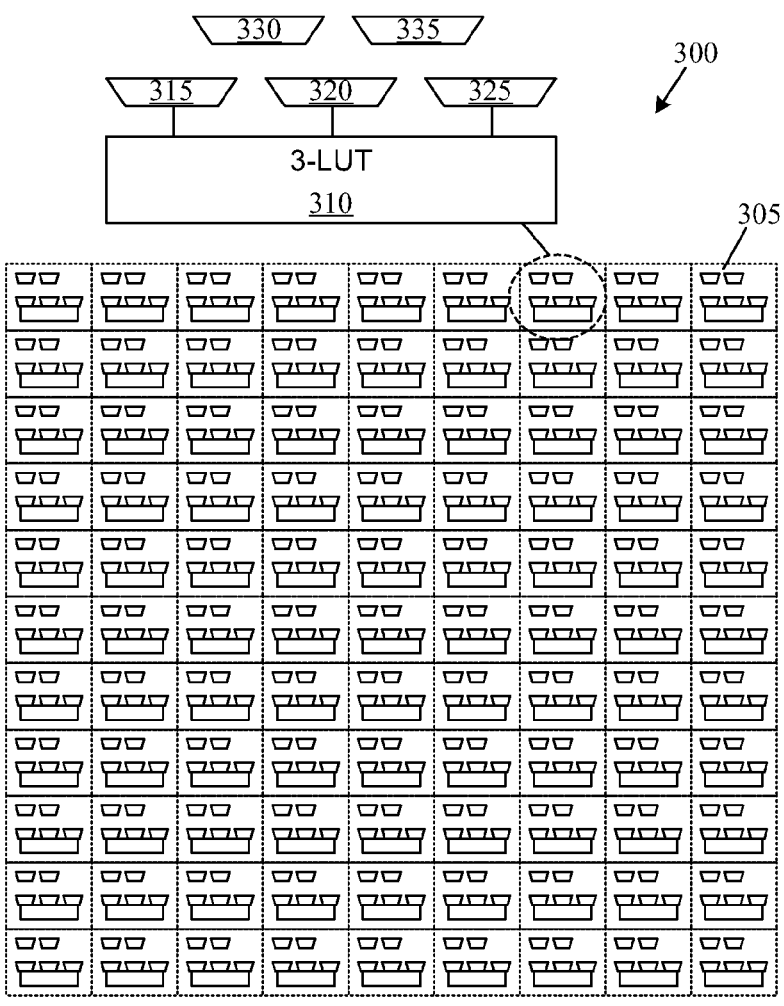
FIG. 3 illustrates a configurable circuit arrangement/architecture of some embodiments.

In some embodiments, the configurable circuits might be organized in an arrangement that has all the circuits organized in an array with several aligned rows and columns. In addition, within such a circuit array, some embodiments disperse other circuits (e.g., memory blocks, processors, macro blocks, IP blocks, SERDES controllers, clock management units, etc.). FIG. 3 illustrates a configurable circuit arrangement/architecture of some embodiments.

The architecture of FIG. 3 is formed by numerous configurable tiles 305 that are arranged in an array with multiple rows and columns. In FIG. 3, each configurable tile includes a configurable three-input (look-up table) LUT 310, three configurable input-select multiplexers 315, 320, and 325, and two configurable routing multiplexers (MUXes) 330 and 335. ICs of different embodiments have different numbers of configurable interconnect circuits (e.g., routing MUXes 330 and 335). For instance, some embodiments may have eight configurable interconnect circuits while others may have more or fewer such circuits. For each configurable circuit, the configurable IC 300 includes a set of storage elements (e.g., a set of SRAM cells) for storing a set of configuration data bits. Note that storage elements may alternatively be referred to as storage circuits or configuration cells.

In the ICs of some embodiments, the logic circuits are look-up tables (LUTs) while the interconnect circuits are multiplexers. Also, in the ICs of some embodiments, the LUTs and the multiplexers are sub-cycle reconfigurable circuits (sub-cycles of reconfigurable circuits may be alternatively referred to as "reconfiguration cycles"). The IC of some of such embodiments stores multiple sets of configuration data for a sub-cycle reconfigurable circuit, so that the reconfigurable circuit can use a different set of configuration data in different sub-cycles. Some examples of reconfigurable circuits are described in section III. Other configurable tiles can include other types of circuits, such as memory arrays instead of logic circuits.

In FIG. 3, an input-select multiplexer (also referred to as an "IMUX") 315 is an interconnect circuit associated with the LUT 310 that is in the same tile as the input select multiplexer. One such input select multiplexer receives several input signals for its associated LUT and passes one of these input signals to its associated LUT. In some embodiments, some of the input-select multiplexers are hybrid input-select/logic circuits (referred to as "HMUXs") capable of performing logic operations as well as functioning as input select multiplexers. An HMUX is a multiplexer that can receive "user-design signals" and configuration data along its select lines.

A user-design signal within a configurable IC is a signal that is generated by a circuit (e.g., logic circuit) of the configurable IC. The word "user" in the term "user-design signal" connotes that the signal is a signal that the configurable IC generates for a particular application that a user has configured the IC to perform. User-design signal is abbreviated to user signal in some of the descriptions in this document. In some embodiments, a user signal is not a configuration or clock signal that is generated by or supplied to the configurable IC. In some embodiments, a user signal is a signal that is a function of at least a portion of the set of configuration data received by the configurable IC and at least a portion of the inputs to the configurable IC. In these embodiments, the user signal can also be dependent on (i.e., can also be a function of) the state of the configurable IC. The initial state of a configurable IC is a function of the set of configuration data received by the configurable IC and the inputs to the configurable IC. Subsequent states of the configurable IC are functions of the set of configuration data received by the configurable IC, the inputs to the configurable IC, and the prior states of the configurable IC.

In FIG. 3, a routing multiplexer (also referred to as an RMUX) 330 is an interconnect circuit that at a macro level connects other logic and/or interconnect circuits. In other words, unlike an input select multiplexer in these figures that only provides its output to a single logic circuit (i.e., that only has a fan out of 1), a routing multiplexer in some embodiments either provides its output to several logic and/or interconnect circuits (i.e., has a fan out greater than 1), or provides its output to at least one other interconnect circuit.

In some embodiments, the RMUXs depicted in FIG. 3 form the routing fabric along with the wire-segments that connect to the RMUXs, and the vias that connect to these wire segments and/or to the RMUXs. In some embodiments, the routing fabric further includes buffers for achieving one or more objectives (e.g., to maintain the signal strength, reduce noise, alter signal delay, etc.) with respect to the signals passing along the wire segments.

Various wiring architectures can be used to connect the RMUXs, IMUXs, and LUTs. Several examples of the wire connection scheme are described in U.S. Pat. No. 7,295,037 entitled "Configurable IC with Routing Circuits with Offset Connections", issued on Nov. 13, 2007, which is incorporated herein by reference.

In some embodiments, the examples illustrated in FIG. 3 represent the actual physical architecture of a configurable IC. However, in other embodiments, the examples illustrated in FIG. 3 topologically illustrate the architecture of a configurable IC (i.e., they conceptually show the configurable IC without specifying a particular geometric layout for the position of the circuits).

In some embodiments, the position and orientation of the circuits in the actual physical architecture of a configurable IC are different from the position and orientation of the circuits in the topological architecture of the configurable IC. Accordingly, in these embodiments, the IC's physical architecture appears quite different from its topological architecture. For example, FIG. 4 provides one possible physical architecture of the configurable IC 300 illustrated in FIG. 3.

Figure 4:
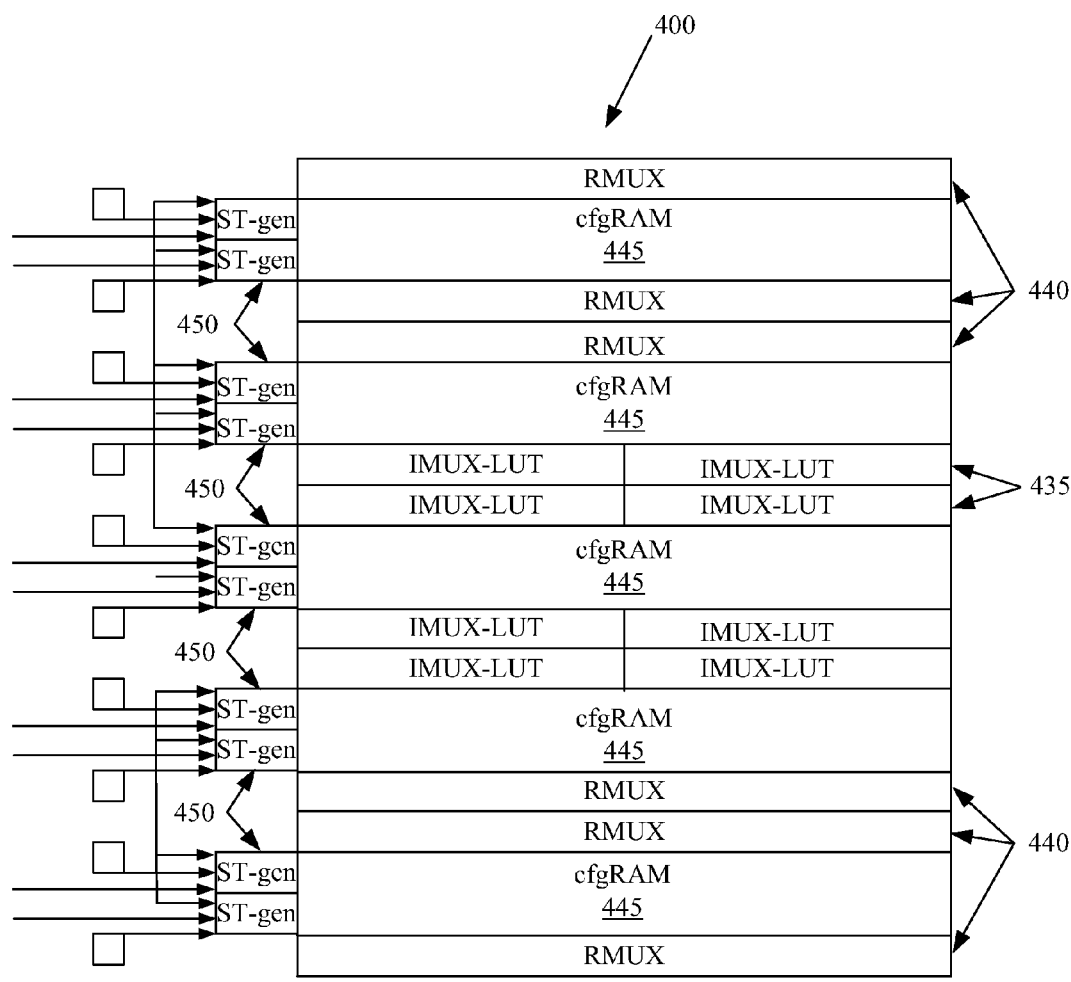
FIG. 4 provides one possible physical architecture of tiles of the configurable IC of some embodiments.

Having the aligned tile layout with the same circuit elements illustrated in FIG. 4 simplifies the process for designing and fabricating the IC, as it allows the same circuit designs and mask patterns to be repetitively used to design and fabricate the IC. In some embodiments, the similar aligned tile layouts not only have the same circuit elements but also have the same exact internal wiring between their circuit elements. Having such layout further simplifies the design and fabrication processes as it further simplifies the design and mask making processes.

Some embodiments might organize the configurable circuits in an arrangement that does not have all the circuits organized in an array with several aligned rows and columns. Therefore, some arrangements may have configurable circuits arranged in one or more arrays, while other arrangements may not have the configurable circuits arranged in an array.

Some embodiments utilize alternative tile structures. For instance, FIG. 4 illustrates an alternative tile structure that is used in some embodiments. Tile 400 has two sets 435 of four-aligned LUTs along with their associated IMUXs. The tile 400 also includes six sets 440 of RMUXs and five banks of configuration RAM storage 445. The configuration of each configurable circuit (e.g., the configurable circuits of a particular set 435 of four-aligned LUTs and associated IMUXs) is changed by receiving different configuration data sets from the configuration RAM 445 at different clock cycles. At a particular clock cycle, one set of bits of configuration data is supplied to a set 435 of LUTs and associated IMUXs. The tile 400 has ST-gen circuits 450 for providing sub-cycle clock signals to each set of configuration RAM 445. These sub-cycle clock signals trigger circuit elements to reconfigure during the operation of the IC. Examples of circuits that provide configuration data to configurable circuits of some embodiments are provided in section III, below.

As mentioned above, the configurable routing fabric of some embodiments is formed by configurable RMUXs, along with the wire segments that connect to the RMUXs, vias that connect to these wire segments and/or to the RMUXs and buffers that buffer the signals passing along one or more of the wire segments. In some embodiments, configuring the configurable routing fabric to route signals in a desired manner entails supplying RMUXs of the configurable routing fabric with the appropriate configuration data.

Figure 5:
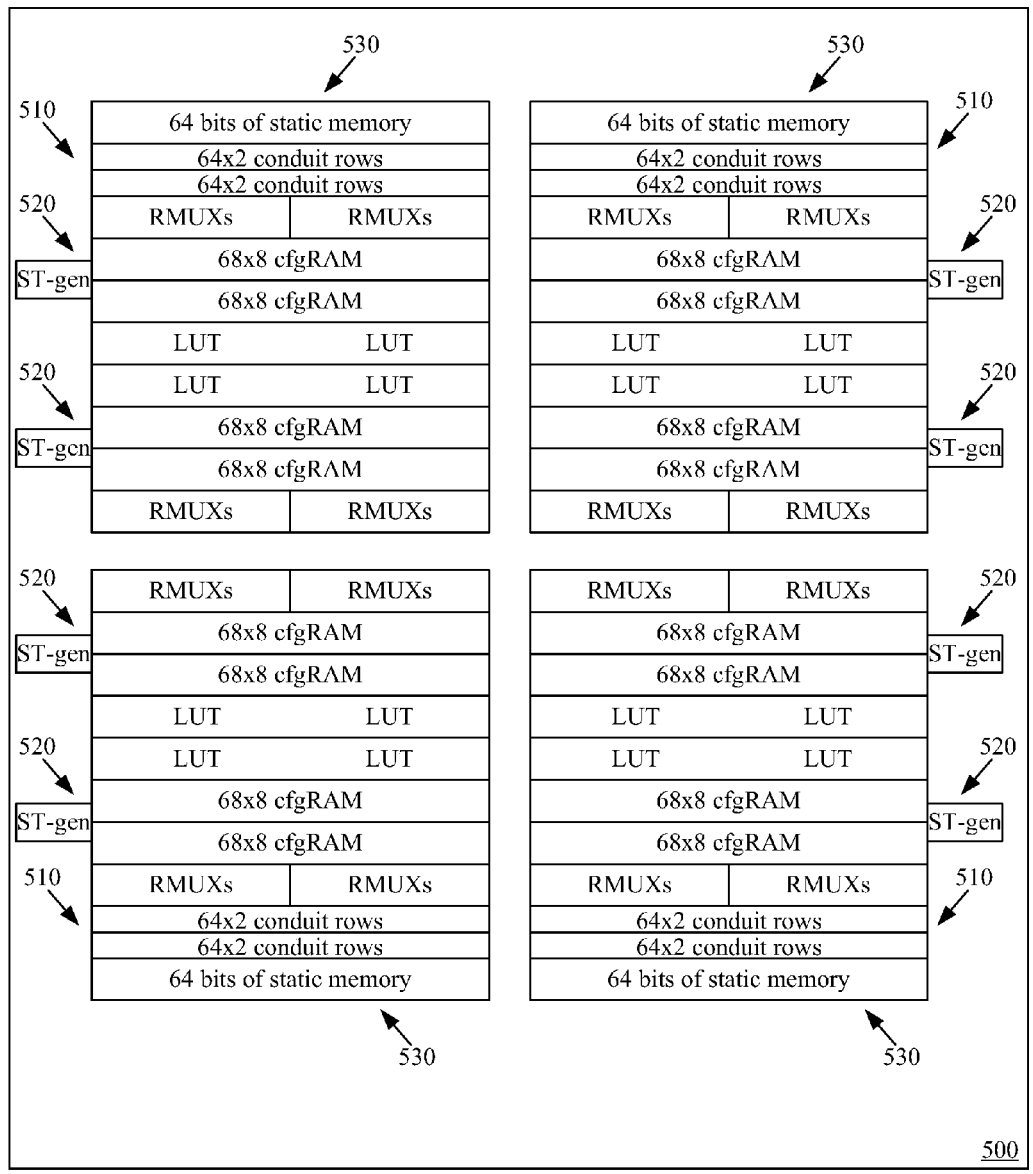
FIG. 5 illustrates a possible physical architecture of a small group of tiles that is used in some embodiments.

One of ordinary skill in the art would appreciate that other organizations of LUT tiles may also be used in conjunction with the invention and that these organizations might have fewer or additional tiles. Some embodiments use multiple clusters of tiles like the tile in FIG. 4. For example, FIG. 5 illustrates another tile structure 500 that is used in some embodiments. The tile structure 500 includes four smaller tiles that are each similar to the tile structure of FIG. 4, but have some additional features. Tile structure 500 includes conduits 510, ST-gen circuits 520, and static memory 530. Conduits 510 introduce delay when performing a storage operation. ST-gen circuits 520 provide sub-cycle clock signals to each set of configuration RAM 445. Static memory 530 stores data. In some embodiments, conduits 510 are implemented as single edge-triggered flip-flops. In some embodiments, multiple conduits 510 are chained together to provide longer delays, as necessary. In some embodiments, conduits 510 are readable, writeable, and/or stream-able from the secondary circuit structure. In some embodiments, some or all of the conduits 510 are separate from the RMUXs of the routing fabric and are instead at other locations in the routing fabric (e.g., between the wire segments connecting to the outputs and/or inputs of the RMUXs). For instance, in some embodiments, the routing fabric includes a parallel distributed path for an output of a source routing circuit to a destination circuit. A first path of the parallel distributed path, directly routes the output of the source routing circuit to a first input of the destination circuit. A second path running in parallel with the first path passes the output of the source routing circuit through a user design system element before reaching a second input of the destination circuit. The storage element stores the output value of the routing circuit when enabled. In some embodiments, the second path connects to a different destination component than the first path. When the routing fabric includes buffers, some of these embodiments utilize these buffers as well to build such conduits 510. Conduits 510 are further described in PCT Publication WO 2010/033263 published on Mar. 25, 2010, which is incorporated herein by reference. The illustrated tile structure 500 shows two sets of 64×2 conduit rows 510 on each of the four smaller tiles of the tile structure 500. However, some embodiments have one 64×2 conduit row on each of the four smaller tiles of the tile structure 500.

In some embodiments, the ST-gen 520 circuits provide one set of sub-cycle clock signals per row of configuration RAM. In some such embodiments, multiple types of circuits are driven by a single set of clock signals. In other embodiments, the ST-gen 520 circuits provide multiple sets of clock signals per physical row of configuration RAM. In some embodiments each provided set of clock signals is provided for one or more type of circuits, but not all types of circuits. For example, some embodiments provide one set of clock signals for LUTs and their associated IMUXs, and a second set of clock signals for RMUXs, whose configuration data is in the same row as the configuration data of the LUTs/IMUXs.

III. Reconfigurable IC Architecture

A. Reconfigurable Circuits

Some embodiments provide an IC with configurable circuits that change their configurations ("reconfigure") during the runtime of the IC. In some embodiments, these circuits reconfigure one or more times during each user design clock cycle during the operation of the IC ("runtime"). Reconfigurable ICs are configurable ICs which have circuits that can be reconfigured during runtime. A reconfigurable IC typically includes reconfigurable logic circuits and/or reconfigurable interconnect circuits. The reconfigurable logic and/or interconnect circuits are configurable logic and/or interconnect circuits that can cyclically "reconfigure" during runtime rather than being configured once (e.g., at the beginning of each runtime) and then maintaining the same configuration for the entire runtime. A reconfigurable logic or interconnect circuit reconfigures when it bases its operation on a different set of configuration data from the set of configuration data on which it previously based its operation.

In some embodiments, the reconfigurable circuits reconfigure a set number of times in each user cycle. For example, some embodiments provide four sets of configuration data sequentially to each configurable circuit. The four sets of configuration data are provided over four sub-cycles, with the four sub-cycles taking the same time as one user design clock cycle. Once all four sets of configuration data have been supplied, the configuration "loops back" from the last configuration data set back to the first configuration data set by once again receiving the first set of configuration data. Such a sequential reconfiguration scheme is referred to as a four "loopered" scheme. Other embodiments, however, might be implemented with six or eight loopered sub-cycle reconfigurable circuits. In a six or eight loopered reconfigurable circuit, a reconfigurable circuit receives six or eight configuration data sets in one user design clock cycle, and then loops back to the first configuration data set. Still other embodiments might use some other loopered number than four, six, or eight. Furthermore, some embodiments might use different loorpered numbers in different parts of the same IC.

Figure 6:
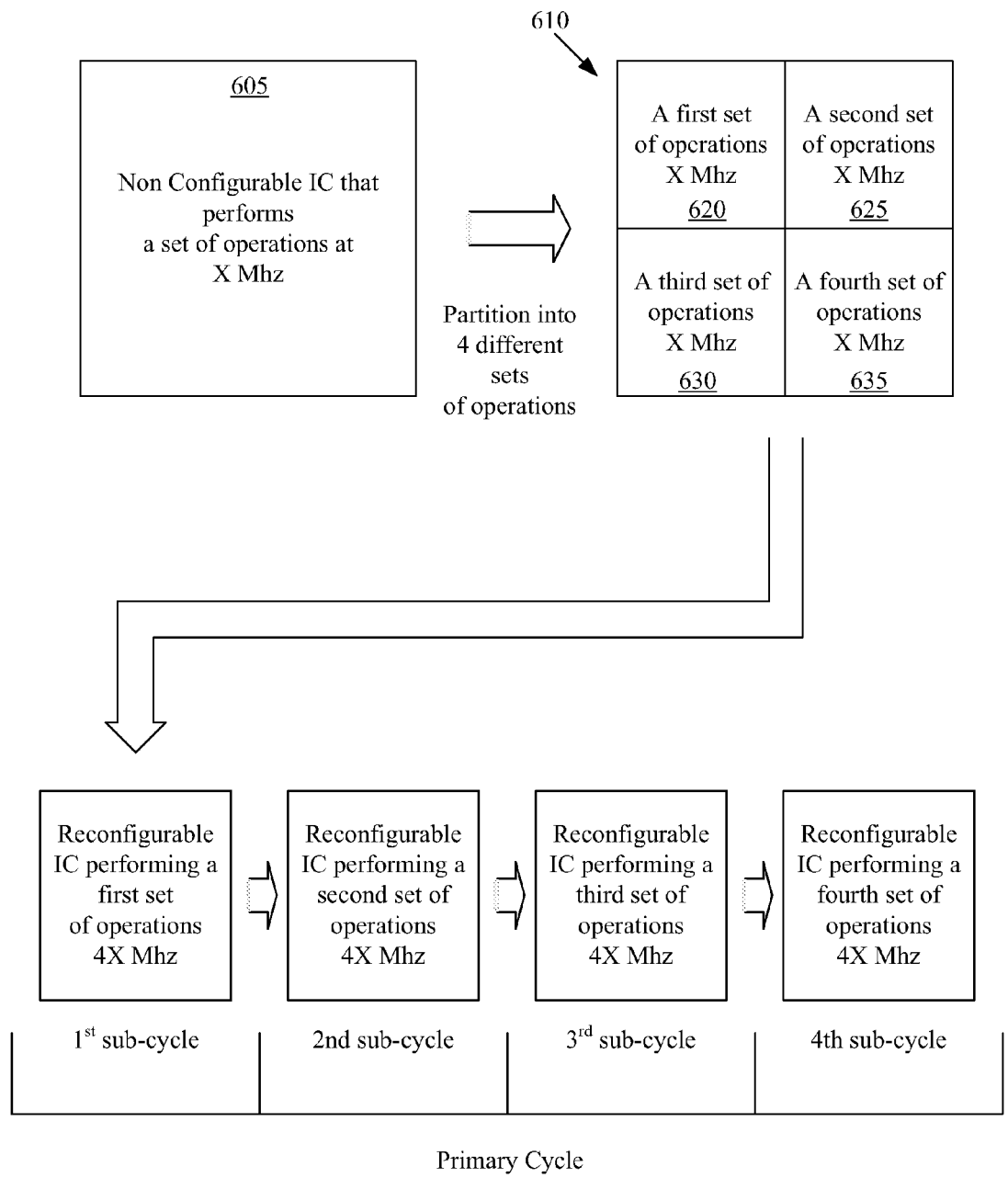
FIG. 6 conceptually illustrates an example of a sub-cycle reconfigurable IC.

FIG. 6 conceptually illustrates an example of a sub-cycle reconfigurable IC (i.e., an IC that is reconfigurable on a sub-cycle basis). In this example, the sub-cycle reconfigurable IC implements a non-configurable IC design 605 that operates at a clock speed of X MHz. The operations performed by the components in the IC design 605 can be partitioned into four sets of operations 620-635, with each set of operations being performed at a clock speed of X MHz.

FIG. 6 then illustrates that these four sets of operations 620-635 can be performed by one sub-cycle reconfigurable IC 610 that operates at 4×MHz. In some embodiments, four cycles of the 4×MHz clock correspond to four sub-cycles within a cycle of the X MHz clock. Accordingly, this figure illustrates the reconfigurable IC 610 reconfiguring four times during four cycles of the 4×MHz clock (i.e., during four sub-cycles of the X MHz clock). During each of these reconfigurations (i.e., during each sub-cycle), the reconfigurable IC 610 performs one of the identified four sets of operations. In other words, the faster operational speed of the reconfigurable IC 610 allows this IC to reconfigure four times during each cycle of the X MHz clock, in order to perform the four sets of operations sequentially at a 4×MHz rate instead of performing the four sets of operations in parallel at an X MHz rate. The sets of operations in the illustrated figure are performed sequentially with respect to the other sets of operations, however, in some embodiments, within each set of operations; at least some operations will be performed in parallel.

While the above described reconfigurable circuits reconfigure in sub-cycles of a user design clock cycle, one of ordinary skill in the art will understand that in some embodiments, the reconfiguration cycles are not part of a larger user design clock cycle. Accordingly, any features described herein as using sub-cycles can also be implemented in some embodiments with reconfiguration cycles that are not sub-cycles of a longer user design clock cycle. In some such embodiments, multiple reconfigurations of the reconfigurable circuits are performed cyclically based on a reconfiguration clock cycle. In some such embodiments, some reconfigurable circuits reconfigure sequentially through a sequence of configurations over the course of multiple reconfiguration cycles, then repeat the sequence of configurations multiple times.

B. Select Drivers

Figure 7:
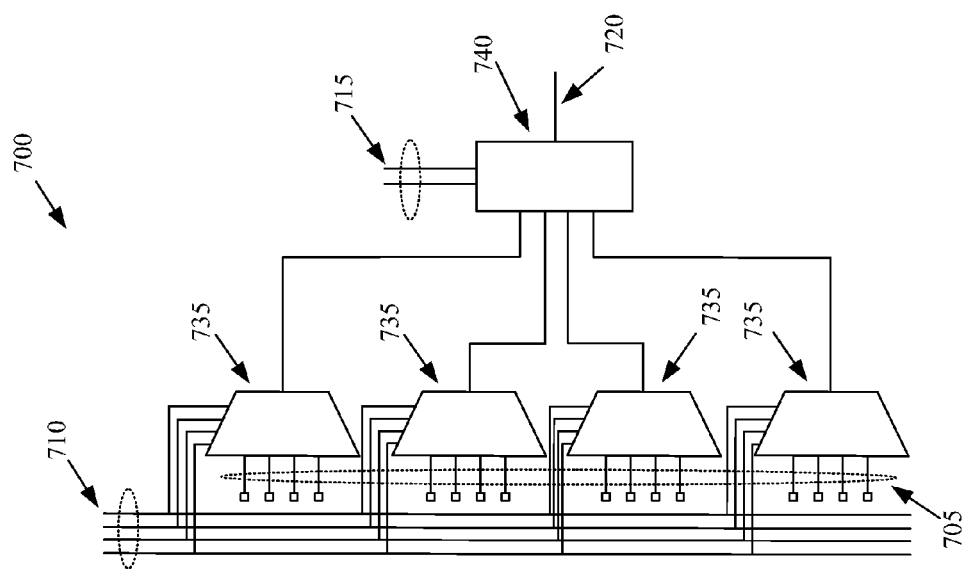
FIG. 7 illustrates an example of a reconfigurable logic circuit of some embodiments.

The ICs of different embodiments implement the reconfiguration process in different ways. FIG. 7 illustrates an example of a group of circuits 700 including a reconfigurable logic circuit (LUT 740) and the configuration circuitry for the configurable logic circuit 740. As shown, the configuration circuits are implemented as a set of 4 to 1 multiplexers. The group of circuits 700 includes 16 configuration cells 705, a set of four select lines 710 that feed into the selects of four multiplexers 735, and a set of two input lines 715 for LUT 740 with one output line 720.

FIG. 7 shows one possible set of circuits for providing configuration data to a reconfigurable circuit 740. The reconfigurable circuit in this figure is shown as a LUT; however, any reconfigurable circuit can receive configuration data from such a circuit arrangement or other circuit arrangements.

The configuration cells 705 each store one bit of configuration data. In some embodiments, the select lines 710 receive a selection of a new active input for the multiplexers 735 in each sub-cycle. Based on the select lines 710, the multiplexers 735 selectively connect the 16 configuration cells to the configurable LUT 740. That is, the multiplexers 735 sequentially provide four sets of configuration data to the LUT 740, one set of four bits per sub-cycle. LUT 740 provides the value of one of the four configuration bits supplied in a given sub-cycle as output through output line 720. The input lines 715 provide the input data for the LUT 740. The input data on lines 715 determine which of the supplied configuration values will be supplied as the output.

In FIG. 7, the configurable logic circuit 700 is operated on a four sub-cycle basis. In each of four sub-cycles, the configurable logic circuit 700 is configured according to the bits stored in a different set of configuration cells 705. The illustrated embodiment uses "one-hot" multiplexers for selecting which set of configuration cells 705 supply configuration data in a given sub-cycle. That is, in each sub-cycle, one of the select lines 710 is "hot" (active) while the other three of the select lines 710 are "cold" (inactive). The active select line 710 may also be referred to as "on", "powered", or "driven". Each multiplexer 735 provides as its output, the configuration data from the configuration cell corresponding to the active select line. Together, the four multiplexers 735 present LUT 740 with four configuration bits in each sub-cycle. For example, when the first select line 710 is active, each multiplexer 735 passes the value of the top configuration cell 705 of that multiplexer 735 to LUT 740. When the second select line 710 is active, each multiplexer passes the value of the second-from-the-top configuration cell 705 of that multiplexer 735 to LUT 740, and so on. The positions of the configuration cells relative to the order of the select lines in this example are provided only as examples. The ICs of some embodiments may provide configuration cells in different orders.

Figure 8:
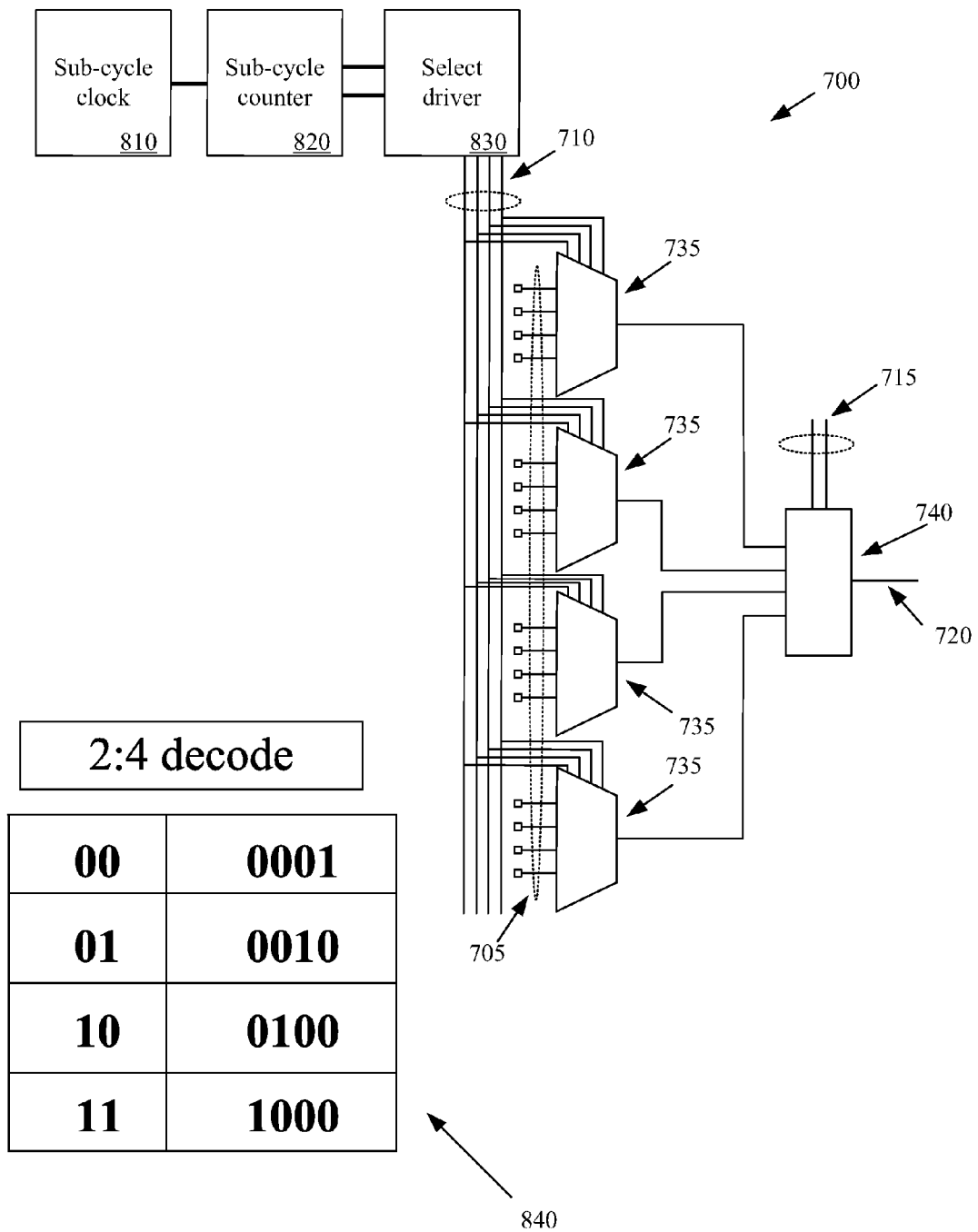
FIG. 8 illustrates circuits for driving select lines of multiplexers that select configurations of configurable circuits.

FIG. 8 conceptually illustrates circuits for driving select lines 710 of multiplexers 735 for supplying configurable circuit data. A one-hot multiplexer with four select lines can be driven by a select driver that switches the appropriate line to "hot" for each of four sub-cycles. The figure shows sub-cycle clock 810, sub-cycle counter 820, select driver 830, and logic table 840. The sub-cycle clock 810 provides a sub-cycle clock signal. The sub-cycle counter 820 keeps track of which sub-cycle the chip is implementing. The select driver 830 drives the appropriate signal line 710 in each sub-cycle. Table 840 shows one implementation of a logic table that translates sub-cycle numbers to active select lines.

For each sub-cycle, the sub-cycle clock 810 provides a signal that tells clocked circuits when to perform whatever functions they are designed to perform upon the changing of a sub-cycle (e.g., the sub-cycle clock signal could switch from "0" to "1" and back again in each sub-cycle). The sub-cycle counter 820 keeps track of what the present sub-cycle is. In some embodiments, the sub-cycle counter 820 keeps track by incrementing a binary counter once per sub-cycle. The counter goes through binary values 00, 01, 10, and 11 before returning to 00 and starting the count over. In embodiments with different loopered numbers, the binary values of the count will be different. In some embodiments the counter will use different numbers of binary digits or even use non-binary values. The select driver 830 receives a signal from the sub-cycle counter corresponding to the present sub-cycle (e.g., a signal of "00" in sub-cycle 0, "11" in sub-cycle 3, etc.). The select driver 830 then activates whichever select line (among select lines 710) corresponds to the present sub-cycle. The select driver 830 may be described as "driving" the active select line 710, or even "driving" one or more reconfigurable circuits. For example, the select driver 830 can be described as driving LUT 740.

Table 840 shows a logical conversion of binary values from the counter 820 to active select line 710. The left column of table 840 shows sub-cycles from 0-3 (in binary); while the right column of the table indicates which select line is "hot" in that sub-cycle. A value of logic "1" on a select line selects a corresponding configuration cell 705 for each multiplexer 735 to connect to the output of that multiplexer. If a configuration cell 705 of one multiplexer 735 in one cycle stores a different bit value (e.g., "0" in sub-cycle 1 and "1" in sub-cycle 2) than the configuration cell 705 of the previous sub-cycle, then changing the "hot" select line changes the output of that multiplexer 735 from one sub-cycle to the next. Changing the output of the multiplexer changes the value of the configuration bit presented to reconfigurable LUT 740.

If a configuration cell 705 of one multiplexer 735 in one cycle happens to store the same bit value (e.g., "1" in sub-cycle 2 and "1" in sub-cycle 3) as the configuration cell 705 of the previous sub-cycle, then changing the "hot" select line does not change the output of that multiplexer 735 from one sub-cycle to the next. Therefore, the value of the configuration bit presented to reconfigurable LUT 740 by that multiplexer 735 would not change.

FIGS. 7-8 illustrate a four sub-cycle system and a logic circuit with four configuration bits in a given sub-cycle. Four configuration bits are enough bits to configure the two-input LUT 740. However, the ICs of other embodiments use different numbers of sub-cycles and different numbers of configuration bits in configurable circuits. For example, the ICs of some embodiments use six or eight sub-cycles instead of four and/or LUTs with other numbers of configuration bits per sub-cycle instead of four configuration bits per sub-cycle. Like the ICs of the embodiments illustrated in FIGS. 7 and 8, the ICs of some embodiments with other number of sub-cycles and/or configuration bits per sub-cycle also use multiplexers to provide different configuration data to configurable circuits in each sub-cycle. As mentioned above with respect to FIG. 7, the reconfigurable circuit in FIG. 8 is shown as a LUT; however, any reconfigurable circuit can receive configuration data from such a circuit arrangement or other circuit arrangements.

C. Configuration Selecting Multiplexers

Figure 9A:
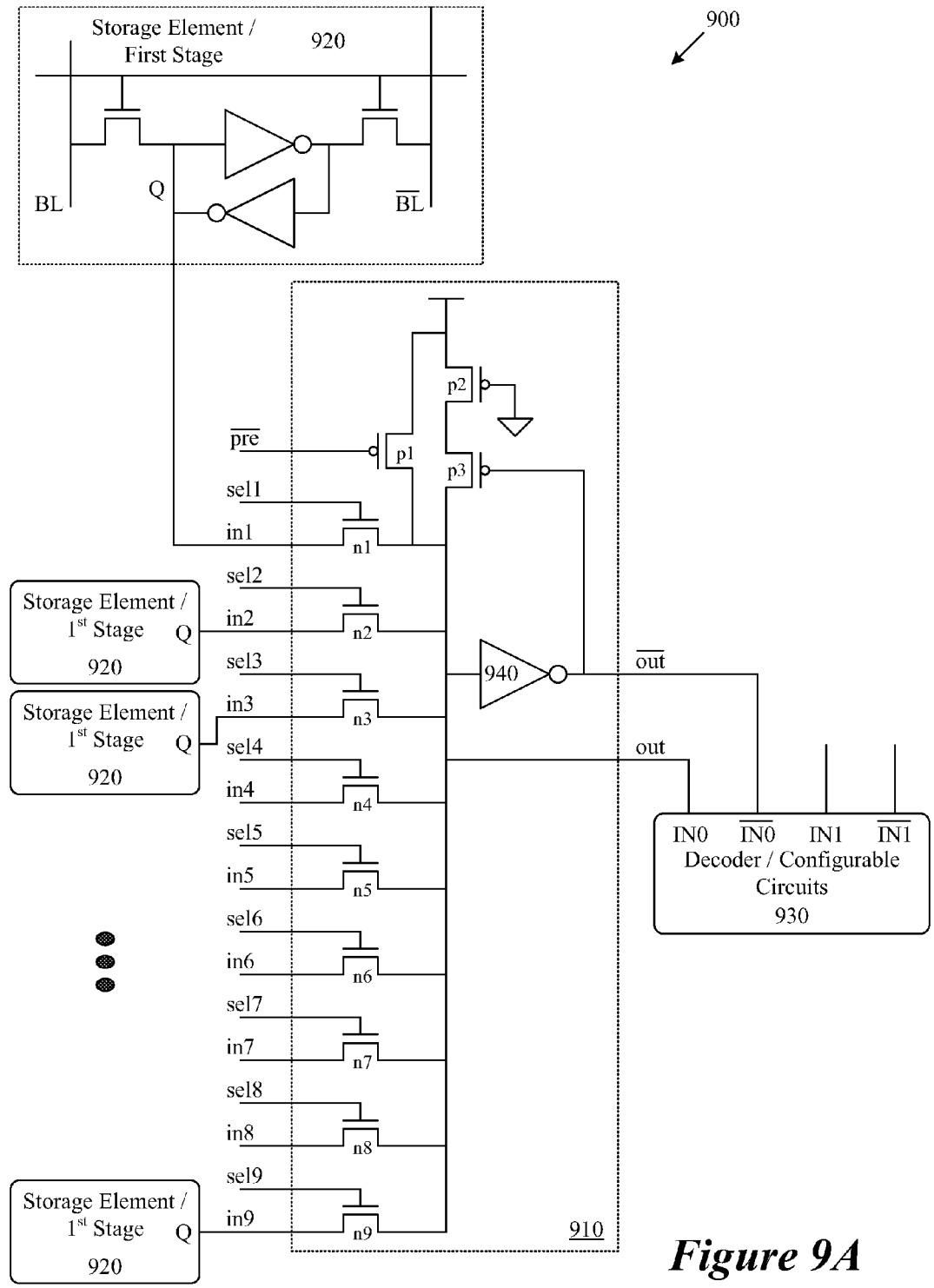
FIG. 9A illustrates a single-stage multiplexer used to provide configuration data to a particular configuration bit in some embodiments

The configuration selecting multiplexers of some embodiments have more than four inputs. FIG. 9A illustrates a single-stage multiplexer 910 used to provide configuration data to a particular configuration bit in some embodiments. In some embodiments, the particular configuration bit could be one configuration bit of a configurable logic circuit or one configuration bit of a configurable interconnect circuit or other type of configurable circuit. As shown, the multiplexer 910 includes a connection to each storage element 920, a connection to a decoder/configurable circuits 930, an inverter 940, an optional controllable pull-up transistor p1, two pull-up transistors p2 and p3, nine controllable pass transistors n1, n2, n3, n4, n5, n6, n7, n8 and n9, and select lines sel1, sel2, sel3, sel4, sel5, sel6, sel7 sel8, and sel9.

Figure 9B:
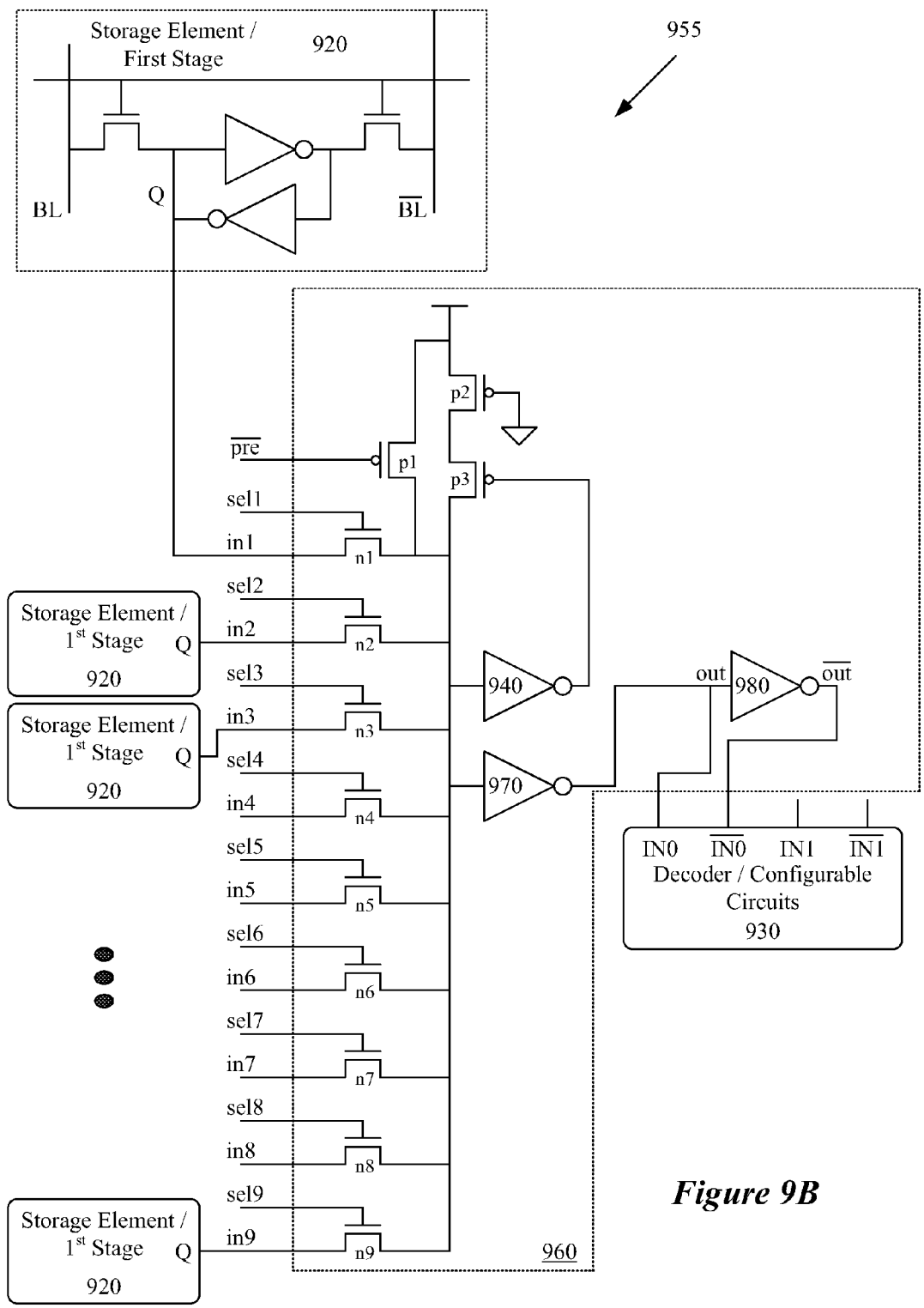
FIG. 9B illustrates an alternative embodiment of a multiplexer with added buffering inverters at its outputs.

FIG. 9B illustrates an alternative embodiment 955 of the multiplexer 910 with added buffering inverters at its outputs. As shown, in addition to the components of multiplexer 910, multiplexer 960 also includes two more inverters 970 and 980.

Combined with the storage element 920 and decoder 930, a 9-input multiplexer (e.g., multiplexer 910 or multiplexer 960) provide a context switcher such as ones described in U.S. patent application Ser. No. 12/206,718, now issued as U.S. Pat. No. 7,928,761, which is hereby incorporated by reference. As shown in FIGS. 9A and 9B, the multiplexer takes its inputs from the Q node of a storage cell 920. This storage element could be any one of the cells described in U.S. patent application Ser. No. 12/206,718, now issued as U.S. Pat. No. 7,928,761. The multiplexer passes its outputs to either the IC's configurable circuits or a decoder 930. In some embodiments, the decoder 930 is needed because the configuration data has been previously encoded. Some embodiments of the decoder 930 are described in U.S. patent application Ser. No. 12/206,718, now issued as U.S. Pat. No. 7,928,761.

Although the inputs are shown as single-ended, and are connected through nmos pass transistors, other embodiments may provide different devices. For example, in some embodiments, the nmos pass transistors are replaced by complementary transmission gates containing both an nmos and a pmos pass transistor. In other embodiments, the nmos transistors may be driven by boosted select lines, where the select signals are driven by a higher voltage supply than is used in the rest of the circuit (e.g. the select lines could be driven by 1.2V signals instead of 1V signals). If a higher voltage supply is used, it may be generated externally, or through the use of a bootstrap circuit. The ICs of other embodiments may use complementary inputs instead of single-ended, such that one or the other complementary inputs will be a low, and can be used to pull-up its corresponding complementary input through a pmos device instead of an nmos pass transistor. Any of these alterations to the input structure can be applied to the input structure of the multiplexer described above in reference to FIGS. 9A and 9B. In some embodiments, the select lines are driven by a select line driver as shown in FIG. 8.

As shown in FIG. 9A and FIG. 9B, each input to the multiplexer is directly connected to the Q node of a storage element 920 which also serves as a first stage in this configuration. Each input to the multiplexer 910 or 960 has an nmos pass transistor which is controlled by a select line (sel1 to sel9). When a particular select line is logic high the value at that input is passed to the outputs of the multiplexer 910 or 960. For instance, if sel1 is logic high, the transistor n1 is turned on, and the value at in1 is passed to the output of the multiplexer and the input of the inverter 940. The output of inverter 940 provides the complementary output of the multiplexer.

The out node of the multiplexer 910 is connected to a controllable pull-up transistor p1 that pre-charges the out node in some embodiments. In other embodiments, precharge is not performed, and the controllable pull-up transistor p1 is omitted. In addition, the transistors within the cross-coupled inverters may be sized to produce a low input voltage threshold (e.g., the size ratio of the pmos to nmos device may be 1:2 as oppose to a typical inverter that is 2:1). The pull up transistors p2 and p3 may also be sized with relatively long gate lengths to prevent fighting with the circuits driving the inputs of the multiplexer 900.

One of ordinary skill in the art will recognize that the multiplexer 910 or 960 may be implemented using different circuit elements in different embodiments. For example, the multiplexer 910 could be implemented using transmission gates at its inputs. In some embodiments, the circuits use an eight-loopered system with one select line (e.g., sel1 to sel9) active in each sub-cycle. In such a system, eight sub-cycles use eight select lines. In some such embodiments, when one of the select lines, or one of the configuration cells connected to a particular select line, is not working (as a result of defect, damage, wear-and-tear, etc.) the "extra" select line is used as a substitute for the non-working select line.

IV. Energy Consumption in Reconfiguration

A. Overview of Energy Consumption

As shown in the section III, in some embodiments, providing a separate set of configuration bits in each sub-cycle includes driving a different select line in each sub-cycle for a given set of configuration selecting multiplexers. When a configuration selecting multiplexer has a configuration bit in one sub-cycle that has a different value than the corresponding configuration bit in the next sub-cycle, the output of the configuration selecting multiplexer changes from one sub-cycle to the next. The circuitry that implements the configuration bit consumes some baseline amount of energy to power the configuration cell for the bit, as well as the multiplexer that selects the value for the bit in a given sub-cycle, the configurable circuit that is configured with the bit etc. However, some operations use more energy in a given sub-cycle than others.

Figure 10:
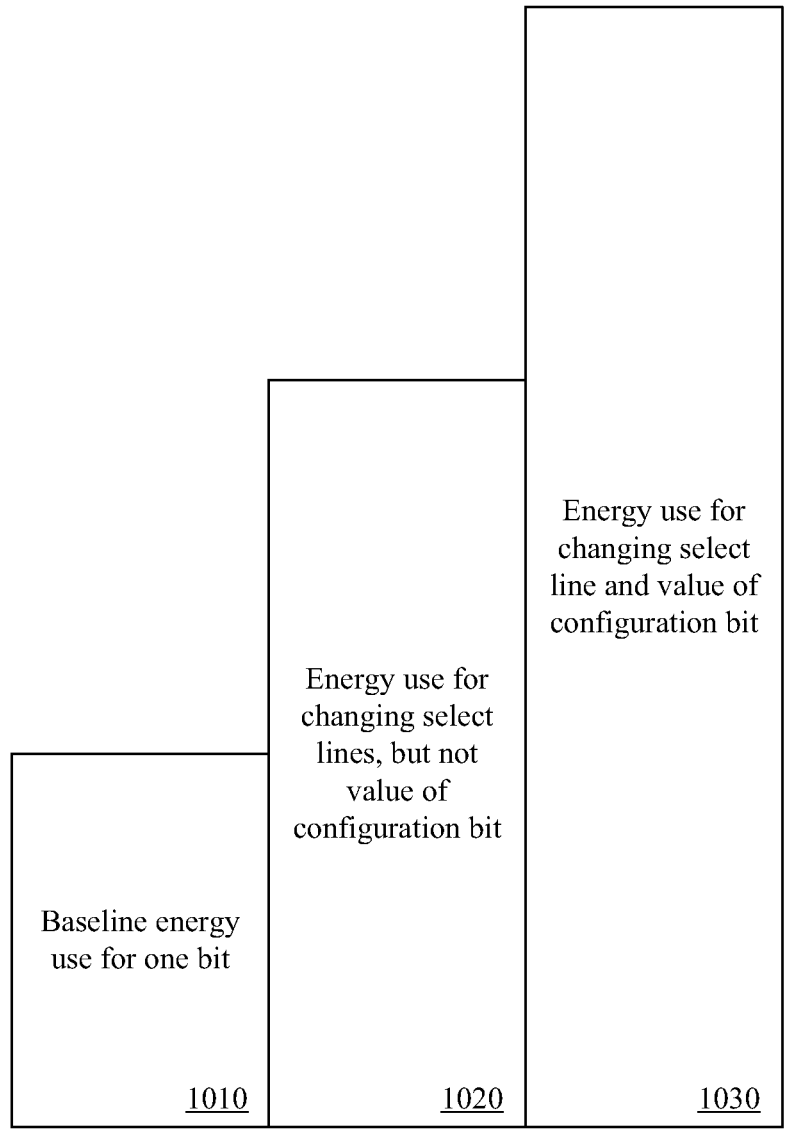
FIG. 10 conceptually illustrates the energy consumed in implementing one configuration bit for one sub-cycle.

FIG. 10 conceptually illustrates the energy consumed in supplying one configuration bit for one sub-cycle. Different amounts of energy are used for maintaining a select line, for changing the select line without changing the configuration value, and for changing the select line and the configuration value. The figure shows baseline energy 1010, select line switching energy 1020, and configuration value switching energy 1030.

Baseline energy 1010 represents the average amount of energy needed merely to maintain a configuration selecting multiplexer (that selects among the configuration cells for a single configuration value) on the same select line for one sub-cycle beyond the initial sub-cycle in which that configuration is activated. Select line switching energy 1020 represents the average amount of energy needed to switch a configuration selecting multiplexer (and thus one set of configuration cells) to a different select line without changing the configuration value. For example, this would occur when the configuration cells that each select line activates store the same value.

Configuration value switching energy 1030 represents the average energy consumed in changing one configuration selecting multiplexer (and thus one set of configuration cells) to a different select line while also changing the configuration value (i.e., changing the configuration bit from "0" to "1" or from "1" to "0"). Configuration value switching energy 1030 is larger than select line switching energy 1020. The difference in the sizes of energy 1030 and energy 1020 conceptually illustrates that some energy is saved if a configuration bit has the same value from one sub-cycle to an adjacent sub-cycle, even if the select line changes. Select line switching energy 1020 is larger than baseline energy 1010. The difference in the sizes of energy 1020 and energy 1010 conceptually illustrates that more energy can be saved by not switching from one select line to another in a given sub-cycle than by changing the select line without changing the configuration value.

FIG. 10 does not present the energy to scale. Some embodiments may have larger or smaller differences in the energy consumed for maintaining a configuration and the energy consumed for changing a configuration. Other embodiments may have larger or smaller differences in the energy consumed for switching a select line and not switching a select line. There may be other factors in the energy consumption than the factors described herein. For example, some embodiments use different amounts of energy to maintain a configuration value of "0" than to maintain a configuration value of "1". Similarly, some embodiments use different amounts of energy to switch from a "1" to a "0" than to switch from a "0" to a "1".

B. Energy Consumption in Changing Configuration Bits

As described in section IV.A., the reconfigurable circuits of some embodiments use less energy to maintain the same configuration bit value than to change (toggle) the configuration bit value. Accordingly, to save energy, the placement and routing processes of some embodiments reduce the number of configuration bit changes (amount of toggling) performed during runtime of a reconfigurable IC. This section (IV.B.) describes various combinations of configurations (in consecutive reconfiguration cycles). The number of bits that toggle from one reconfiguration cycle to the next affects the amount of energy used when reconfiguring. Accordingly, this section also describes the number of bits that toggle when the various described combinations of configurations are used in adjacent sub-cycles. Placement and routing processes that minimize the number of configuration bit changes by preferentially placing configurations that result in fewer configuration changes are described in section IV.C., below.

FIGS. 11-14 illustrate logic tables for various pairs of configurations. The pairs of configurations in the figures show which configuration bits flip when changing a three-input (eight-configuration-bits per sub-cycle) reconfigurable LUT from one configuration to another. FIG. 11 illustrates examples of tables that represent keeping a three-input (eight-configuration-bit) LUT in the same configuration (a logical AND gate that ANDs inputs B and C) from one sub-cycle to the next (e.g., sub-cycle 1 to sub-cycle 2). The figure shows an unchanging configuration in order to describe the features of the logic table without the complication of changing configuration bit values. The figure shows the LUT configurations along with the corresponding outputs. The figure includes logic tables 1110 and 1120. Logic table 1110 includes input columns 1112, 1114, and 1116 and output column 1118. Logic table 1120 includes input columns 1122, 1124, and 1126 and output column 1128. The first three values in each row of the tables represent one possible set of inputs for the three-input LUT. The fourth value in each row of the tables represents the output of the reconfigurable LUT for the inputs given in the row.

Input columns 1112, 1114, and 1116 collectively represent every possible permutation of inputs for the input terminals of a three-input reconfigurable LUT in sub-cycle 1. Output column 1118 represents the reconfigurable LUT's configuration bit values in sub-cycle 1. The configuration determines the LUT's output value for a given set of input values. For example, if all inputs 1112, 1114, and 1116) are "1" then the output (1118) will be "1". Likewise, input columns 1122, 1124, and 1126 represent every possible permutation of inputs on the input terminals of the same three-input reconfigurable LUT in sub-cycle 2. Output column 1128 represents the reconfigurable LUT's configuration bit values in sub-cycle 2.

Each output column 1118 and 1128 shows the configuration values stored in eight configuration cells. For a given output column, the eight configuration values represent one set of eight configuration cells. Each configuration cell in a given set is connected to a different multiplexer that provides the configuration data bit of that set to the reconfigurable LUT in the sub-cycle of that set. As shown in FIG. 8, in some embodiments, the active set is determined by the select lines.

In some embodiments, the configuration selecting multiplexer is the same as the multiplexer illustrated in FIG. 9A or 9B. The stored data could be a stored "0" or a stored "1". As the output columns are identical in each table, no configuration values change for the reconfigurable LUT when it is reconfigured from sub-cycle 1 to sub-cycle 2. In an embodiment with an IC that changes select lines in every sub-cycle, the energy consumed in reconfiguring the reconfigurable LUT from sub-cycle 0 to sub-cycle 1 would be approximately eight times the energy 1020 shown in FIG. 10. That is, the LUT consumes the energy 1020 for each of the LUT's eight configuration bits.

One of ordinary skill in the art will realize that the specific energy consumptions described in relation to FIGS. 11-14 are provided for ease of description. While the energy of the IC of some embodiments will generally increase when the number of reconfigured bits increases, other factors may raise or lower the energy consumption by amounts different from the ways described herein.

FIG. 12 illustrates tables that represent reconfiguring an eight-bit LUT from an AND-gate to an OR-gate from one sub-cycle to the next. This figure shows that reconfiguring a reconfigurable LUT can change the values of some bits while leaving the values of other bits unchanged. The figure includes tables 1210 and 1220, output columns 1218 and 1228 and outputs 1232, 1234, 1236, 1238, 1242, 1244, 1246, and 1248. The output column 1218 represents the configuration values of a reconfigurable LUT that implements an AND-gate. The output column 1228 represents the configuration values of a LUT that implements an OR-gate. Outputs 1232-1248 represent configuration bits that change their values from sub-cycle 1 to sub-cycle 2. The energy consumed in reconfiguring the reconfigurable LUT from sub-cycle 1 to sub-cycle 2 would be approximately four times the energy 1020 plus four times the (larger) energy 1030, both shown in FIG. 10. That is, the LUT consumes the energy 1030 for each of the four changing configuration values and the energy 1020 for each of the four non-changing configuration values.

FIG. 13 illustrates tables that represent reconfiguring an eight-bit LUT from an AND-gate 1310 to a NAND-gate 1320 from one sub-cycle to the next. In this figure, all eight configuration bits change from one sub-cycle to the next. Accordingly, the energy consumed in reconfiguring the reconfigurable LUT from sub-cycle 1 to sub-cycle 2 would be approximately eight times the (larger) energy 1030. That is, the LUT consumes the (larger) energy 1030 for each of the eight changing configuration values.

The examples shown in FIGS. 12-13 illustrate changing the type of logic gates of the reconfigurable circuit. However, in the IC of some embodiments, a reconfiguration can leave the type of logic gate implemented on a reconfigurable LUT unchanged while changing which inputs the LUT uses for the logic gate. FIG. 14 illustrates tables 1410 and 1420 that represent reconfiguring an eight-bit LUT from an AND-gate with inputs B and C to an AND-gate with inputs A and B from one sub-cycle to the next. In this figure, two configuration bits change from one sub-cycle to the next due to the changing of inputs to the logic circuit. Accordingly, the energy consumed in reconfiguring the reconfigurable LUT from sub-cycle 1 to sub-cycle 2 would be approximately six times the energy 1020 plus two times the energy 1030. That is, the LUT consumes the (larger) energy 1030 for each of the two changing configuration values and the (smaller) energy 1020 for each of the six non-changing configuration values.

The above examples are merely some examples of changing configurations, not a comprehensive list of possible configurations and reconfigurations. In various possible permutations, reconfiguring a LUT with 8 configuration bits could change between 0 and 8 of the configuration bit values. The amounts of energy were described in discrete terms (e.g., four times one specific energy, plus four times another specific energy) to provide clarity of the concept. However, in some embodiments, the energy consumed will not be a linear function of the number of bits flipped. Similarly, the energy consumed will not be a function only of the number of bits flipped in some embodiments. In such embodiments other factors would affect the energy consumed when switching from one configuration to another. However, larger numbers of bits changed tends to result in larger amounts of energy consumed in some embodiments. In such embodiments, keeping the same configuration from one sub-cycle to the next consumes less energy than changing the configuration.

C. Switching Aware Placement and Routing

The placement and routing processes of some embodiments determine how to configure configurable circuits of an IC in order to implement a user design. The placement and routing processes "place" configurations representing the various logic circuits of the user design by determining which configurable circuits should implement each part or parts of a user design. For an IC with reconfigurable circuits, the placement and routing processes also determine in which sub-cycle the reconfigurable circuits should implement which parts of the design. The placement and routing processes "route" signals by determining which configurable routing circuits should carry signals between the various circuits of an IC with configurable circuits. For a reconfigurable IC, the routing process also determines in which sub-cycle the reconfigurable routing circuits should carry signals between various circuits. A set of data containing the results of such determinations can be referred to as a "layout" for the configurable circuits of the IC. The placement and routing processes of some embodiments generate a layout specific to a particular model of physical IC. The same user design can be implemented as different layouts for different models of physical ICs or even as different layouts for the same model of physical IC.

In some embodiments, the placement and routing processes give preferences to configuration schemes that reduce the number of configuration bits that change from one sub-cycle to the next. It will be understood by one of ordinary skill in the art that descriptions of "setting" bits in placement and routing processes involve storing (sometimes called "defining") values intended for those bits in a layout that is being designed by the placement and routing processes. Similarly, "configuring" a configurable circuit in placement and routing processes means determining what configuration the configurable circuit should have and storing that planned configuration in a layout. In the context of placement and routing for reconfigurable circuits of an IC, only the layout of the reconfigurable circuits is being changed, not the actual physical circuits of the IC or the actual configuration data stored in the configuration cells of the IC. Data is stored in the physical configuration cells only when the layout is implemented on the reconfigurable circuits, not while the layout is being generated by the placement and routing processes. It will also be understood that in the context of the placement and routing processes, references to an "earlier sub-cycle" or a "later sub-cycle" describe what the layout plans for earlier and later sub-cycles once the layout is implemented on the reconfigurable circuits of an IC.

Setting a value in the placement and routing processes of some embodiments does not mean that the final configuration layout will necessarily use that value because placement and routing processes can change and rearrange the values of configuration bits in the layout before the layout is finalized. In some cases, a reconfigurable circuit in the layout may be described as "reconfiguring" from one sub-cycle to the next. However, in the context of placement and routing that means that the layout has planned a reconfiguration. If the layout is later implemented, then the reconfigurable circuit will reconfigure in the way designated by the layout.

As described in section IV.B., in some embodiments, reconfigurations that change fewer configuration bits use less energy than reconfigurations that change more configuration bits. Accordingly, when determining what configurations to place on various reconfigurable circuits in various sub-cycles, the placement and routing processes of some embodiments give preference to configurations that have fewer configuration bit value changes from the configuration of the previous sub-cycle. The placement and routing processes of some embodiments allow variable "costs" to be assigned to different placements. The configurations in the layout are placed in such a way to minimize the overall "cost" of a layout. When a particular circuit in a user design can be assigned to one of multiple places in an FPGA layout, the placement and routing software would avoid placement of the circuit in locations that result in a higher overall "cost". The placement and routing processes of some embodiments dynamically determine the "cost" for placing a particular configuration on a particular reconfigurable circuit in a particular sub-cycle. For example, the placement and routing processes of some embodiments increase the "cost" of placing a "circuit" of the user design in locations that are farther from the circuits to which the particular circuit connects. Similarly, the placement and routing processes of some embodiments increase the cost for placing configurations of reconfigurable circuits that are located in congested areas of the FPGA layout.

Figure 15:
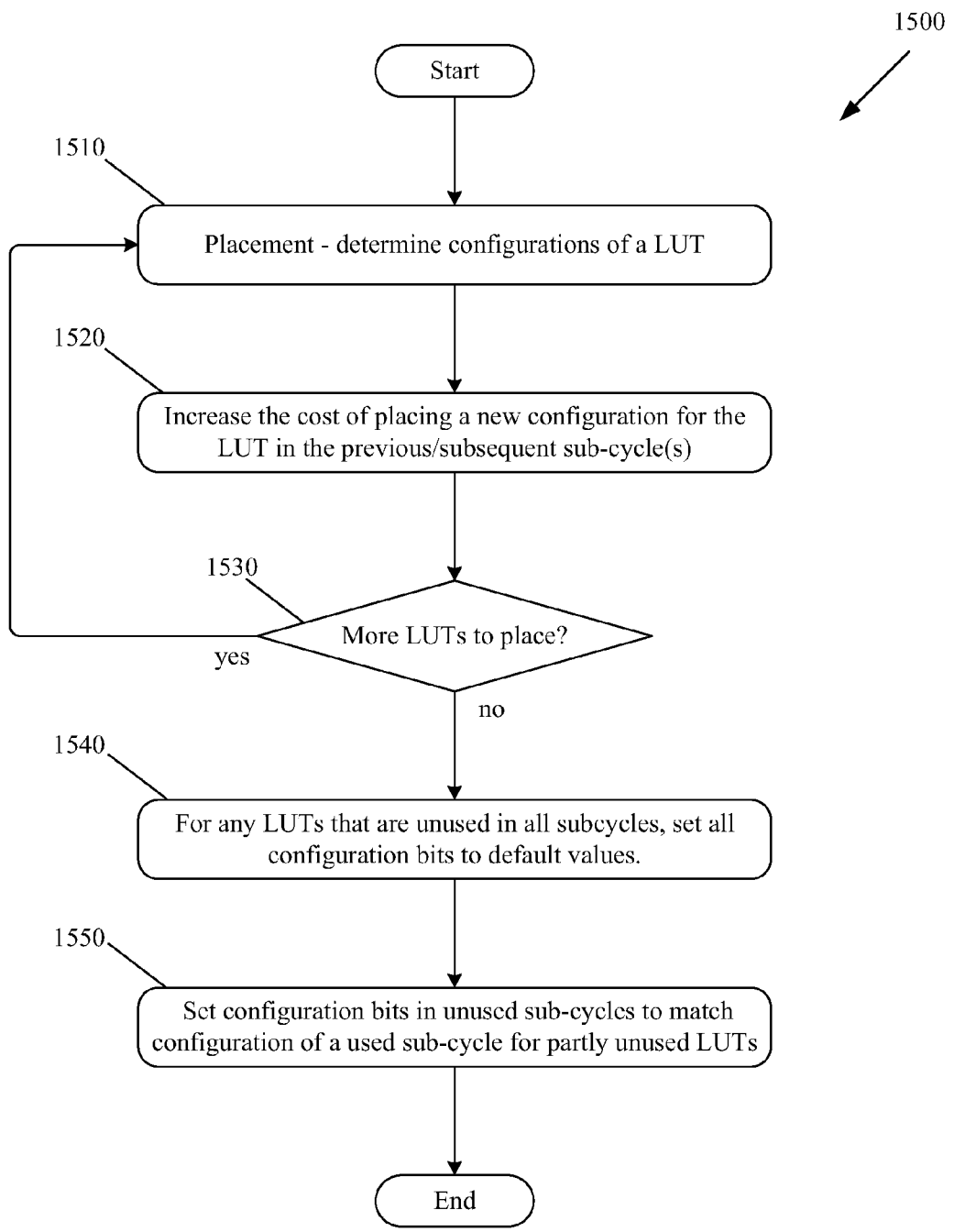
FIG. 15 conceptually illustrates a placement process that gives preference to similar configurations in successive sub-cycles.
Figure 16:
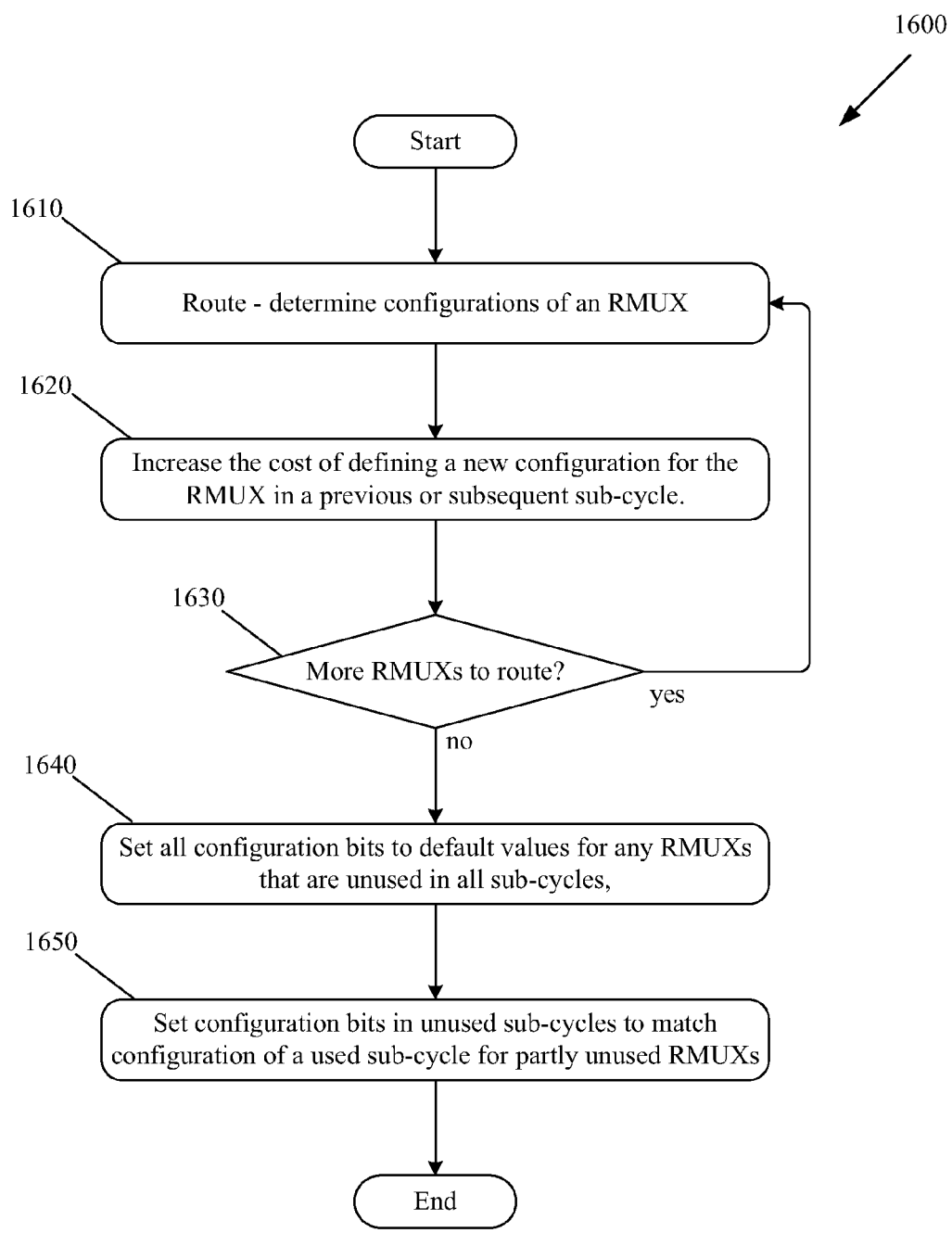
FIG. 16 conceptually illustrates a routing process that gives preference to similar configurations in successive sub-cycles.

The placement and routing processes of some embodiments also impose a higher "cost" for placing configurations that are different from the configuration of the previous sub-cycle. FIGS. 15 and 16 conceptually illustrate placement and routing processes that give preference to similar configurations in successive sub-cycles. FIG. 15 conceptually illustrates a placement process that gives preference to similar configurations in successive sub-cycles. One of ordinary skill in the art will understand that this process is only a conceptual example of such a process and that many other factors go into determining placement of configurations for the reconfigurable logic circuits than the factors described in relation to this figure. The figure demonstrates how the placement and routing processes of some embodiments weigh the placement of logic circuit configurations in favor of fewer configuration bit changes for reconfigurable circuits in various sub-cycles. Such weighting decreases the number of flipped configuration bits in the final layout. Decreasing the number of flipped bits decreases the power consumption (energy consumed per sub-cycle) of the reconfigurable logic circuits. For ease of description, the figure and the following description refers to LUTs, however, in some embodiments, the placement process defines configurations for other types of reconfigurable logic circuits. The placement process of some embodiments also defines the configurations for IMUXs, either at the same time as it defines the configurations for the LUTs or at different times.

The process 1500 begins with placement (at 1510) of a LUT. For example, in some embodiments, if the placement requires an AND-gate, the process 1500 1) chooses a particular reconfigurable LUT in a particular sub-cycle for implementing the AND-gate, 2) creates a set of configuration data as shown in output column 1110 in FIG. 11, and 3) stores that set of configuration data for that LUT in that sub-cycle as part of the layout for the configurable IC.

The process 1500 then increases (at 1520) the cost of placing a different LUT configuration for that particular LUT in the previous sub-cycle or the subsequent sub-cycle. In some embodiments, the process assigns costs that increase with the number of bits changed. For example, if for a particular LUT, sub-cycle 1 is assigned the configuration of a three-input AND-gate, there will be a high increase in the cost for placing a three-input NAND-gate on the same LUT in sub-cycles 0 or 2. Changing from NAND to AND (going from sub-cycle 0 to sub-cycle 1) would flip eight bits, just as changing from AND to NAND would do (going from sub-cycle 1 to sub-cycle 2). Accordingly, the high increase in cost reflects the high number of configuration bits (all eight bits) that are different between a three-input AND-gate and a three-input NAND-gate.

In some embodiments, the increase in the "cost" to place a different configuration on a particular configurable circuit extends to all unassigned sub-cycles before and after the assigned sub-cycle. In the AND-gate to NAND-gate example (assuming an eight loopered system), the cost of placing a NAND-gate on that LUT in sub-cycles 3-7 and 0 (the configuration of the IC loops back to sub-cycle 0 after sub-cycle 7) would also increase. This is because unused sub-cycles of any configurable circuits can be configured to whatever the configuration of the closest used sub-cycle is. In other words, in some embodiments, once a configuration is placed for a particular configurable circuit in a particular sub-cycle, the placed configuration has an influence that extends forward and backward through the sub-cycles until the next placed configuration for that particular configurable circuit. As used herein, statements of the "influence" of a placed configuration are a convenient way of indicating that the placement process takes the placed configuration into account rather than implying that a placed configuration is an independent actor. In some embodiments, the influence of a placed configuration for a particular configurable circuit in a particular sub-cycle increases the cost to place different configurations on the same configurable circuit in other sub-cycles. Similarly, in some embodiments, the influence of a placed configuration for a particular configurable circuit in a particular sub-cycle decreases the cost to place identical configurations on the same configurable circuit in other sub-cycles.

In some embodiments, the influence of a placed configuration decreases the farther the unused sub-cycle in question is from the influencing configuration. Referring back to the AND-NAND example: placing a NAND-gate on sub-cycle 5 of the particular LUT would cost less than placing a NAND-gate on sub-cycle 2 of the particular LUT in some embodiments. Furthermore, in some embodiments, because the influence of one configuration can affect the influence of another configuration, once there is one planned change of a particular bit of a configurable circuit, the "cost" of subsequent changes of that particular bit in configurations to be placed in remaining sub-cycles may decrease. For example, if a configuration value for a particular bit of a particular reconfigurable circuit is defined in the layout as "1" in sub-cycle 2 and no configuration value is defined for that bit in any other sub-cycle, then the placement and routing processes of some embodiments increase the cost of defining a "0" value for the corresponding bit in all other sub-cycles. If, despite this increase in cost, a value of "0" is defined in another sub-cycle (e.g., sub-cycle 5), the "0" value in sub-cycle 5 would make at least one bit toggle (in some sub-cycle between sub-cycle 2 and sub-cycle 5) inevitable. Accordingly, the cost of defining a "0" configuration value for the corresponding bit in other sub-cycles (e.g., sub-cycle 3) may decrease as a result of the placement of the "0" value. The reason for the cost decrease is that a placement of a "1" for that particular bit in sub-cycle 3 would make that particular bit match in sub-cycles 2 and 3, but would not avoid the inevitable bit toggling somewhere between sub-cycles 2 and 5. However, the placement and routing processes of some embodiments would not decrease the cost of defining a "0" for the particular bit in sub-cycle 3 enough to completely eliminate the previous cost increase. Some of the previous cost increase would still remain because sub-cycle 3 is closer to sub-cycle 2 than to sub-cycle 5 and thus is more influenced by the configuration value of sub-cycle 2 than the configuration value of sub-cycle 5.

The placement process of some embodiments increases the costs of changing a configuration only for subsequent sub-cycles. However the placement process of some embodiments increases the cost of changing a configuration only for the preceding sub-cycles. The placement process of some embodiments imposes a higher increase in cost from "zero bits changed" to "one bit changed" than from "n bits changed" to "n+1 bits changed" where n is greater than (or equal to) one.

The process 1500 then determines (at 1530) whether more configurations for the LUTs need to be placed. If more configurations of the LUTs need to be placed, the process 1500 returns to operation 1510 to place more configurations of the LUTs. The placement of these configurations of the LUTs takes into account the "cost" increases of previous iterations of operation 1520.

In some cases a configurable circuit will be completely unused. That is, according to the layout, the LUT will be unused in every sub-cycle. If no more LUT configurations are required, the process defines (at 1540) the configuration values (in the layout) to default values for all sub-cycles of any completely unused LUTs (LUTs that are not used in any sub-cycle). The placement process of some embodiments uses a default value of zero. In other embodiments the placement process uses a default value of one. The placement process of still other embodiments uses different default values for different configurable circuits.

Figure 17:
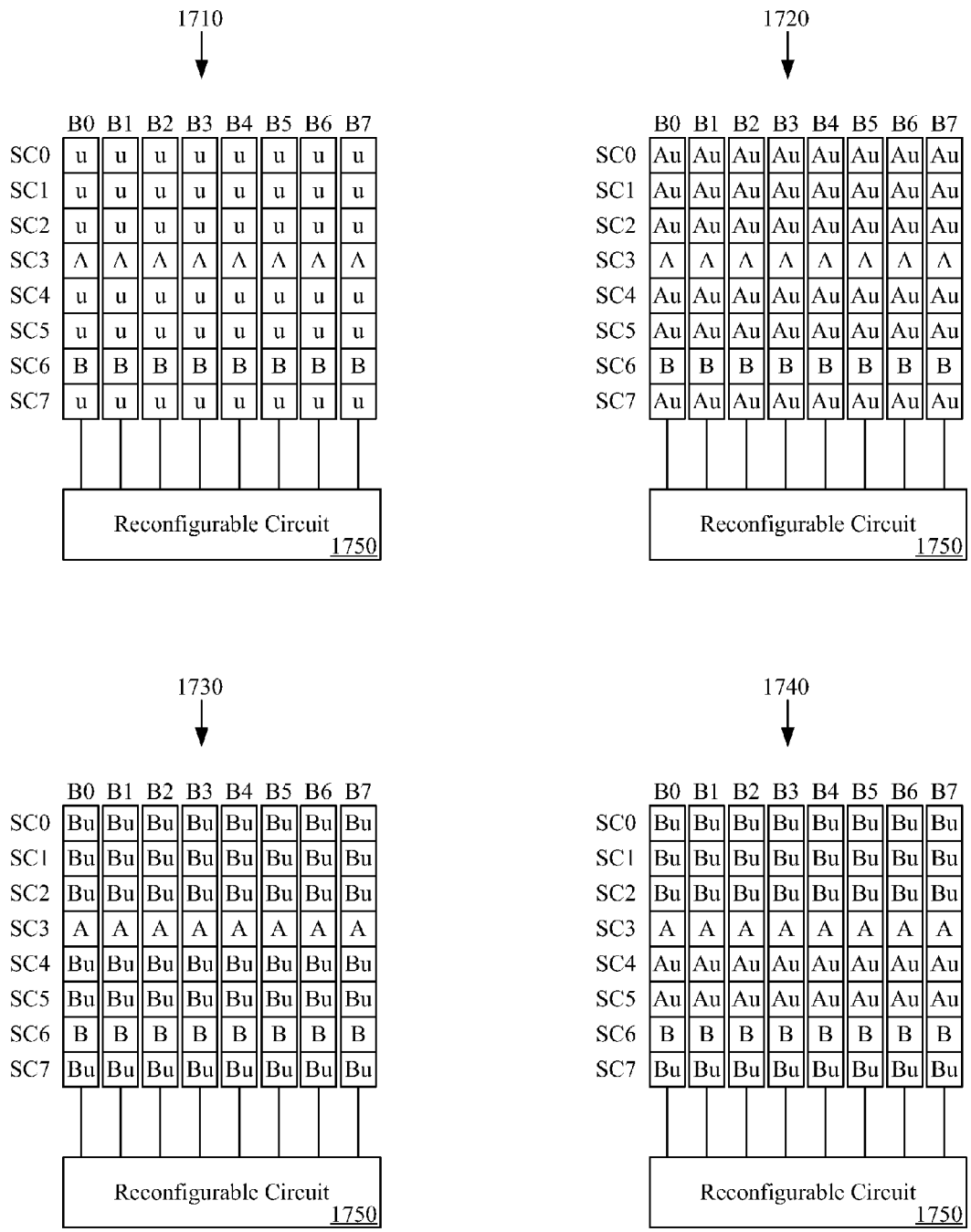
FIG. 17 illustrates multiple configurations for unused sub-cycles that minimize configuration bit changes.

In some cases, after all LUTs of a user design have been placed; there will be some LUTs that are partly unused (i.e. "don't care"). That is, according to the layout, the LUTs are used in some sub-cycles, but not used in other sub-cycles. In some embodiments, the process then defines (at 1550) (or "fills in") the configuration values in the unused sub-cycles of the partly unused LUTs to the same configuration values that the LUTs have in the adjacent sub-cycles. Defining the configuration values to match the configuration values of the same reconfigurable circuits in other sub-cycles reduces the number of configuration bits changed and the corresponding energy consumption. There will be two transitions from one configuration to another for any reconfigurable circuit with different configurations in any two cyclical sub-cycles. That is, there will be a transition from configuration A to configuration B, and a transition from configuration B to configuration A. These transitions can be defined to occur in any sub-cycles between the sub-cycle in which configuration A is used and the sub-cycle in which configuration B is used. In some embodiments, the placement and routing processes provide fill-ins for "don't care" configurations to minimize configuration changes in configurable circuits with unused sub-cycles. FIG. 17, described below, illustrates various configurations "filled-in". Once the placement process 1500 finishes setting (at 1550) the configurations for the unused sub-cycles of each configurable circuit, the process 1500 ends.

FIG. 16 conceptually illustrates a routing process that gives preference to similar configurations in successive sub-cycles. One of ordinary skill in the art will understand that this process is only one example of such a process and that many other factors go into routing than the factors described herein. The figure demonstrates how the routing process of some embodiments weight the routing in favor of fewer configuration bit changes in order to decrease the number of flipped configuration bits and thus decrease the power consumption (energy consumed per sub-cycle) of the reconfigurable circuits. The description refers to RMUXs, however, in the ICs of other embodiments; other types of configurable routing circuits could be used instead of or in addition to RMUXs.

The process 1600 begins with routing (at 1610) an RMUX. The routing defines the configuration of an RMUX in the layout in order to route signals (when the layout is implemented). The RMUX could be configured to route signals between LUTs (or IMUXs) that have already been placed in a layout by a placement process, or between other RMUXs, or between RMUXs and LUTs (or IMUXs), or between other types of circuits. In some embodiments, the process 1600 increases (at 1620) the cost of defining a changed configuration for an RMUX. In such embodiments, when a signal could be routed through any one of multiple RMUXs, the process prefers to route the signal through an RMUX that requires the fewest configuration changes from one sub-cycle to the next. However, the routing process of some embodiments skips operation 1620 and routes without regard to changes in configuration bits of RMUXs.

The process 1600 determines (at 1630) whether more configurations of RMUXs are required. If more routing configurations are required, the process returns to operation 1610. If no more routing configurations are required, the process defines (at 1640) the configuration values (in the layout) to be default values for all sub-cycles of any completely unused RMUXs. An completely unused RMUX is a RMUX that is unused in every reconfiguration cycle. In the routing process of some embodiments, the default value for an unused RMUX is zero; in the routing process of other embodiments the default value is one. In the routing process of still other embodiments, the default value is different for different RMUXs.

In some cases, after all RMUXs of a user design have been routed, there will be some RMUXs that are partly unused. That is, according to the layout, the RMUXs are used in some sub-cycles, but not used in other sub-cycles. In some embodiments, the process then defines (at 1650) the configuration values in the unused sub-cycles of the partly unused RMUXs to the same configuration values that the RMUXs have in the adjacent sub-cycles. This reduces the number of configuration bits changed and the corresponding energy consumption. However, because of the cyclical nature of the reconfigurations, for any RMUX with different configurations in any two sub-cycles, there will be two transitions from one configuration to another. There will be a transition from configuration A to configuration B, and a transition from configuration B to configuration A.

Once the routing process 1600 finishes setting (at 1650) the configurations for the unused sub-cycles of each configurable circuit, the process 1600 ends. In some embodiments, the placement and routing processes start with processes 1500 and 1600 and then continue as described in section VI., below.

The placement and routing processes of some embodiments run iteratively. The routing process may result in a situation where placed LUTs need to be moved. The routing process determines the routing for a layout to be implemented on a particular reconfigurable IC. Any particular reconfigurable IC has finite routing resources. Therefore, for example, if too many LUT configurations are placed in a particular part of the layout, the routing process may not have enough available routing capacity to handle all the placed LUTs. Changing the placement of some of the LUT configurations may resolve the issue. The placement and routing processes of some embodiments have other reasons for adjusting the placement of LUT configurations after the routing process. For example, adjusting the placement of LUTs may result in a need for more rerouting, so the placement and routing processes may run to replace and re-route a layout multiple times.

Some embodiments provide a separate post-placement and routing process for "cleaning up" any issues caused by the original placement and routing. Furthermore, as described in section VI, below, some embodiments may provide programs that perform other processes that affect placement and routing after the main placement and routing processes are finished.

The placement process 1500 and the routing process 1600 of some embodiments consider more than one reconfigurable circuit (as a potential location to place a configuration) when determining the increased or decreased cost of changing the configuration of a circuit from one sub-cycle to the next. The placement and routing processes of some such embodiments consider all configurable circuits in a particular group of configurable circuits (as potential locations to place a configuration). The placement and routing processes of some embodiments that do this are further described in section IV.D., below. In some such embodiments, the placement process 1500 and routing process 1600 impose a higher cost for adding circuits that are in rows with fewer reconfigurations (e.g., mostly empty rows). In some embodiments, the cost of adding reconfigurations of the first n LUTs in a particular group in a sub-cycle are increased relative to the cost of adding the last m LUTs in the particular group in that sub-cycle.

The placement and routing processes of some embodiments fill-in the "don't care" configurations with configuration values that are the same as the configuration values in a previous or a subsequent sub-cycle. Because of the filled-in configurations, the configuration bit values do not change from one sub-cycle to the next during the operation of the IC. That is, when the IC is running, the values in those configuration cells are the same for those sub-cycles.

FIG. 17 illustrates multiple configurations for unused sub-cycles that minimize configuration bit changes. The configuration bit changes are minimized in each of the examples. The placement and routing processes of various embodiments configure the unused sub-cycles for a configurable circuit in different manners. Furthermore, in some cases, the placement and routing processes of a single embodiment may configure the unused sub-cycles differently depending on the circumstances. The figure provides some examples of setting configurations for configurable circuits that are unused in various sub-cycles. However the examples are not exhaustive. The number of possible examples of configurations of unused sub-cycles with two or more used sub-cycles and one or more unused sub-cycles is larger than is shown here. Accordingly, other examples of filling in configurations are within the scope of the invention.

FIG. 17 includes configuration sets 1710, 1720, 1730, and 1740 planned in the layout for reconfigurable circuit 1750. The configuration sets 1710-1740 show the planned configurations of a reconfigurable circuit with 8-configuration bits over eight sub-cycles. The sub-cycles are indicated in FIG. 17 and in some other figures and in some places in the text by the letters "SC" followed by a number identifying the particular sub-cycle (e.g., "SC0" represents sub-cycle 0). The configuration sets 1710-1740 represent data in a layout being generated by the placement process. They are presented in columns (labeled B0 to B7 for "bit 0" to "bit 7") connected to reconfigurable circuit 1750 to conceptually illustrate that the data in the layout will eventually be used to configure actual circuits. Configuration set 1710 shows the configuration as set in the layout before operation 1550 (or 1650 if the circuit is a routing circuit). Configuration sets 1720-1740 show possible configurations defined in the layout by operation 1550 or 1650.

Configuration set 1710 shows that the placement and routing process has determined that the configurable circuit must be in configuration "A" in sub-cycle 3, and in configuration "B" in sub-cycle 6. In this figure, "A" and "B" represent two sets of configuration data that are different from each other. All "A" values in a given column are the same as the other "A" values in the same column, but not necessarily the same as the "A" values in the other columns. Similarly, all "B" values in a given column are the same as the other "B" values in the same column, but not necessarily the same as the "B" values in the other columns. The placement and routing processes have not determined a configuration for the configurable circuit in sub-cycles 0-2, 4-5, or 7. Accordingly, set 1710 shows these sub-cycles as "u" (unused). Given the cyclical nature of the reconfigurable circuits, in the actual operation of an IC, a sub-cycle 0 follows a sub-cycle 7 of a previous user design clock cycle. In configuration set 1710, the configuration transitions four times, from unconfigured to "A" (sub-cycle 2 to sub-cycle 3), from "A" to unconfigured (sub-cycle 3 to sub-cycle 4), from unconfigured to "B" (sub-cycle 5 to sub-cycle 6), and from "B" to unconfigured (sub-cycle 6 to sub-cycle 7).

Since the configurations in all sub-cycles except sub-cycle 3 and sub-cycle 6 are don't-cares in this example, the configuration in those sub-cycles will not affect the user design. Since the configuration will not affect the user design, the placement process 1500 (or routing process 1600) will set (at 1550 or 1650) the configurations of the unused sub-cycles to a configuration that reduces power use. In some embodiments, the placement or routing process fills in the unconfigured values with the configurations of "A" and "B" to reduce the number of transitions from one configuration to another. At some point after sub-cycle 3 and before sub-cycle 6, the configurable circuit must be reconfigured from "A" to "B". Similarly, at some point after sub-cycle 6 and before sub-cycle 3 (of the next user design clock cycle), the configurable circuit must be reconfigured from "B" to "A". The placement and routing processes of some embodiments determine in which sub-cycle to reconfigure a reconfigurable circuit on a case by case basis. Configuration sets 1720-1740 show some possible sequences of sub-cycle reconfigurations that all reduce the number of reconfigurations from four to two.

Set 1720 shows the results of operation 1550/1650 if the earliest used configuration determines the configuration in the unused sub-cycles. The reconfigurations take place between sub-cycles 5 and 6 and between sub-cycles 6 and 7. The sub-cycles that are unused but configured as configuration "A" are labeled as "Au" to differentiate them from sub-cycles in which the configuration "A" is actually used. This is merely a conceptual aid for the figure and does not indicate that "A" and "Au" are necessarily different configurations in the layout. Set 1730 shows the results of operation 1550/1650 in which the last used configuration determines the configuration in the unused sub-cycles. The reconfigurations take place between sub-cycles 2 and 3 and between sub-cycles 3 and 4. The sub-cycles that are configured as configuration "B", but unused, are labeled as "Bu". Set 1740 shows the results of operation 1550/1650 in which the unused configurations are set to the most recent used configurations. The reconfigurations take place between sub-cycles 2 and 3 and between sub-cycles 5 and 6.

In some embodiments, each of the configuration sets 1720-1740 represent the same total amount of energy consumption (assuming that configuration "A" consumes the same energy as configuration "B"), but that energy consumption is distributed among different sub-cycles in each of the configuration sets 1720-1740 (e.g., energy consumption is highest in whichever sub-cycle the reconfigurable circuit 1750 reconfigures in). Extra energy is used to transition from one configuration to another. In some embodiments, the unused sub-cycles are configured with some bits from one configuration and some bits from another, which spreads the increased energy consumption over different sub-cycles. However, some embodiments favor leaving configurations unchanged in as many rows/sub-cycles as possible. Section VI demonstrates why the placement and routing processes of some embodiments choose when to transition from one configuration to the next rather than having a specific rule such as "transition just before the configuration is first needed".

D. Emptying Rows During Initial Placement and Routing

As mentioned above, keeping the same select line "hot" over multiple sub-cycles conserves energy that would otherwise be lost to power the changing of the select lines. Accordingly, the placement and routing processes of some embodiments identify groups of circuits that are driven by a common select driver (sometimes called "rows"). The IC of such embodiments maintains the same select line of a particular select driver as "hot" during sub-cycles in which no circuit driven by that particular select driver needs to change. Circuitry for keeping the same select line hot is described in section V, below. The placement and routing processes of some embodiments increase the number of such cases by avoiding placing configurations in rows (i.e., groups of reconfigurable circuits driven by a common select driver) that do not already need to be reconfigured in a given sub-cycle.

Figure 18B:
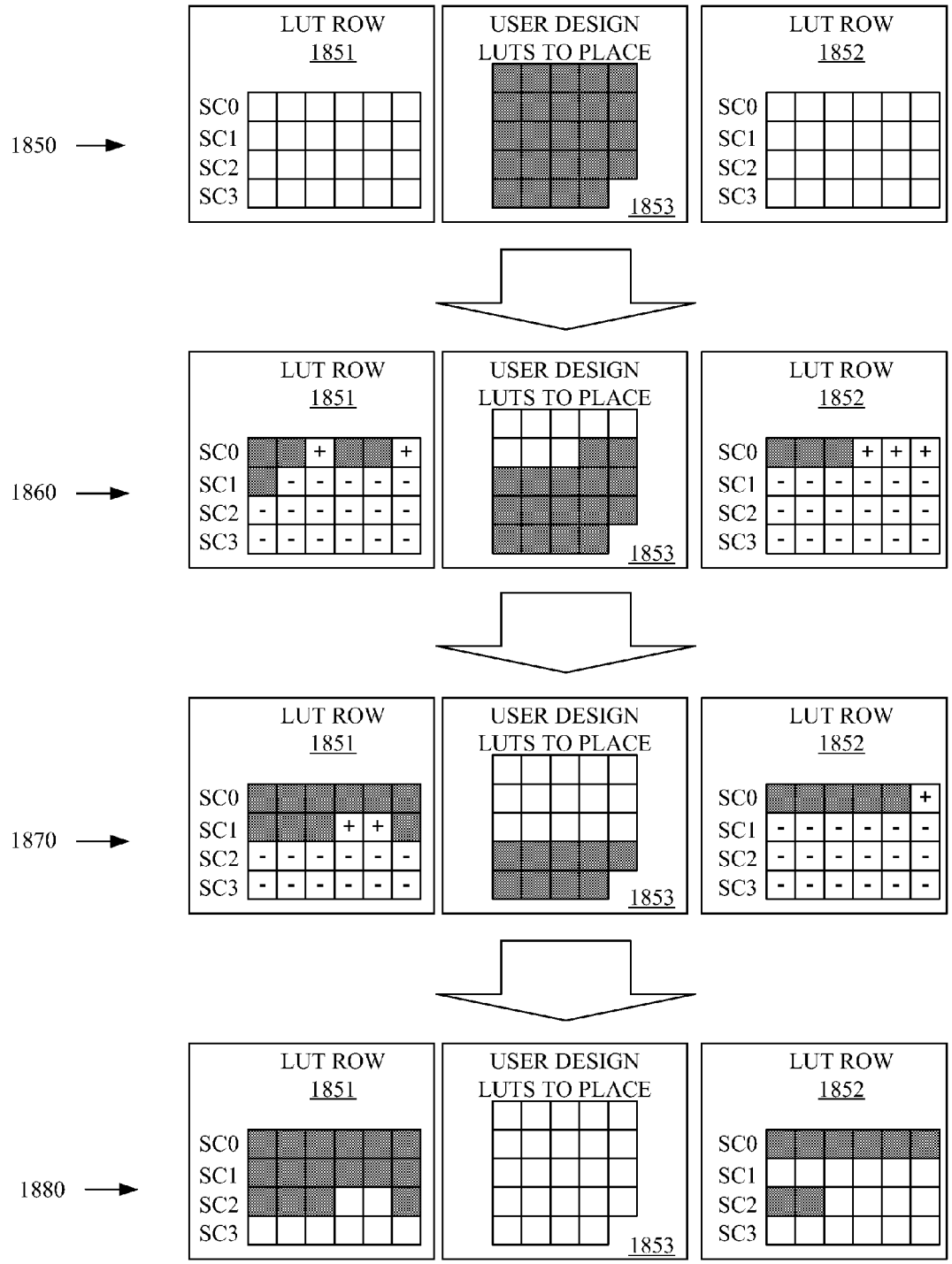

FIG. 18A illustrates the placement of logic circuits from a user design as configurations of LUTs and the routing of connections between logic circuits in the user design as configurations of RMUXs. FIG. 18A is a simplified example provided to conceptually illustrate how costs of adding a configuration to a tile increases or decrease depending on how full or empty (i.e., how many or few reconfigurations are required from the previous sub-cycle to the current sub-cycle) a row is. The example includes multiple rows of a single tile to be configured and only one sub-cycle in which to place configurations. For the sake of simplicity, the "empty" circuits in FIGS. 18A and 18B are all "don't care" configurations rather than "matching" configurations (configurations that match previous or subsequent configurations of the same circuits).

FIG. 18A includes user design 1800 with logic circuits 1805A-N, tile layout stages 1810, 1820, 1830, and 1840, IMUX-LUT rows 1811-1814, LUT 1815, RMUX rows 1841-1844, and RMUX 1845. User design 1800 conceptually illustrates a set of circuits to be emulated by configurations of reconfigurable LUTs. Circuits 1805A-1805N conceptually illustrate fourteen particular circuits to be placed by a placement process. Tile layout stages 1810, 1820, 1830, and 1840 represent the layout of a particular tile at different stages of the placement and routing processes. IMUX-LUT rows 1811-1814 illustrate rows of configurable logic circuits that the layout fills with configurations. In some embodiments, the configurable circuits are LUTs. In some embodiments, the configurable circuits are LUTs with IMUXs. LUT 1815 is the first LUT to be filled (i.e. to have its configuration set in the layout). RMUX 1845 is the first RMUX to be filled (i.e. to have its configuration set in the layout). As previously described, RMUXs configurably provide connections between the circuits of the configurable IC (e.g., LUTs, IMUXs, RMUX, conduits, etc.). For clarity, these connections are not shown in this figure.

During tile layout stage 1810, a configuration representing circuit 1805A has been placed for LUT 1815. As a result of this placement, IMUX-LUT row 1811 is fuller than any other row. In some embodiments, an almost empty row will be a less preferred location for placement than an almost full row, but at tile layout stage 1810, the choice is between an almost empty row 1811 and completely empty rows 1812-1814. Therefore, row 1811 is the preferred row for additional placements of circuits. This is conceptually illustrated by the plus symbols in the empty LUTs of row 1811 and the minus symbols in the empty LUTs of rows 1812-1814. As used in FIG. 18, a plus symbol represents a preferred location for placing a configuration and therefore a decreased cost, while a minus symbol represents a location that is not preferred for placing a configuration and therefore an increased cost.

In tile layout stage 1820, circuits 1805B-1805F have been placed. Circuit 1805D has been placed in row 1813, which had been completely empty. The placement of a circuit in an empty row when a more full row is available shows that in some embodiments factors other than how full or empty a row is determine placement during a placement process. In tile stage 1820, row 1811 is almost full and is therefore the most preferred row for placement. This is indicated by the pair of plus symbols in each empty LUT. In tile stage 1820, row 1813, with one full LUT is preferred over rows 1812 and 1814 which are completely empty. Accordingly, the empty LUTs of row 1813 are each marked with a single plus symbol, while the empty LUTs of rows 1812 and 1814 are each marked with a minus symbol.

In tile layout stage 1830, the placement process has just ended, and the routing process begins. The remaining circuits 1805G-1805N have been placed. Row 1811 is full, row 1813 is almost full and circuit 1805J has been placed in otherwise empty row 1814 for reasons other than the emptiness of the row. As all circuits are now placed, tile stage 1830 does not indicate preferred placement locations for LUTs.

In tile layout stage 1830, the routing process begins with the determination of a configuration of RMUX 1845 in RMUX row 1842. Since RMUX row 1842 is the least empty row, it is the preferred row for further configurations of RMUXs. This is indicated by the plus symbols in the empty RMUXs of row 1842 and the minus symbols in the empty RMUXs of rows 1841, 1843, and 1844.

Tile layout stage 1840 shows four levels of preferences for adding new configurations of RMUXs. Row 1842, with five RMUX configurations, is the most preferable, indicated by the pair of plusses in each RMUX. Row 1843, with four RMUX configurations is the next most preferable, indicated by the single plus in each RMUX. Row 1844 is almost empty, so it is less preferable than the more full rows, but more preferable than the completely empty row 1841. Therefore, row 1844 is marked with a single minus in each RMUX, while row 1841 is marked with two minuses in each RMUX.

As mentioned above, FIG. 18A is an example provided to conceptually illustrate how costs of adding a configuration to a tile increases or decrease relative to each other depending on how full or empty a row is. Placement and routing processes of some embodiments include many tiles and multiple sub-cycles. FIG. 18B illustrates the placement of configuration of multiple circuits on two LUT rows over four sub-cycles. The placements take into account a preference for placements in full rows. FIG. 18B includes layout stages 1850-1880. Layout stages 1850-1870 are stages before the completion of placement and routing at stage 1880. Each layout stage 1850-1870 illustrates the preferred rows for placement with plus symbols and the non-preferred rows with minus symbols. Each stage shows two LUT rows 1851 and 1852, and a representation 1853 of the remaining LUT configurations to be placed to implement the user design. The LUT rows have a loopered number of four so there are four sub-cycles in which configurations can be placed for each LUT. The sub-cycles are indicated here and in some other figures by the letters "SC" followed by a number identifying the particular sub-cycle (e.g., "SC0" represents sub-cycle 0).

In stage 1850, all twenty-four LUT configurations are unplaced as represented by the dark squares in representation 1853. Each LUT row 1851 and 1852 represents six physical LUTs into which configurations can be placed in any of the four sub-cycles. LUT rows 1851 and 1852 are empty.

In stage 1860, sixteen LUT configurations are unplaced as represented by the dark squares in representation 1853. LUT row 1851 is almost full in sub-cycle 0 and has one configuration in sub-cycle 1. LUT row 1851 is empty in sub-cycles 2 and 3. The placement process has increased the cost of adding configurations to the empty and almost empty sub-cycles and decreased the cost of adding configurations to the almost full sub-cycle. The increased and decreased costs are relative to some base cost for placing a configuration for a LUT. This is shown by plus signs indicating preferable locations for placement and minus signs representing less favorable locations for placement. Similarly, the fullest sub-cycle of LUT row 1852 is indicated as a preferable location for further placement. In some embodiments, sub-cycle 0 of LUT row 1851 is a more preferable location for placement than sub-cycle 0 of LUT row 1852 because sub-cycle 0 of LUT row 1851 is more full than sub-cycle 0 of LUT row 1852. Stage 1870 continues this trend with more full sub-cycles being preferred and emp-tier sub-cycles being less preferred. Stage 1880 illustrates the completed placement, which has three empty TOWS.

At the end of the placement process of some embodiments, some rows are still designated in the layout as entirely unused (i.e., "don't care") during a given sub-cycle. Because they are unused, their configuration will be irrelevant to the user design in the given sub-cycle. Because the configurations are irrelevant to the user design in the given sub-cycle, and because it takes extra energy to switch the select line to activate a different set of configuration circuits, the ICs of some embodiments "gate" the reconfiguration signal during that sub-cycle. Gating the reconfiguration signal means leaving the same select line (as the previous sub-cycle) active. Because the same select line is active, the configurable circuits in the row maintain the same configuration as in the previous sub-cycle. That is, the configurations of the previous sub-cycles are held over into the next sub-cycle. Holding over a configuration into an empty sub-cycle (during runtime of the IC) does not affect the functional operations of the user-design.

Gating a row during a particular sub-cycle does not leave the circuits in that row unconfigured during that sub-cycle. Gating a row leaves the circuits in that row with the same configuration as the previous sub-cycle. Therefore, in addition to gating rows with only "don't care" configurations, some embodiments also gate reconfiguration signals for "empty" rows that contain only configurations that are either unused or identical to the configurations of the same row in the previous sub-cycle. That is, since gating maintains the same configuration over multiple sub-cycles, a row that is unchanged from one sub-cycle to the next can be gated, just like a row whose circuits are all "don't care" from one sub-cycle to the next. Accordingly, some embodiments incentivize placement of identical configurations for a circuit in adjacent sub-cycles or penalize placement of non-identical configurations in adjacent sub-cycles. Gating of reconfiguration signals is further described below.

V. Sub-Cycle Reconfiguration Signal Gating

As described above, the fewer configuration bits of a reconfigurable circuit that are changed from one sub-cycle to the next, the less energy is used. In some embodiments, a reconfigurable circuit that does not have any configuration bits changed in a given sub-cycle presents an opportunity for saving even more energy.

As previously shown in FIG. 10, extra energy is required to change from one active select line to another, even if the end result is a configuration bit with the same value as in the previous cycle. In cases where a configuration bit is supposed to change values from one sub-cycle to the next, the next select line of the configuration selecting multiplexer (e.g., multiplexer 735 in FIG. 7) is activated to produce that change. For example, if a configuration bit is supposed to be "0" in sub-cycle 1 and "1" in sub-cycle 2, then the select line connecting to the sub-cycle 1 configuration cell (that stores a "0") is turned off and the select line connecting to the sub-cycle 2 configuration cell (that stores a "1") is turned on. In that example, leaving the select line for sub-cycle 1 on instead of switching to the select line for sub-cycle 2 would result in the configuration bit being incorrect in sub-cycle 2 (i.e. still "0" instead of changed to "1").

However, in configurations where a configuration bit is not supposed to change from one sub-cycle to the next, keeping the same select line active does not produce the wrong configuration bit in sub-cycle 2. For example, if a configuration bit is "1" in both sub-cycle 1 and sub-cycle 2, then the configurable circuit would receive the correct bit "1" in sub-cycle 2, whether the multiplexer supplied a connection to the sub-cycle 1 configuration cell (that stores a "1") or a connection to the sub-cycle 2 configuration cell (that also stores a "1"). Therefore, switching the select line (or not switching the select line) from sub-cycle 1 to sub-cycle 2 would make no difference to the configuration of that particular bit of the configurable circuit. Accordingly, some embodiments provide circuitry that maintains the same active select line as long as none of the configuration values driven by a particular select driver change from one sub-cycle to the next. Maintaining the same active select line through a sub-cycle (for a particular set of circuits) is sometimes referred to herein as "skipping the sub-cycle". For example, if the select line for sub-cycle 0 is kept hot through sub-cycle 1, for brevity that may be described as "skipping SC1".

There are at least three circumstances in which none of the configuration values driven by a particular select driver change. The first circumstance is when each configurable circuit driven by that select driver uses the same configuration in both sub-cycles. In that case, the configuration doesn't need to change when the sub-cycle changes because the configuration is already set to what it is supposed to be in the second sub-cycle. The second circumstance is when each configurable circuit driven by that select driver is unused in a particular sub-cycle. If a configurable circuit is unused in a sub-cycle, the configurable circuit doesn't have a configuration that it is supposed to have in that sub-cycle, so any configuration can be provided without affecting the user design. For an unused configurable circuit, the output of the configurable circuit is irrelevant. Accordingly, the configuration which affects that output is also irrelevant. The third circumstance is when all configurable circuits driven by a particular select driver either use the same configuration as in the previous sub-cycle or are unused. In such a case, some configurations don't need to change because the circuits are unused, and some don't need to change because the circuits are already configured correctly.

Figure 19A:
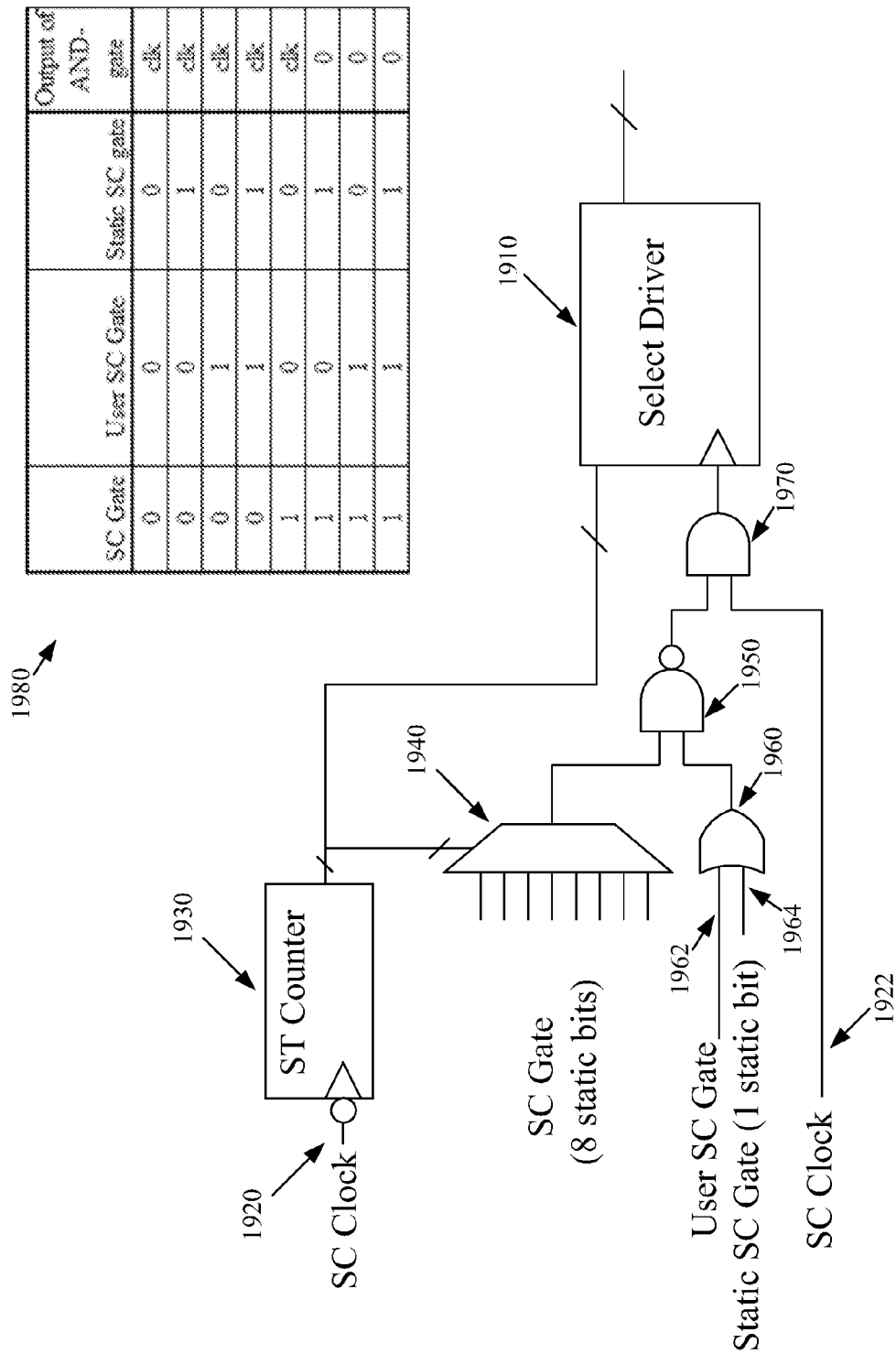
FIG. 19A illustrates a set of circuits for driving select lines of a one-hot multiplexer that selectively maintains the select line of a previous sub-cycle.

In some embodiments, when no circuits in a row are due to change configuration in a reconfiguration cycle, the select driver for that row maintains the same select line (as in the previous sub-cycle) as active. FIG. 19A illustrates gating circuits that selectively maintain the select line of a previous sub-cycle. As shown in this figure, the circuitry 1900 includes a select driver 1910, input lines 1920 and 1922, a space-time (ST) counter 1930, a sub-cycle (SC) gate 1940, a NAND-gate 1950, an OR-gate 1960 with inputs user SC gate 1962 and static SC gate 1964, an AND-gate 1970, and a logic table 1980.

The select driver 1910 drives select lines for selecting among the pre-loaded configurations of its associated reconfigurable circuits (e.g., reconfigurable LUTs, RMUXs, etc.) during specific sub-cycles. The input lines 1920 and 1922 receive signals from a sub-cycle clock. The ST Counter 1930 keeps track of which sub-cycle the IC is implementing. The SC gate 1940 is a multiplexer connected to data storage units that store data relating to the configuration in each sub-cycle. NAND-gate 1950 outputs a negative result when both of its inputs are positive and a positive result otherwise. OR-gate 1960 outputs a positive result if either of its inputs is positive and a negative result if neither of its inputs is positive. Input 1962 receives a signal from a user sub-cycle gate and input 1964 receives a signal (e.g., a configuration bit value) from a static sub-cycle gate. AND-gate 1970 outputs a positive result if both its inputs are positive and a negative result otherwise.

Logic table 1980 shows which sets of inputs from various sources will allow or block the sub-cycle clock signal on input line 1922.

During sub-cycles in which no configuration of any configurable circuit driven by a particular select driver is changed, the illustrated circuitry saves power by not changing select lines during that sub-cycle. In the course of implementing a user design, the ICs of some embodiments go through many instances of each sub-cycle. For example, in some embodiments, the IC goes through multiple user design clock cycles, and each user design clock cycle includes one instance of each sub-cycle. In some embodiments, a set of configurable circuits driven by a select driver is used in some instances of a sub-cycle, but not in other instances of that sub-cycle. For example, a set of circuits could be configured in the layout as an adder in sub-cycle 3. During runtime of the IC, the adder may not be used in sub-cycle 3 of every user design clock cycle. A program running on the user design implemented by the IC may identify times when the adder is not used. The circuitry in this figure can receive a user signal that indicates that the select driver doesn't need to change select lines for a particular instance of sub-cycle 3 (or any particular sub-cycle). The circuitry can also receive a signal from a static SC gate to tell the circuitry that the select driver doesn't need to change select lines for any instance of sub-cycle 3.

Like the select driver 830 in FIG. 8, the select driver 1910 receives signals from an ST counter 1930 that identifies the current sub-cycle. The select driver 1910 drives select lines, each of which corresponds to a particular sub-cycle. For brevity, the select line that corresponds to sub-cycle 0 will be referred to as select line 0, and so forth. However, unlike the select driver 830 in FIG. 8, the select driver 1910 is gated. That is, rather than always switching from driving the select line corresponding to the previous sub-cycle to the select line corresponding to the current sub-cycle, the select driver 1910 changes the active select line only when it also receives a clock signal through AND-gate 1970.

For example, if the ST counter 1930 sends a signal indicating that the current sub-cycle has changed from sub-cycle 4 to sub-cycle 5 and the AND-gate 1970 passes a clock signal to select driver 1910 in that sub-cycle, then the select driver 1910 will switch from driving select line 4 to driving select line 5. In contrast, if the ST counter 1930 indicates a change from sub-cycle 4 to sub-cycle 5, but AND-gate 1970 does not pass a clock signal in that sub-cycle, then the select driver will continue to drive the same select line (select line 4) as in the previous sub-cycle. That is, the select driver 1910 will continue to drive the same select line until it receives a clock signal through AND-gate 1970. Once the select driver 1910 receives a clock signal through AND-gate 1970, the select driver 1910 will switch the active select line to the select line for the then current sub-cycle. So, if the clock is blocked in sub-cycles 5-6 and unblocked in sub-cycle 7, then select line 4 will be active during sub-cycles 4-6 and select line 7 will be active in sub-cycle 7.

The circuitry connecting to the upper input of the AND-gate 1970 ensures that the clock signal passes through AND-gate 1970 in sub-cycles in which the configuration bits controlled by the select driver 1910 are supposed to change. The circuitry also ensures that the clock signal does not pass through the AND-gate 1970 in sub-cycles in which the configuration bits controlled by the select driver 1910 are not supposed to change. Configuration cells (not shown) connected to the inputs of SC gate 1940 store data for each sub-cycle. The data identify sub-cycles in which no circuits driven by select driver 1910 need a change of configuration.

Figure 21:
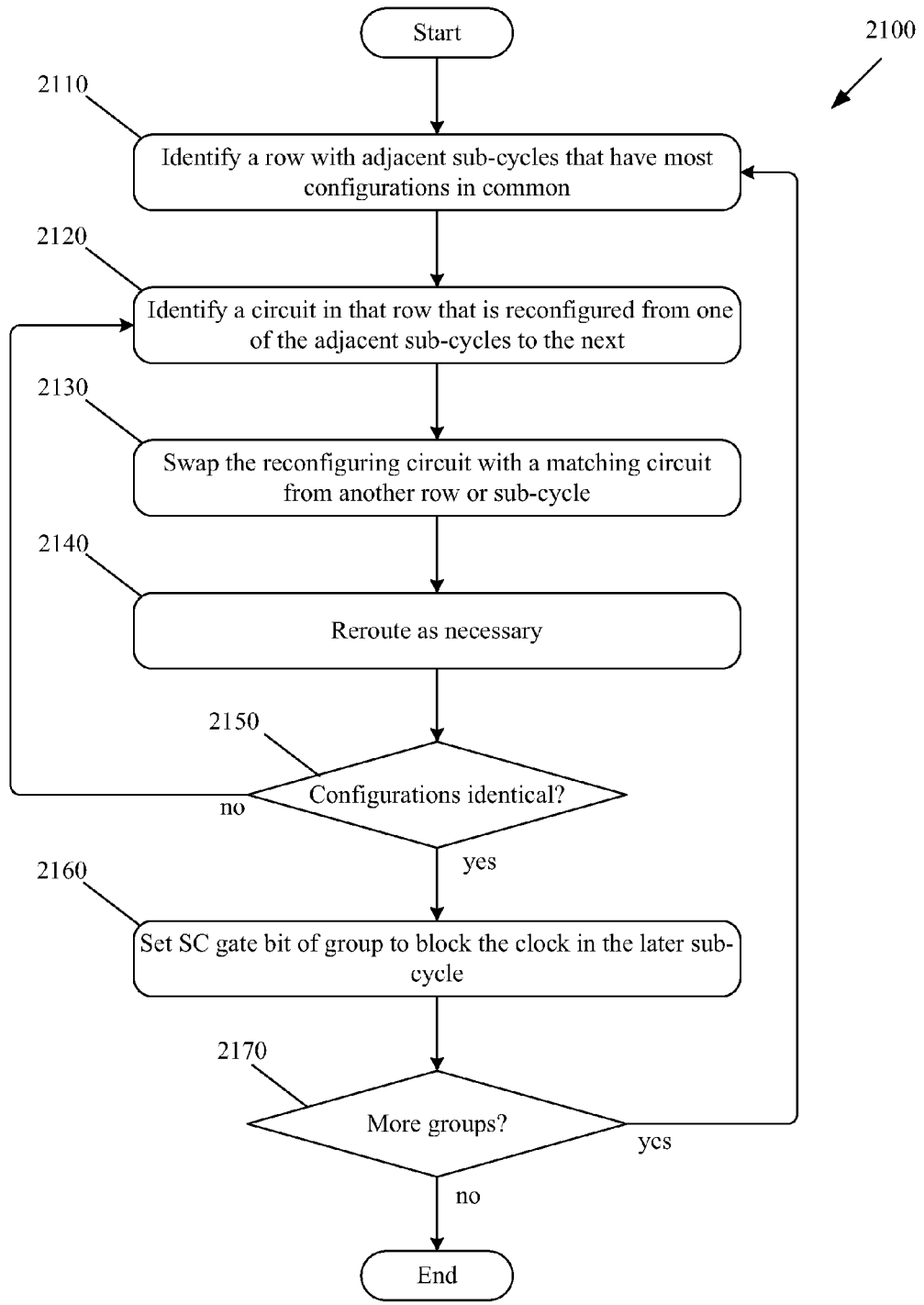
FIG. 21 illustrates a process of some embodiments that reduces the number of configuration changes for previously placed rows of circuits.

This figure illustrates an SC gate 1940 with eight inputs for an eight loopered system. However, SC gates for systems with other looper numbers may have other numbers of inputs. The placement and routing processes of some embodiments identify the sub-cycles in which no reconfiguration of circuits driven by select driver 1910 is needed. The placement and routing processes of some embodiments define configuration values to store in the configuration cells of SC gate 1940 based on the identified sub-cycles. For example, in the embodiment of FIG. 19A, the placement and routing processes define the configuration values of the SC gate to be "1" when no reconfiguration of circuits driven by select driver 1910 is needed. An example of such placement and routing processes is illustrated in FIG. 21, below.

The gating circuitry illustrated in FIG. 19A uses other inputs in combination with the data in the SC gate 1940 to determine whether to block the clock signal. Here, the SC gate 1940 and at least one of the inputs 1964 and 1962 of OR-gate 1960 must cooperate to block the clock signal. This is shown in logic table 1980. The clock signal passes through AND gate 1970 unless the output of the SC gate 1940 is "1" and at least one of the User SC gate (input 1962) and the Static SC gate (input 1964) is "1".

If the SC gate 1940 is set to "1" for a particular set of sub-cycles, then it is possible to block the clock signal from reaching the select driver 1910 in that particular set of sub-cycles. The clock signal of some embodiments can be blocked at every instance of the sub-cycles in that particular set. The clock can be blocked at some instances of the sub-cycles in that particular set and allowed to pass in other instances of the sub-cycles of that particular set in some embodiments. The gating circuitry illustrated in FIG. 19A allows the clock to be blocked either in every instance of any given sub-cycle or in instances selected by the user design.

In some embodiments, the Static SC gate on input 1964 will be defined to be "1" by the placement and routing processes (e.g., performed by a computer program) when there are no sub-cycles in which the clock input of the select driver 1910 needs to be blocked intermittently. If the static SC-gate is set to "1", then the configurable circuit will not be reconfigured in any sub-cycle in which the SC gate 1940 is set to "1". Alternatively, if there are sub-cycles in which the clock input of the select driver 1910 needs to be blocked intermittently, the Static SC gate 1964 will be defined to be "0" by the placement and routing program and the User SC gate will be set to "1" by a user-signal whenever the output of the configurable circuit is not relevant. For example, the User SC gate will be set to "1" when a program running on the configurable IC will be unaffected by the output of that configurable circuit, either because the circuit is never used in that particular sub-cycle or because the output happens to be irrelevant in a specific instance of that sub-cycle.

Figure 19B:
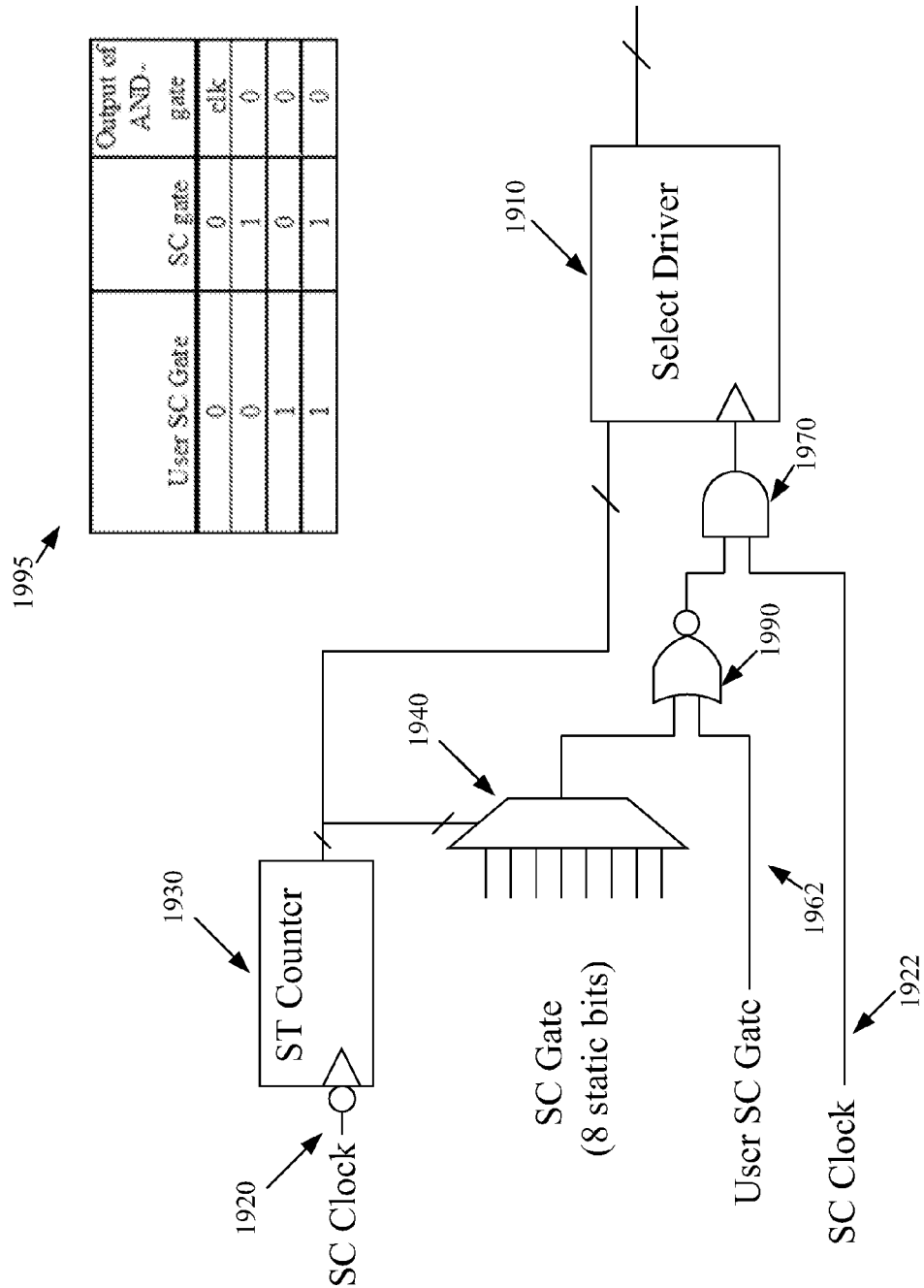
FIG. 19B illustrates an alternate set of circuits for driving select lines that allows the user design to unilaterally block reconfiguration of a row of circuits.

While the IC of some embodiments use the specific circuits shown in FIG. 19A, in the IC of other embodiments, different arrangements of circuits are implemented to control when the clock input of the select driver will be blocked. For example, the gating circuitry of some embodiments uses an SC gate to determine in which sub-cycles to skip reconfiguration by blocking the clock signal without a NAND gate 1950 or OR gate 1960. FIG. 19B illustrates an alternate set of circuits that allows a signal from the user design to unilaterally block reconfiguration for a row of circuits. In this figure, AND-gate 1960 and the Static SC gate input 1964 are omitted and NAND-gate 1950 has been replaced with NOR-gate 1990. Logic table 1995 shows which sets of inputs from various sources will allow or block the sub-cycle clock signal on input line 1922. Logic table 1995 replaces logic table 1980 because the circuits that determine whether to block the clock signal are different in FIGS. 19A and 19B.

The set of circuits shown in FIG. 19A can skip reconfiguration of the reconfigurable circuits (not shown) driven by select driver 1910 in specific sub-cycles (e.g., sub-cycles 1, 3, and 6). This happens when the SC gate for that cycle is set to skip those cycles and the static SC gate (always on or always off according to its configuration setting) is set to allow gating. Alternatively, it can happen when the SC gate for that sub-cycle is set to skip those sub-cycles and the User SC gate (set on or off by a user design signal) is set to allow gating.

However, the set of circuits in FIG. 19A does not allow both (1) gating in particular sub-cycles in all user cycles and (2) gating all sub-cycles; unless the user design takes full control in every sub-cycle. For the gating circuitry illustrated in FIG. 19A, the only way to (1) skip reconfiguration in sub-cycles 1, 3, and 6 in every user cycle and (2) skip all sub-cycles in some user cycles is to have all the SC gate bits set to allow gating and turn the User SC gate on only in SC1, SC3, and SC6 during user cycles when the circuit is in use and turn the User SC gate on in all sub-cycles during user cycles when the circuit is not in use.

In contrast, in the gating circuitry illustrated in FIG. 19B, the sub-cycle gating bits defined in the layout of the IC gate the clock in the specific sub-cycles and the user design can send a signal to just switch off the clock for all sub-cycles. In the IC of some embodiments that use the gating circuitry illustrated in FIG. 19B, the user design signal is only activated for an integer number of user cycles.

Gating for a full user cycle is one way to ensure that once the user design allows the circuits to reconfigure again, the configuration has the intended value. For example, configurations could be set only in SC5, SC6, and SC7. The select driver could be gated in SC 0-4 (in every user cycle) due to the sub-cycle gating bits. In such a case, the reconfigurable circuit driven by the select driver would reconfigure in sub-cycles 5-7 and would maintain the configuration set in SC7 for sub-cycles 0-4). A user design signal that blocks reconfiguration for exactly ten user cycles blocks every reconfiguration from SCn in one user cycle to SC(n−1) ten user cycles later (where n is an integer from 0 to 7 and n−1 represents the previous sub-cycle e.g., if n=0 then n−1=7). For ten user cycles, the configuration would remain as it was set in SC(n−1) of the user cycle in which the user design signal was first received. When the user signal gating ends at the beginning of SCn (ten user cycles later), the reconfigurable circuit still has the configuration of SC(n−1) (from ten user cycles before). The user design signal is not the only signal that can block the select driver from reconfiguring. Accordingly, if the user design signal ceases during a sub-cycle that is gated due to the setting of the SC gate, then the configuration will be maintained until the next sub-cycle in which the reconfigurable circuit is scheduled to reconfigure (by the SC gate).

When using the gating circuitry of FIG. 19B, if SCn is sub-cycle 5, 6, or 7, then the removal of the user design gating signal allows the circuit to reconfigure right away (to the configuration of SCn). If SCn is sub-cycle 0, 1, 2, 3, or 4, then the row does not reconfigure because the select driver is still gated in SCn due to the static SC gate settings. Since the row has not reconfigured since SC(n−1) of ten user cycles before, the row is still in the same configuration as it would have been without the user signal gating. For example, if n is "2" then the user design signal started gating the select driver after sub-cycle 1. In sub-cycle 1, the select driver had been gated by the SC gate since SC0 and therefore still had the same configuration as in SC7 (of the previous user cycle). That configuration would be maintained (because of the user design signal)

until SC2 (ten cycles later). In SC2, the configuration is supposed to be the same as configuration SC7 (ordinarily because the SC gate settings blocked reconfiguration since SC7). Therefore the configuration will be what it should be after the user design signal is removed.

In contrast, if the user design gating signal is not maintained for an integer number of user cycles, some other provisions for reconfiguring after a user design gating signal ends can be made. Otherwise, the wrong configuration will be set after the user design gating signal ends. For example, configurations could be set in SC5, SC6, and SC7, while SC 0-4 are gated (and thus maintain the same configuration as set in SC7). The user design signal could be gated from SC6 in one user cycle to SC0 ten user cycles later (i.e., not an non-integer multiple of the number of user cycles).

The select driver is first gated (by the user design signal) at SC6. Accordingly, the configuration for the select driver's reconfigurable circuit is set in of SC5 and maintained until the user design signal is turned off in SC0 (ten user cycles later). At SC0 (ten user cycles later), the user design signal is switched off, but the select driver is still gated because the configuration of the SC gating bits blocks reconfiguration in SC 0-4. Therefore, the configurable circuit does not reconfigure immediately upon the removal of the user design signal. The reconfigurable circuit (because of the user design signal) still has the configuration set back in SC5 of the original user design cycle. The configuration in SC 0-4 should be the same as the configuration of SC7. The configuration after the user design signal ends is the configuration of SC5, not SC7 (which it is supposed to be).

If the entire row is "don't care" in SC 0-4, then the mismatch between the intended configuration (the configuration of SC7) and the actual configuration (the configuration of SC5) does not affect the user design. However, if any reconfigurable circuit in the row is used in any of SC 0-4 and is defined in the layout as having the same configuration as in SC7 (e.g., the same configuration for that circuit as SC7 is actually needed, rather than "don't care"), then that circuit may give erroneous results.

The user design gating signals of some embodiments are sent out on a per tile basis. That is, each tile has a separate user design gating signal common to all rows in that tile. In such embodiments, an entire tile can be gated when the tile is unused in a particular user cycle. For example, if an entire tile is dedicated to a set of adding operations that are only used once every thirty seconds, the common user design gating signal for all rows on that tile blocks the entire tile from reconfiguring except when the tile is used (once every thirty seconds). Furthermore, in some embodiments, a user design gating signal can be used with gating circuits even when the IC does not gate individual sub-cycles (e.g., with no SC Gate 1940 and NOR-gate 1990).

Figure 20:
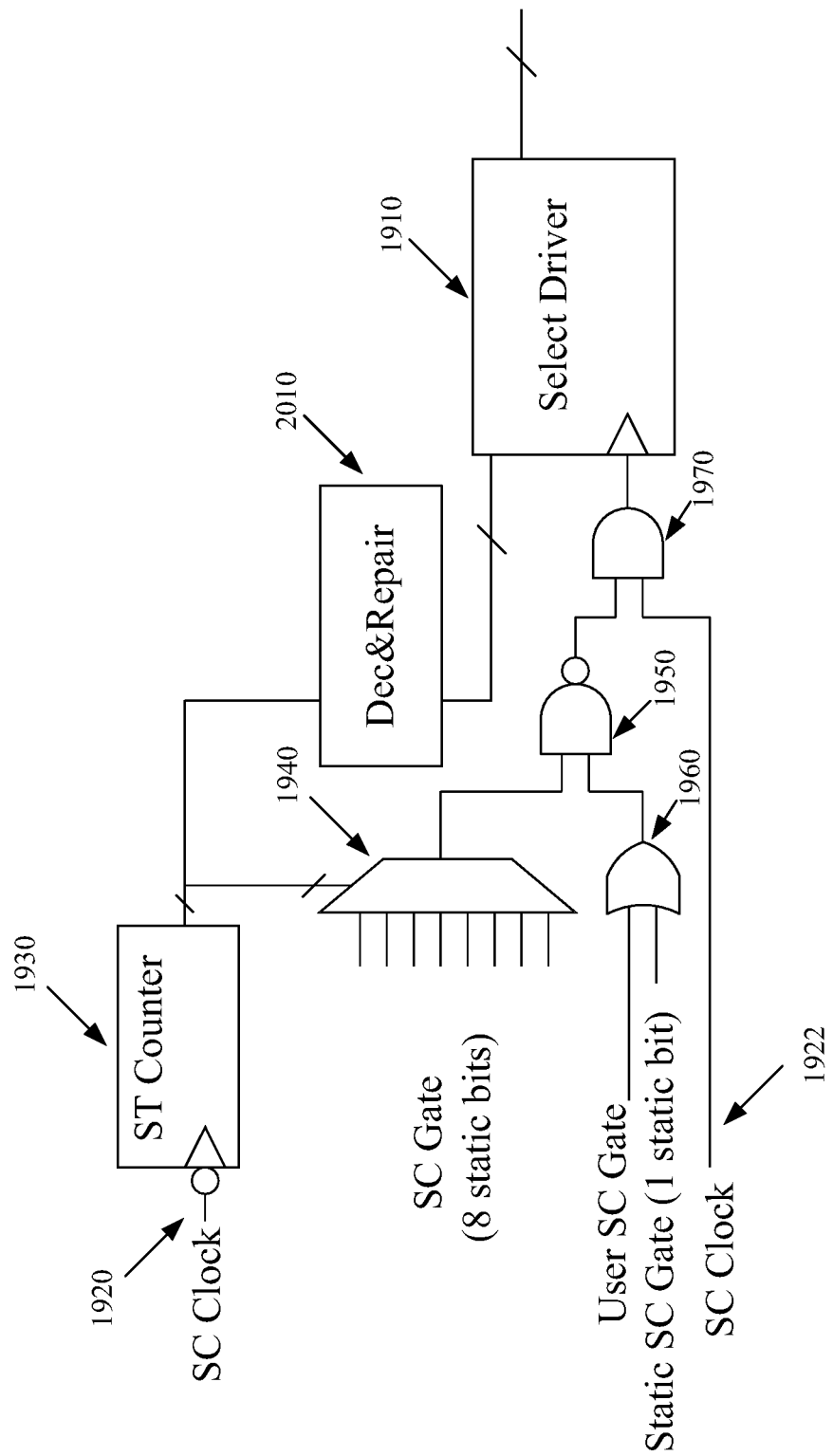
FIG. 20 illustrates another embodiment of circuits for driving select lines of a one-hot multiplexer that selectively maintains the select line of a previous sub-cycle.

FIG. 20 illustrates circuits of another embodiment for driving select lines of a one-hot multiplexer that selectively maintains the select line of a previous sub-cycle. The embodiment in this figure includes a set of decode and repair circuits 2010 between the SC counter 1930 and the select driver 1910. In the IC of some such embodiments, these decode and repair circuits 2010 command the select driver 1910 to use a spare select line, rather than one of the standard select lines under certain conditions. For example, the IC of some such embodiments includes a select driver with 9 lines for an eight-loopered scheme. The select drivers of such embodiments use 8 of the lines under normal circumstance (i.e., when all parts of the reconfiguration system for a given row of reconfigurable circuits are working). However, under circumstances in which there is some problem with one of the usual 8 lines, the decode and repair circuits 2010 would command the select driver to use the spare select line and to avoid using a damaged select line, damaged configuration selecting multiplexers along the select line to be avoided, or damaged configuration cells.

VI. Placement and Routing for Gated Select Drivers

A. Gating Entire Rows of Circuits

The preceding section described a gated select driver that doesn't switch select lines when the configuration of a configurable circuit is unchanged from one sub-cycle to the next. Each select driver in some embodiments drives multiple configurable circuits. That is, the select lines driven by a given select driver determine the active configuration storage cells for more than one configurable circuit. In the IC of some embodiments, these groups of circuits with common select lines are arranged in rows on a tile of the IC. The rows of some embodiments each contain multiple reconfigurable circuits (although the reconfigurable circuits in the rows of some embodiments may not be physically aligned with each other). Each of the reconfigurable circuits in a row is selectably connected to multiple sets of configuration cells. The IC of some embodiments has multiple rows of configurable circuits on each of multiple tiles arranged in an array on the IC.

The select driver gating circuits illustrated in FIG. 19A can be used in embodiments in which the select drivers control the configuration of multiple configurable circuits. In such embodiments, a select driver changes the active select line in any sub-cycle in which any configurable circuit driven by that select line requires a configuration change. The entire row of circuits driven by the gated select driver undergoes a select line change when even a single bit of any circuit driven by that gated select driver is reconfigured. Accordingly, the select lines of such embodiments should only be left unchanged in sub-cycles when no configuration bit driven by that select driver needs to be reconfigured.

There may be rows that are empty through default behavior of placement and routing processes, particularly when few circuits need to be placed and routed in order to implement a particular user design. For example, if implementing the user design uses significantly fewer LUTs than the number available on the IC, there may be large areas of the IC that are unused in most sub-cycles. In such circumstances, circuitry for gating the reconfiguration signals would be useful even without placement and routing processes that increase the opportunities for gating. Simply gating the rows that happen to be empty would save power.

However, user designs that require larger numbers of LUTs reduce the number of fortuitous opportunities to skip a reconfiguration of a row of LUTs. Accordingly, the placement and routing processes of some embodiments are designed to increase the number of "empty rows". That is, the processes increase the number of instances in which the configurations of a row of reconfigurable circuits (with a single select driver) are unchanged from one sub-cycle to the next. This increases the number of times that reconfiguration signals can be gated when implementing a given user design.

B. Placement and Routing to Increase Gating Opportunities

As mentioned above, even a single changed configuration bit in an entire row of configurable circuits with a common select driver precludes gating. Therefore, some embodiments provide a modified placement and routing process to implement a large increase in the cost of placing a different configuration from one sub-cycle to the next for any circuit in a row of circuits whose select lines are driven by the same select driver.

Some embodiments provide a modified version of the placement and routing processes 1500 and 1600 previously shown in FIGS. 15 and 16. In some such embodiments, software that implements the placement and routing processes has data that identifies which groups of circuits use a common select driver. A group of circuits that use a common select driver is called a "row", herein, whether or not the group is physically in a row. FIGS. 18A and 18B, in section IV.D., above illustrate placement and routing that increases the number of empty rows in a layout. The set of sub-cycles of the same circuit may be referred to as a "column" of configurations.

For ease of description, the configurable circuits in FIGS. 18A and 18B were previously described as being either full or empty. In the description of FIGS. 18A and 18B, a "full" configurable circuit was a configurable circuit in the layout that had been assigned a configuration, while an "empty" configurable circuit was a configurable circuit that had not been assigned a configuration (i.e., a "don't care" configuration). In the description of FIGS. 18A and 18B, the placement and routing processes increased the cost for placing any configuration in a row that was otherwise "don't care". That description did not consider the specific configurations to be placed when increasing the cost of placing configurations, but instead increase or decrease the cost based on how full or "don't care" the rows were.

However, the placement and routing processes of some embodiments do not use "full" or "don't care" as the only relevant conditions for determining the cost of placement. As previously described, in some embodiments, a select driver can be gated (skipping the reconfiguration) for a row in which the configuration does not change from one sub-cycle to the next. Also as previously noted, configurations can be unchanging either because they are "don't care" configurations or because they are matching configurations. Therefore, the placement and routing processes of some embodiments increase the cost of placing non-matching configurations in a mostly "don't care" row. However, the placement and routing processes of such embodiments do not increase the cost of placing a matching configuration in a mostly "don't care" row. In fact, the placement and routing processes of some embodiments actually decrease the cost for placing matching configuration. That is, the placement and routing processes of such embodiments preferentially select "matching" configurations as much as or more than preferentially selecting "don't care" configurations. Placement and routing processes of other embodiments increase the cost of placing matching configurations, but do not increase the cost for placing matching configurations as much as they increase the cost for placing non-matching configurations.

C. Post Placement and Routing Processing

The placement and routing processes of some embodiments add additional operations after initial placement and routing that changes the initially determined layout to reduce the number of times that rows of circuits with common select drivers have to be reconfigured. FIG. 21 illustrates a process 2100 of some embodiments that reduces the number of configuration changes in a placed row. Some operations of FIG. 21 are illustrated with respect to FIGS. 22, 23, 24, and 25.

Figure 22:
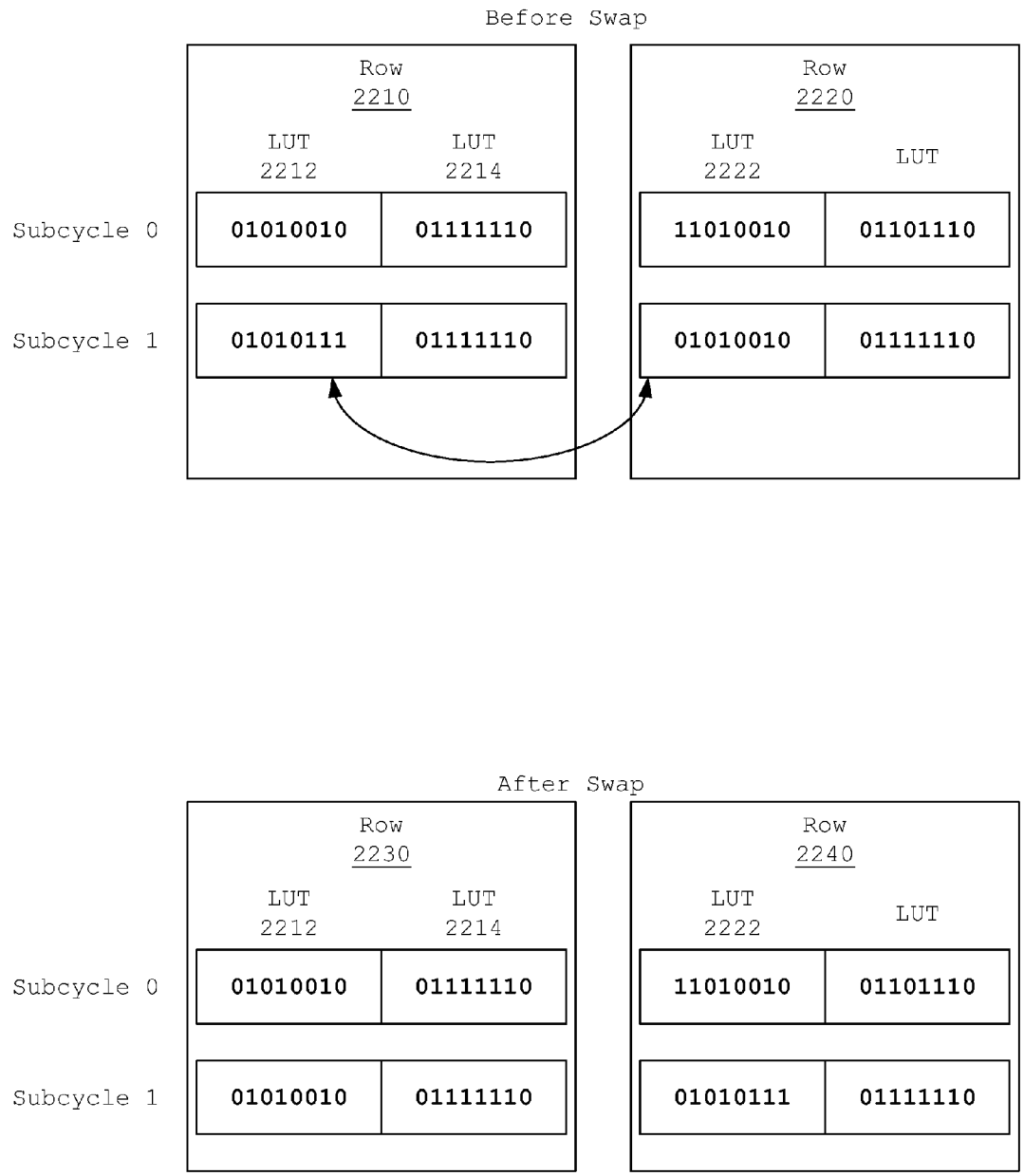
FIGS. 22 and 23 illustrate part of a layout of planned configurations before and after the planned configurations of LUTs in the layout are swapped.
Figure 23:
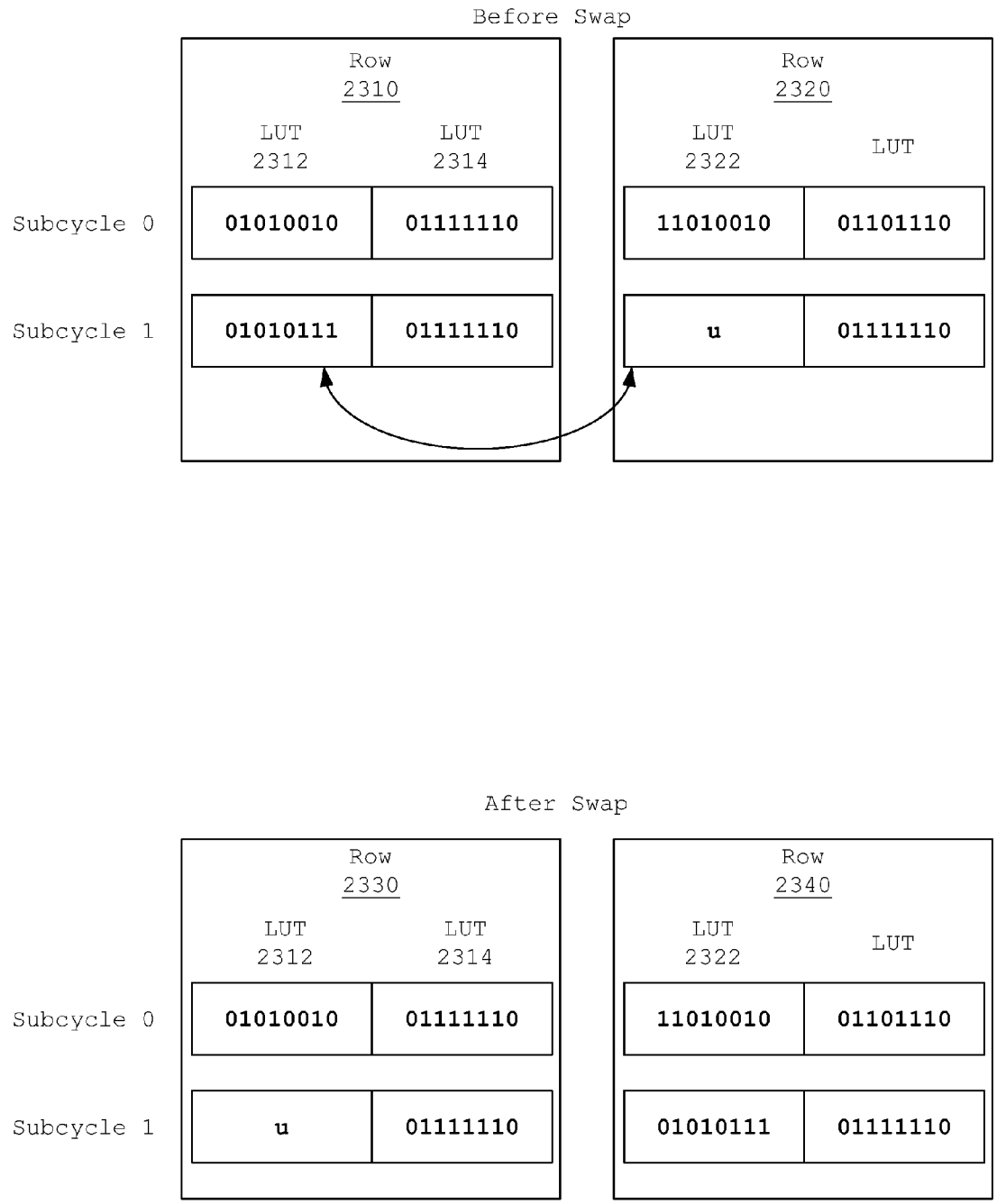

The process 2100 includes an operation that swaps configurations of two reconfigurable circuits in the layout. FIGS. 22 and 23 illustrate part of a layout of planned configurations before and after the planned configurations of LUTs in the layout are swapped. The planned configurations in these figures show the starting and ending states of two rows of LUTs (e.g., representing two rows on the IC, each row with its own select driver) in a layout that has already been placed. FIGS. 22 and 23 show how a post-placement process "empties" a sub-cycle of a LUT row. Specifically, the figures show how the process 2100 swaps an unmatching configuration for a matching configuration taken from another row. In some embodiments, a LUT configuration can be partly identical and partly "don't care". For example, in a given sub-cycle, the first four configuration bits of a LUT with eight configuration bits could be "0101" while the last four configuration bits could all be "don't care". Such a configuration would match any LUT with the first four bits "0101" (e.g., configuration "0101uuuu" would match either "01011111" or "01011010"). However, as is the case in FIGS. 22 and 23, in some embodiments, each reconfigurable circuit (e.g., a LUT) either has all of its configuration bits defined or all of its configuration bits "don't care" in any given sub-cycle. Such embodiments do not have reconfigurable circuits (e.g., LUTs) with some configuration bits defined and some configuration bits "don't care".

FIG. 22 includes pre-swap LUT row 2210, pre-swap LUT row 2220, post-swap LUT row 2230, and post-swap LUT row 2240. LUT rows 2210 and 2230 include LUTs 2212 and 2214. LUT rows 2220 and 2240 include LUT 2222. The layout's planned configuration bits for the LUTs, before and after the placement and routing process swaps them, are shown in two adjacent sub-cycles. FIG. 23 includes pre-swap LUT row 2310, pre-swap LUT row 2320, post-swap LUT row 2330, and post-swap LUT row 2340. LUT rows 2310 and 2330 include LUTs 2312 and 2314. LUT rows 2320 and 2340 include LUT 2322. Configuration bits for the LUTs before and after the swaps are shown in two adjacent sub-cycles. Configurable circuits in the layout that are not used in one sub-cycle are defined in some embodiments to be the same configuration as an adjacent sub-cycle, but the placement and routing processes keep track of their "unused" status and update the configurations when they are moved. In FIG. 23, the unused status of LUT 2322 is indicated by the "u" over the configuration bits in pre-swap sub-cycle 1 for LUT 2322 and post-swap sub-cycle 1 for LUT 2312. FIGS. 22 and 23 show two rows, two configurable circuits per row and two sub-cycles. In the IC of some embodiments, larger numbers of rows, configurable circuits per row, or sub-cycles are used. The IC of some embodiments uses multiple circuit types in a given row of circuits with a common select driver. For example, the IC of some embodiments has a row that is driven by a common select driver in which the row contains both RMUXs and LUTs. Further descriptions of the elements of these figures will be provided in context of process 2100 of FIG. 21.

The process 2100 identifies rows of circuits in the layout whose planned set of reconfigurations can be changed in order to increase the number of rows that can skip one or more reconfigurations. The process 2100 begins by identifying (at 2110) a row with adjacent sub-cycles that have the most matching configurations. As mentioned above, configurations of a circuit "match" from one sub-cycle to the next if the configuration is an identical configuration, or an unused configuration.

In FIG. 22, pre-swap LUT row 2210 includes LUT 2214, which keeps the same configuration from sub-cycle 0 to sub-cycle 1. Pre-swap LUT row 2210 also has LUT 2212. Before the swap, the planned configuration of LUT 2212 in sub-cycle 0 is different from the planned configuration of the same LUT 2212 in sub-cycle 1. Before the swap, LUT 2212 changes two of its bits from sub-cycle 0 to sub-cycle 1. Because LUT row 2210 uses common select lines (not shown) for both LUTs 2212 and 2214, the reconfiguration of LUT 2212 would necessitate changing the common select lines (in sub-cycle 1) of both LUTs 2212 and 2214. Similarly, in FIG. 23 pre-swap LUT row 2310 includes LUT 2314, which keeps the same configuration from sub-cycle 0 to sub-cycle 1. Pre-swap LUT row 2310 also has LUT 2312, which changes two configuration bits from sub-cycle 0 to sub-cycle 1. Because LUT row 2310 uses common select lines (not shown) for both LUT 2312 and LUT 2314, the reconfiguration of LUT 2312 would necessitate changing the common select lines (in sub-cycle 1) of both LUTs 2312 and 2314.

Once a pair of sub-cycles for a row is identified with mostly matching configurations (in operation 2110), the process 2100 identifies (at 2120) which configurable circuits in that row don't match (i.e., are planned to reconfigure from one sub-cycle to the next). For example, in FIG. 22, the process would identify LUT 2212 as not matching because it reconfigures from sub-cycle 0 to sub-cycle 1. In FIG. 23, the process would identify LUT 2312 as not matching because it reconfigures from sub-cycle 0 to sub-cycle 1.

Returning to FIG. 21, the process 2100 then swaps (at 2130) one of the configurations of the reconfiguring reconfigurable circuit (either in the earlier or later sub-cycle) with a matching configuration. That is, a configuration that matches the configuration of the reconfiguring reconfigurable circuit in the other sub-cycle. The matching configuration could be taken from another circuit in a different row (or the same row) and/or a different sub-cycle circuit. In some cases, there will be no available matching configurations to swap (e.g., no other such configurations were placed, any matching placed configurations cannot be moved for routing reasons or because moving them would break up an already matching pair of configurations, etc.). In such cases the process 2130 breaks out of the loop and returns to 2110 to identify another row (the loop breaking is not shown to avoid obscuring the other parts of the process). The layouts of some embodiments include two types of matching configurations, either of which are suitable as the second circuit in such a swap: 1) a configuration identical to the configuration that the first circuit has in the adjacent sub-cycle, or 2) an unused configuration. Examples of each type of matching configuration are provided in FIGS. 22 and 23, respectively.

In FIG. 22, the pre-swap configuration of LUT 2222 in sub-cycle 1 is identical to the pre-swap configuration of LUT 2212 in sub-cycle 0. Because it is the same configuration as the pre-swap LUT's 2212 configuration in sub-cycle 0, it is a matching configuration for pre-swap LUT's 2212 configuration. Therefore, swapping brings in an identical configuration. This is illustrated by LUT 2212 in post-swap row of LUTs 2230, which has identical configurations in sub-cycle 0 and sub-cycle 1. When the post-swap layout is implemented on a configurable IC, the configuration of LUT 2212 will not change from sub-cycle 0 to sub-cycle 1.

In FIG. 23, the pre-swap configuration of LUT 2322 in sub-cycle 1 is unused, as indicated by the "u" in place of the configuration. Because it is unused it is a matching configuration for pre-swap LUT 2312. After the swap, LUT 2312 in post-swap row of LUTs 2330 is unused. Therefore, when implementing the post-swap layout, LUT 2312 does not need to be reconfigured from sub-cycle 0 to sub-cycle 1. The process 2100 of some embodiments reserves the unused configuration so that it can't be swapped out by another row (which could ruin one match to make another). However, the process 2100 of some embodiments can swap an unused circuit for a used configuration that also matches the adjacent sub-cycle. That is, the process 2100 of some embodiments frees up the "don't care" configuration (e.g., to use it to make matches elsewhere) by replacing it with the actual configuration that it is standing in for. As part of the swap, the process 2100 of some embodiments defines the configuration of the unconfigured circuit to match the configuration of the same circuit in the adjacent sub-cycle. The effects of such "filling in" of unused configurations are described in relation to FIGS. 24 and 25.

FIGS. 24 and 25 illustrate filling in unused configurations with the configurations from adjacent sub-cycles. These figures show the effects of filling in at various stages of the process of implementing a user design. The figures show the configuration in the layout, the configuration values stored in the configuration cells during runtime, the configuration values presented to the reconfigurable circuit during multiple sub-cycles, and a timing diagram that shows which select line is active in each sub-cycle. FIG. 24 illustrates a possible gating of a reconfiguration signal without filling in unused configurations. FIG. 25 illustrates a possible gating of a reconfiguration signal with filling in unused configurations. FIG. 24 includes LUT row layout 2410, configuration cell table 2420, LUT configuration table 2430, and select line value timing diagram 2440. LUT row layout 2410 shows the configurations of a row of six LUTs in the layout in four sub-cycles in a four loopered system. Configuration cell table 2420 shows the configuration data stored in the configuration cells for four sub-cycles of the six reconfigurable LUTs during runtime. LUT configuration table 2430 shows the configurations of the six LUTs in each sub-cycle during runtime. Select line value timing diagram 2440 shows the values of the select lines that connect the configuration cells to the configurable circuit during runtime, where each select line corresponds to a particular sub-cycle. The sub-cycles are indicated here and in some other figures by the letters "SC" followed by a number identifying the particular sub-cycle (e.g., "SC0" represents sub-cycle 0).

Layout 2410 represents planned configurations of a row of LUTs in the layout, not data stored in actual configuration cells, and not the actual configurations of the LUTs in runtime. In FIG. 24, the unused configurations have not been filled in. The unused configurations are represented by "u". Each letter in the configurations other than "u" (e.g., "A", "B", and "C", etc.) represents a different configuration of a reconfigurable circuit (e.g., a LUT). The entire row of LUTs is unused during sub-cycle 2. Accordingly, when this layout is implemented, the row can be gated during sub-cycle 2.

Configuration cell table 2420 represents the configurations stored in the configuration cells for the row on the physical IC. The values stored in the configuration cells of the LUTs with unused configurations will be whatever the default values the process 2100 for that embodiment dictates (e.g., all zeros). When the IC of embodiments with reconfiguration signal gating implements a design with gated circuits, the configurations stored in the configuration cells for a given sub-cycle are not necessarily the configurations that will reach the configurable circuits during that sub-cycle. In FIG. 24, because the entire row of LUTs is unused in sub-cycle 2, the row will be gated in sub-cycle 2. The select line values will therefore remain the same through sub-cycle 1 and sub-cycle 2. As shown in timing diagram 2440, the select line for sub-cycle 2 (SEL2) is off over the entire cycle. As also shown in timing diagram 2440, the select line for sub-cycle 1 (SEL1) is on for both sub-cycle 1 and sub-cycle 2. Therefore, during both sub-cycle 1 and sub-cycle 2, the LUTs will be connected to the configuration cells that store the configuration intended to be used in sub-cycle 1.

The configurations that are actually applied to the configurable circuits are shown in LUT configuration table 2430. As a result of the unchanging select line, the actual configurations of the LUTs during sub-cycle 2 are the configurations stored in the configuration cells for sub-cycle 1, not the configurations (i.e., default configurations for unused LUTs) stored in the configuration cells for sub-cycle 2.

In FIG. 24, without filling in the unused configurations (shown as "u"), gating is not possible from sub-cycle 0 to sub-cycle 1, because in layout 2410, the third LUT in the row is planned to be in configuration D in sub-cycle 1 but unused in sub-cycle 0. Absent an operation to fill in the unused configurations, the configuration stored in the configuration cells for the third LUT for sub-cycle 0 will be the default unused configuration. Accordingly, the third LUT must be reconfigured from that default unused configuration in sub-cycle 0 to the configuration D in sub-cycle 1.

Gating is possible from sub-cycle 1 to sub-cycle 2 because the user design is unaffected by the configuration of the row in sub-cycle 2. Therefore, the configuration of sub-cycle 1 can continue into sub-cycle 2 without affecting the user design. The gating is shown in timing diagram 2440. In timing diagram 2440, the select line for sub-cycle 1 is shown as active through sub-cycle 1 and sub-cycle 2. The select line for sub-cycle 2 is never activated.

Because of the gating of the reconfiguration signal in sub-cycle 2, the set of configurations provided to the reconfigurable LUTs in sub-cycle 2 is the same as the set of configurations provided to the reconfigurable LUTs in sub-cycle 1. The configuration common to both sub-cycle 1 and sub-cycle 2 is conceptually represented in LUT configuration table 2430 by the configuration sets for the two sub-cycles being shown in a bounding box and with no space between the sub-cycles. This close connection visually emphasizes that the sub-cycles share a common select line and are provided by a common set of configuration cells. The closeness of the identical sub-cycles in the LUT configuration table 2430 does not indicate any change in the timing or length of the sub-cycles.

At the end of sub-cycle 2, the configurations of the LUTs, as shown in LUT configuration table 2430 are the configurations of sub-cycle 1, because the reconfiguration is gated in sub-cycle 2. Therefore, the determining factor in whether the reconfiguration signal can be gated in sub-cycle 3 is whether any configuration of a LUT in sub-cycle 3 conflicts with the configuration of the LUT in sub-cycle 1. Here, in the layout, the third LUT from the left has configuration F in sub-cycle 3 and has configuration D in sub-cycle 1. Because the reconfiguration is gated in sub-cycle 2, the third LUT from the left still has configuration D in sub-cycle 2 (as shown in LUT configuration table 2430). Configuration D is not the same as configuration F. Accordingly, at least one LUT (i.e., the third LUT from the left) needs to be reconfigured from sub-cycle 2 to sub-cycle 3, the transition from sub-cycle 2 to sub-cycle 3 (which switches select lines from sub-cycle 1 to sub-cycle 3) can't be skipped. Timing diagram 2440 shows that in sub-cycle 3, select line 3 is active. Similarly, the configurations of some LUTs in sub-cycle 0 do not match with the configurations of the LUTs in sub-cycle 3. Therefore, as the timing diagram 2440 shows, the active select line changes to select line 0 in sub-cycle 0. In FIG. 24 an empty sub-cycle for the row (sub-cycle 2) allows the reconfiguration to be gated in only one sub-cycle. However, the process 2100 of some embodiments increases the number of sub-cycles that can be gated by filling in the appropriate configurations.

In FIG. 25, the user design to be implemented is the same, but by filling in the unused configurations, an extra sub-cycle becomes gateable. FIG. 25 includes LUT row layout 2510, configuration cell table 2520, LUT configuration table 2530, and select line value timing diagram 2540. In the LUT row layout 2510, the LUTs that are actually used in implementing the user design (in a given sub-cycle) are defined with the same configuration as shown in layout 2410 of FIG. 25. Accordingly, the user design is unchanged. However, the unused LUTs from layout 2410 have been configured in layout 2510 in a way that reduces the number of configuration changes from one sub-cycle to the next (as compared to the number of configuration changes illustrated in FIG. 24.

As FIG. 25 shows, after filling in the blanks, every LUT in the layout 2510 has the same configuration in sub-cycle 0 and sub-cycle 1. In FIG. 24, the third LUT from the left needed to be reconfigured from default in sub-cycle 0 to configuration D in sub-cycle 1. Here, the placement process (or post placement process) recognizes that the third LUT from the left will need to have configuration D in sub-cycle 1 and is unused (configuration irrelevant) in sub-cycle 0. Because the third LUT from the left is unused in sub-cycle 0, the user design will not be affected if the LUT had configuration D in sub-cycle 0. The process therefore defines the LUT to have configuration D in sub-cycle 0 rather than wait until sub-cycle 1. Because no configuration for that row in the layout changes from sub-cycle 0 to sub-cycle 1, gating is possible from sub-cycle 0 to sub-cycle 1. Circumstances in which filling in from a particular sub-cycle will make a row match is a reason why (as mentioned with respect to FIG. 17) the placement and routing processes of some embodiments do not follow a simple rule like "fill in configurations from the preceding sub-cycle".

In the configuration cell table 2520, the configurations in sub-cycle 0 are the filled in configurations from the layout 2510. As timing diagram 2540 shows, in sub-cycle 0, sub-cycle 1, and sub-cycle 2, select line 0 is active. As LUT configuration table 2530 shows, the configurations are the same in sub-cycle 0, sub-cycle 1, and sub-cycle 2. The configurations of sub-cycles 0-2 are grouped together to emphasis they are identical, not to show a literal proximity. All configurations in LUT configuration table 2530 for LUTs that are used to implement the user design (i.e., all the LUTs that are not shown with a "u" in the layout 2510) are the same as the corresponding configurations designated in the layout 2510 (and layout 2410) to implement the user design. Similarly, the LUTs used in LUT configuration table 2530 of FIG. 25 to implement the user design have the same configurations as the corresponding LUTs in LUT configuration table 2430 in FIG. 24. Either set of configurations (in configuration table 2430 or configuration table 2530) would implement the same user design. Therefore filling in the unused configurations does not impair the ICs ability to perform the operations of the user design.

In some embodiments, the configuration cells that will not be activated when implementing a given layout are left in their default state rather than having configuration data stored in them. Therefore, configuration cell table 2520 in sub-cycle 1 shows that the configuration cells are unused. Because the configuration cells for sub-cycle 1 will not be connected to the reconfiguration circuit in any sub-cycle of the runtime of a gating IC with that layout, the configuration of those cells does not affect the user design. The placement and routing processes (or post processes) of some embodiments "knows" that the reconfiguration signal will be gated in sub-cycle 1 and therefore leaves the actual configuration cell values as their default values. In some other embodiments, the configuration cells do store configuration data even though they will not be activated.

As in FIG. 24, gating is possible from sub-cycle 1 to sub-cycle 2 because the configuration of the unused row in sub-cycle 2 does not affect the user design. As the timing diagram 2540 shows, the active select line changes from select line 0 to select line 3 in sub-cycle 3 because the configurations of sub-cycle 3 does not match the (held over) configuration of sub-cycle 0.

As described in section IV, the placement and routing processes of some embodiments fill in configurations that reduce configuration bit changes, even when doing so will not result in an opportunity to gate the reconfiguration signal. Accordingly, the process fills in the last two LUTs in the row as configuration F (as shown in layout 2510) because some energy is saved by not changing the configuration of a LUT, even if the select line changes. By setting the configuration of the last two LUTs to configuration F in sub-cycle 0, the last two LUTs have the same configurations for all four sub-cycles. Thus, the process eliminated the need for any change of the values of the configuration bits of those LUTs.

As mentioned above, the configuration cells of some embodiments do not actually store any configuration bits in for the reconfigurable LUTs for sub-cycle 1 or sub-cycle 2 as the select lines for those sub-cycles will not be activated. However, the configurations are shown in the layout 2510 as indicators of the configurations that the LUTs will have in those sub-cycles. Showing the filled in values in layout 2510 also demonstrates that even though the LUTs are unused in sub-cycle 2, they are not available for gating the transition from sub-cycle 2 to sub-cycle 3. An unused LUT configuration can be defined to match either the configuration of the sub-cycle before it, or the configuration of the sub-cycle after it, but not defined to match two different configurations. Similarly, for a LUT with some configuration bits used and others not used, each unused bit can be defined to match the bit from the configuration before it or the configuration after it, but not defined to match two different bit values.

While the ICs of some embodiments block reconfiguration for empty rows, some embodiments can also block reconfigurations for sub-cycles after an empty row. While FIG. 25 shows sub-cycles 1 and 2 as being gated, the unused row (empty row) in SC2 could be filled in to match SC3 instead of SC1. In that case, the row in SC2 would be defined with the configuration of the subsequent sub-cycle, SC3 (i.e., all Fs). In such a case, the unused configurations in sub-cycle 2 would have been defined to have configuration F. The select lines of sub-cycles 1 and 3 would be off for all sub-cycles. The select line of sub-cycle 0 would be on for sub-cycles 0 and 1; the select line of sub-cycle 2 would be on for sub-cycles 2 and 3. The process 2100 of some embodiments would match sub-cycle 2 with sub-cycle 3. The process 2100 of other embodiments would match sub-cycle 2 with sub-cycle 0 and sub-cycle 1. The process 2100 of still other embodiments would match sub-cycle 2 with either sub-cycles 0 and 1 or with sub-cycle 3, depending on the circumstances. The placement and routing processes of some embodiments fill in the unused configurations as the configurations are swapped (at 2310). However, the placement and routing process of some embodiments fill in the unused configurations after the rest of the process 2100 is performed, rather than as part of the swap (at 2130) itself.

After the swap (at 2130) and any filling in performed by the process 2100 the process 2100 reroutes (at 2140) any connections to the LUTs that have swapped configurations. In the layout being produced by the placement and routing process, swapping the configurations of the two LUTs is equivalent to switching the positions of two circuits in the user design. The inputs and outputs of the circuits in the layout move with the circuits. Therefore, to restore circuit connections broken by the move, the process 2100 of some embodiments reroutes the connections of the configurable routing circuits.

The process 2100 then determines (at 2150) whether the configurations of the entire row match in adjacent sub-cycles (i.e., the same configuration or at least one "don't care" in each of the adjacent sub-cycles). If the configurations of any reconfigurable circuit do not match in the two sub-cycles, then the process 2100 loops back to identify (at 2120) the next circuit that is reconfigured from one of the adjacent sub-cycles to the next. If the configurations are identical, then the process 2100 defines (at 2160) the SC gate bit for the row to block the sub-cycle clock from the select driver the later sub-cycle. Because the entire row of configurable circuits is unchanged from one sub-cycle to the next, the select line of the first sub-cycle will provide the same configuration as the select line of the second sub-cycle. Accordingly, setting the SC gate to block the sub-cycle clock saves energy by blocking an unnecessary reconfiguration. In some embodiments, the process 2100 also defines the static SC gate configuration to block the clock signal in operation 2160. As shown in FIG. 19A, when both the static SC gate and the SC gate 1940 are set to block the clock signal, the clock will be blocked in the sub-cycles indicated by the SC gate. The process 2100 of some embodiments sets the bit to "1" to indicate that the clock should be blocked. The process 2100 of embodiments sets the clock to a data value other than 1 to indicate that the clock should be blocked.

In FIG. 22, the configurations in sub-cycle 0 and sub-cycle 1 are identical for both LUTs 2212 and 2214 in post-swap row 2230. The whole row is unchanged from sub-cycle 0 to sub-cycle 1. Therefore the placement and routing process 2100 defines the SC gate bit to "block" for that row of LUTs in sub-cycle 1. In FIG. 23, LUT 2314 in post-swap row of LUTs 2330 has an identical configuration in sub-cycle 0 and sub-cycle 1. LUT 2312 has an identical configuration in sub-cycle 0 and sub-cycle 1 (active in sub-cycle 0 and unused in sub-cycle 1), and therefore it does not need to be reconfigured from sub-cycle 0 to sub-cycle 1. The process 2100 then determines (at 2170) whether more rows (or the same row in a different pair of sub-cycles) should be examined for potential elimination of reconfigurations (e.g., whether all rows/sub-cycles that could be emptied have been examined). If more rows/sub-cycles should be identified for emptying (i.e., potential elimination of reconfigurations), then the process 2100 loops back to operation 2110 and identifies a new row (and/or pair of sub-cycles) to examine. In some embodiments, the process identifies a row (in consecutive sub-cycles) with as many "don't care" or matching configurations as possible. If no more rows/sub-cycles should be examined, then the process 2100 ends.

The process 2100 is one example of a process that reduces the number of reconfigurations of a reconfigurable IC. The post-placement process of some other embodiments provides the same operations in different orders. The post-placement process of still other embodiments may provide additional operations.

The process 2100 of some embodiments tries to make two (or more) matches with one swap. For example, if the process needs a configuration "B" (in the layout) for a particular LUT to make a match with the same LUT in an adjacent sub-cycle. Before the swap the particular LUT has configuration "C" (in the layout) in one sub-cycle and configuration "B" in another sub-cycle. Rather than swapping out "C" with just any LUT with a configuration "B", the process tries to find a LUT with configuration "B" in one sub-cycle that is adjacent to a configuration "C" in another sub-cycle. Swapping "B" for "C"

thus makes a match for the first LUT (i.e., "B" and "B") and also makes a match for the second LUT (i.e., "C" and "C"). The process 2100 of some embodiments favors swaps that make one match and one close match (e.g., 6 bits out of 8 bits match). The process 2100 of some embodiments has multiple options for swapping a configuration "B", the process swaps with the configuration "B" in the row that is already the closest to completely matching. That is, the most favored swap in such embodiments is one in which the swap makes both swapped rows empty (i.e., all "don't care" or matching).

While the embodiments described above focused on gating that is controlled by the layout configuration, some embodiments allow a user design to determine whether to gate a select driver during a particular sub-cycle. The ICs of such embodiments support these additional operations. For example, a process 2100 of some embodiments that reduces the number of reconfigurations (empties rows) also determines whether the outputs of a particular row of circuits will be irrelevant (i.e., "don't care") in some instances of a given sub-cycle but not in other instances of that sub-cycle (e.g., some instances of sub-cycle 3, but not all instances of sub-cycle 3). In other words, the process determines whether a sub-cycle sometimes requires a particular configuration, but sometimes does not require any particular configuration. Such a process cedes control over the gating of the select driver (in those specific sub-cycles) to the user. The logic table 1980 of FIG. 19A illustrates this in its fifth and seventh rows. When the user design signal is 0 (i.e., in the fifth row) and the SC gate is 1, the select driver is not gated. When the user design signal is 1 (i.e., in the seventh row) and the SC gate is 1, the select driver is gated. The process of such embodiments defines an SC gate value for a sub-cycle (e.g., sub-cycle 3) to block the clock signal and define the static SC gate to not block the clock signal. Given the gating circuitry of FIG. 19A to the User SC gate, such a set of values would allow a user signal on the User SC gate to determine whether to block the clock signal. When the layout generated by such a process is implemented, the clock to the select driver in sub-cycles defined to be blocked by the SC gate would be blocked when the user design sets the User SC gate to block the clock signal, and not blocked when the user design sets the User SC gate to not block the clock signal.

The process 2100 of some embodiments makes rows into "don't cares" rather than attempting to match the same configurations. For example, individual select drivers of some embodiments drive both reconfigurable routing circuits (e.g., RMUXs) and reconfigurable logic circuits (e.g., LUTs). In such embodiments, using the same configuration for a LUT in two consecutive sub-cycles would not necessarily mean that an RMUX driven by the same select driver would use the same configuration in both sub-cycles. Accordingly, implementing the same configuration for a LUT in two consecutive sub-cycles could require that a corresponding RMUX reconfigure in the later sub-cycle. That is, the LUT could have the same configuration in adjacent sub-cycles, but the connections of the LUT to other circuits would change from one sub-cycle to the next. However, in some such embodiments, using a "don't care" configuration for the LUT would eliminate the need to reconfigure the RMUX. In which case, "don't care" configurations would allow a select driver to be gated, while matching configurations would not necessarily allow the select driver to be gated.

Accordingly, while many of the above described embodiments include processes that match configurations that are the same as well as configurations that are "don't care", one of ordinary skill in the art will understand that some embodiments do not prefer matching configurations. For example, the process 2100 of some embodiments moves configurations from almost unused rows to more fully used rows in order to create more "don't cares", but does not swap configurations with configurations from other configurable circuits to create more matching configurations.

Figure 26:
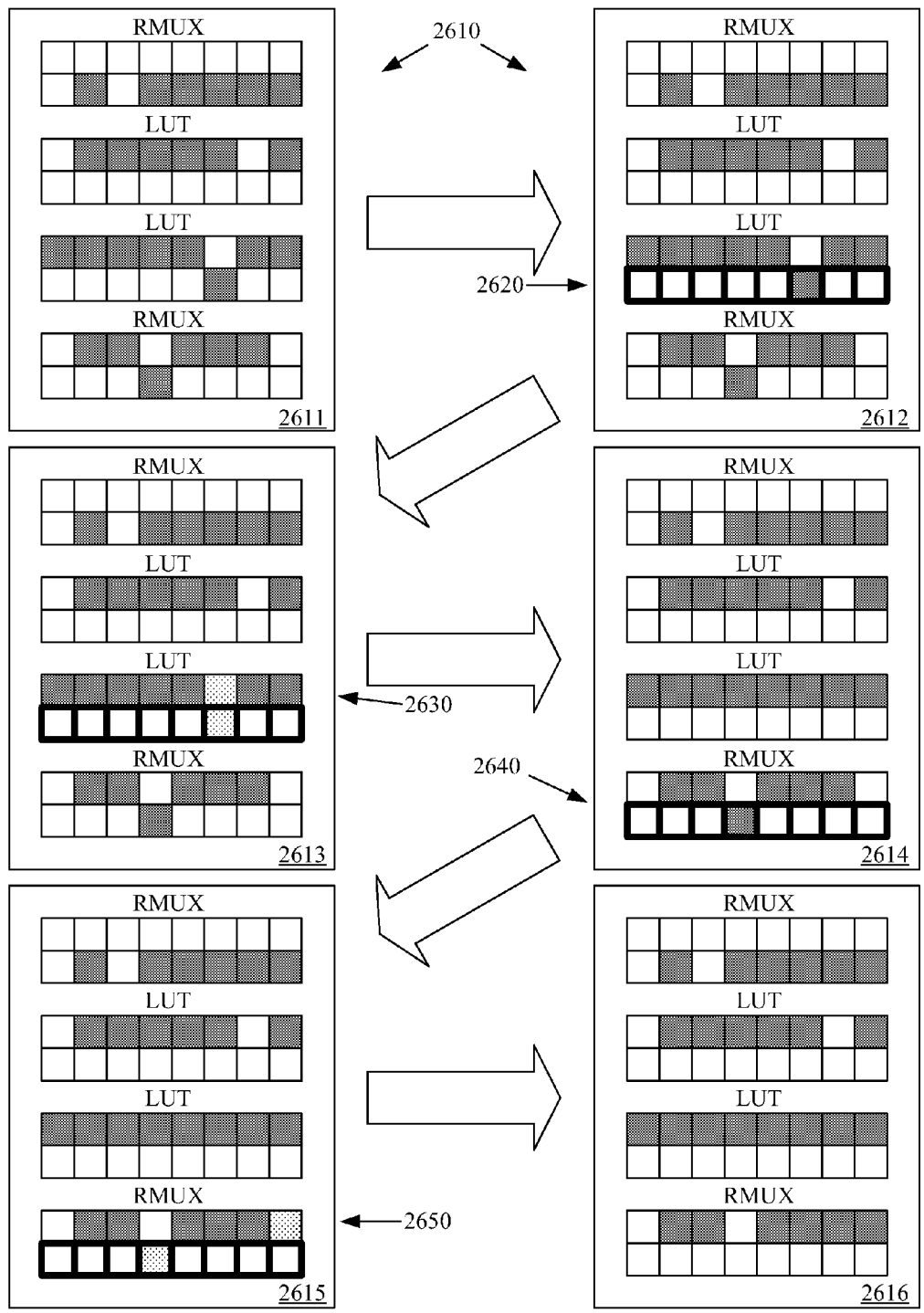
FIG. 26 conceptually illustrates moving configurations from almost empty rows to almost full rows.

FIG. 26 conceptually illustrates emptying rows of configurable circuits. The figure conceptually shows a tile layout 2610 at various stages of a post-placement and routing process. The figure includes a tile during various stages 2611-2616 of the post-placement and routing process, LUT rows 2620 and 2630, and RMUX rows 2640 and 2650. The tile layout 2610 conceptually represents the locations of various configurations on a tile of an IC whose layout is being edited by a post-placement and routing process. In stage 2611, the tile layout 2610 has been placed and routed. In stage 2612, the process identifies an almost empty LUT row 2620. In stage 2613, the process identifies an almost full LUT row 2630 and begins moving the configuration from LUT row 2620 to LUT row 2630. The movement of the configuration is represented by the lighter shading of the LUT in row 2620 and the lightly shaded LUT appearing in the previously blank space in row 2630. In stage 2614, the process identifies an almost empty RMUX row 2640. In stage 2615, the process moves the RMUX from the almost empty RMUX row to an almost full RMUX row 2650.

FIG. 26 conceptually illustrates the movement of configurations within the same sub-cycle and between different rows of the same tile. However, the processes of some embodiments also move configurations between rows on different tiles and between different sub-cycles.

FIG. 27 conceptually illustrates post-processing moving of configurations to different tiles and sub-cycles. The figure shows the effects of moving configurations from rows that are almost empty to rows that are almost full. Moving a configuration out of a row replaces a defined configuration in the row with a "don't care" configuration. Moving a configuration into a row replaces a "don't care" configuration with a defined configuration. The figure shows the layout of two particular rows of reconfigurable circuits of an IC during two different stages of a post-placement and routing process. The two stages of the layout are layout stage 2710, with LUT row layouts 2712 and 2714, and layout stage 2720, with LUT row layouts 2722 and 2724.

The process whose results are illustrated in FIG. 27 empties configurations from multiple sub-cycles of the rows of LUTs. Layout stage 2710 shows which LUTs are configured in the layouts 2712 and 2714 of two LUT rows before the configurations are emptied. Layout stage 2720 shows which LUTs are configured in the layouts 2722 and 2724 of the same two LUT rows after the configurations are emptied. LUT row layouts 2712, 2714, 2722, and 2724 show which LUTs in their respective rows have defined configurations and which LUTs do not have defined configurations. LUT row layouts 2712 and 2722 represent the same LUT rows (as each other) in different stages of the post-placement process. LUT row layouts 2714 and 2724 also represent the same LUT rows (as each other) in different stages of the post-placement process. The rows each contain six LUTs and have a loopered number of eight (i.e., eight sub-cycles of configurations for each of the six LUTs in the row). The defined configurations in LUT row layouts 2712, 2714, 2722, and 2724 are represented as grey squares. The "don't care" configurations are represented as white squares.

In FIG. 27, many defined configurations are moved from mostly empty rows to mostly full rows. In order to conceptually illustrate that specific configurations are moved to specific empty places in other rows, the starting and ending locations of each moved configuration are identified with letters. The letters marking the original location of the configurations to be moved are lower case letter. The letters marking the end location of the configurations after they are moved are upper case letters. The movement of configurations from the starting locations (lowercase letters) to the corresponding end locations results in multiple empty sub-cycles which can be gated to save energy.

The various original and final locations for the moved LUT configurations illustrate the versatility of the post-placement process of some embodiments. In the example shown in FIG. 27, LUT configuration "a" is moved to a different LUT row. In some embodiments, the process could place the configuration on other row that could be a different row on the same tile, a different row in the same group of 4 tiles, or a different row on a separate tile. As further examples in this figure, LUT configuration "g" is moved to a different sub-cycle on the same LUT row (sub-cycle 4 to sub-cycle 1). LUT configuration "k" is moved to a different sub-cycle on a different LUT row (sub-cycle 3 of LUT row layout 2714 to sub-cycle 7 of LUT row layout 2722).

LUT row layout 2712 has one entirely empty row. LUT row layout 2714 has no entirely empty rows. In an embodiment in which the IC can only gate empty rows, LUT row layout 2712 (when implemented on a reconfigurable IC with gating circuitry) can be gated once and LUT row layout 2714 can't be gated at all. After the post-placement and routing process, LUT row layout 2722 has two empty rows and can be gated twice; LUT row layout 2724 has six empty rows and can be gated six times.

In FIG. 27, LUT row layout 2712 and LUT row layout 2714 can conceptually represent layouts for reconfigurable circuits on the same tile, on a different tile within the same 4-tile set, or on a different 4-tile set. The illustrated example shows reconfigurable LUTs, but other types of configurable circuits can have their configurations set in the same way. In the ICs of some embodiments, each select line drives only one type of configurable circuit. In the IC of other embodiments, individual select lines drive multiple types of configurable circuits (e.g., the same row has LUTs and RMUXs).

Figure 28:
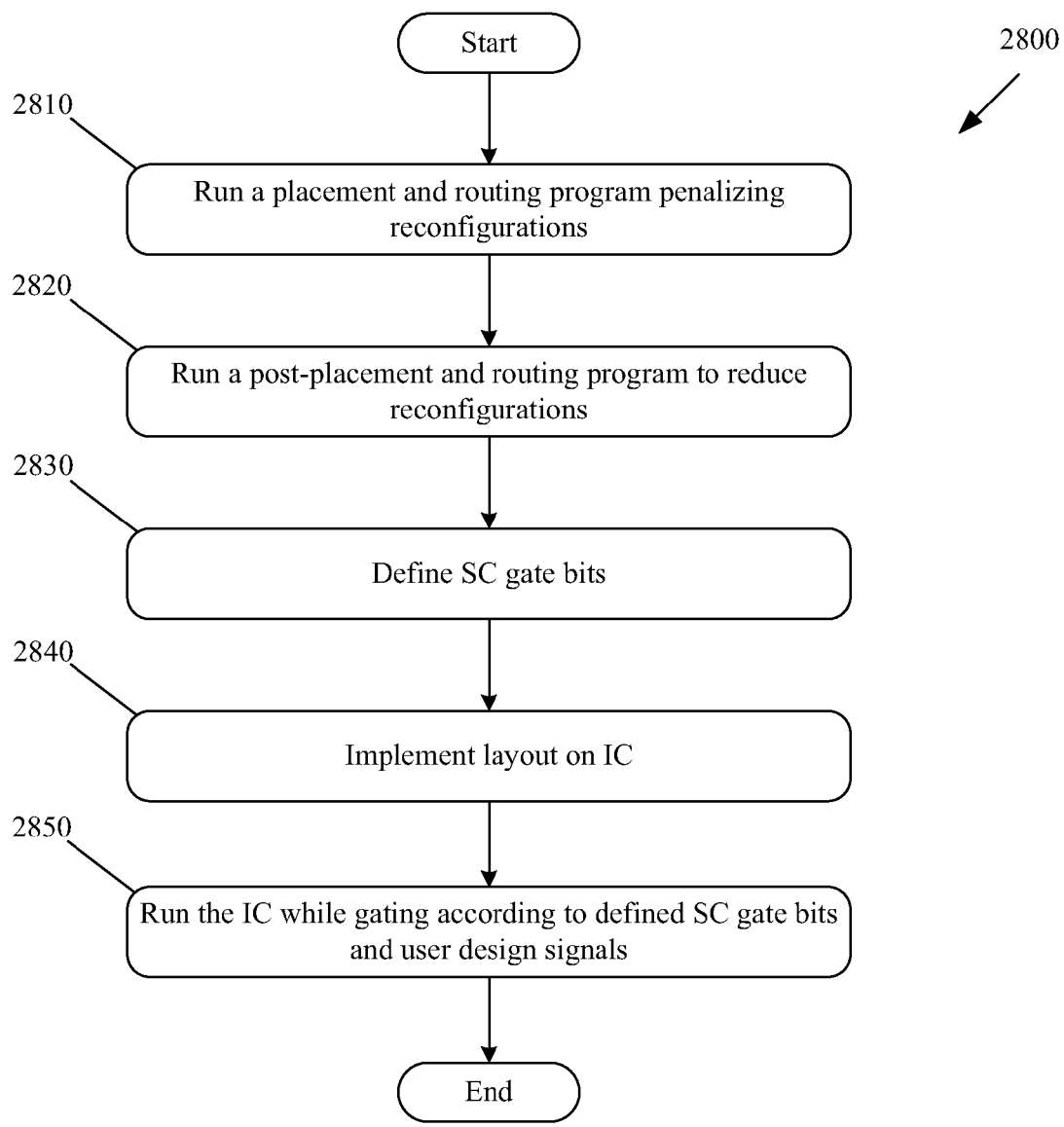
FIG. 28 conceptually illustrates a process that implements multiple features of the embodiments described herein.

FIG. 28 illustrates a process 2800 that implements multiple features of the embodiments described herein. The figure shows the process 2800 from initial placement and routing to operation of the IC. The processes of some embodiments include all the described operations shown in the figure. However, other embodiments do not include all the described operations of process 2800. The process 2800 begins when a user runs (at 2810) a placement and routing process for generating a layout by defining configurations of circuits of an FPGA. The placement and routing process of some embodiments automatically penalizes placements that call for reconfigurations and incentivizes placements that do not call for reconfigurations. The placement and routing processes of some embodiments account for individual bit-toggling. The placement and routing processes of some other embodiments account for reconfigurations of any circuit in a row. Finally, the placement and routing processes of some embodiments account for both bit toggling and reconfigurations of any circuit in a row. Some embodiments use a placement and routing process as shown in FIGS. 15-16.

The process 2800 continues when either the placement and routing processes or the user runs (at 2820) a post-placement and routing program. The post-placement and routing program tries to decrease the number of reconfigurations needed (for bits and/or circuit rows). The post-placement and routing program of some embodiments moves logical don't care configurations around to decrease the number of reconfigurations. The post-placement and routing program of some embodiments moves specific configurations among rows to match configurations in preceding or subsequent sub-cycles of the rows. The post-placement and routing program of still other embodiments moves both don't care configurations and specific configurations.

The process 2800 then defines (at 2830) the SC gate bits that identify which sub-cycles should be gated for each row (e.g., the bits used to configure SC gate 1940 in FIGS. 19A, 19B, and 20). The placement and routing process of some embodiments defines the SC gate bits. A post-placement and routing process of some embodiments defines the SC gate bits. In other embodiments, a process other than the placement and routing processes or post-placement and routing program define the SC gate bits.

The process 2800 then implements (at 2840) the layout on an IC. The layout of some embodiments includes the SC gate bits to identify which rows are gated in which cycle. The layouts are implemented by the IC architectures described above in some embodiments. For example, the ICs of some embodiments implement a layout using the reconfigurable IC architectures described in section III, above.

The IC then commences (at 2850) operation according to its layout. That is, the configuration bits generated for the layout by process 2800 are stored on the IC as configuration values in configuration cells of the IC. The IC gates the rows according to the defined SC gate bits and/or as commanded by user design signals. Sets of circuits such as those illustrated in FIGS. 19A and 19B gate the reconfigurations of the rows in some embodiments. The process 2800 then ends.

VII. Configurable IC and System

Some embodiments described above are implemented in configurable ICs that can compute configurable combinational digital logic functions on signals that are presented on the inputs of the configurable ICs. In some embodiments, such computations are state-less computations (i.e., do not depend on a previous state of a value). Some embodiments described above are implemented in configurable ICs that can perform a continuous function. In these embodiments, the configurable IC can receive a continuous function at its input, and in response, provide a continuous output at one of its outputs.

Figure 29:
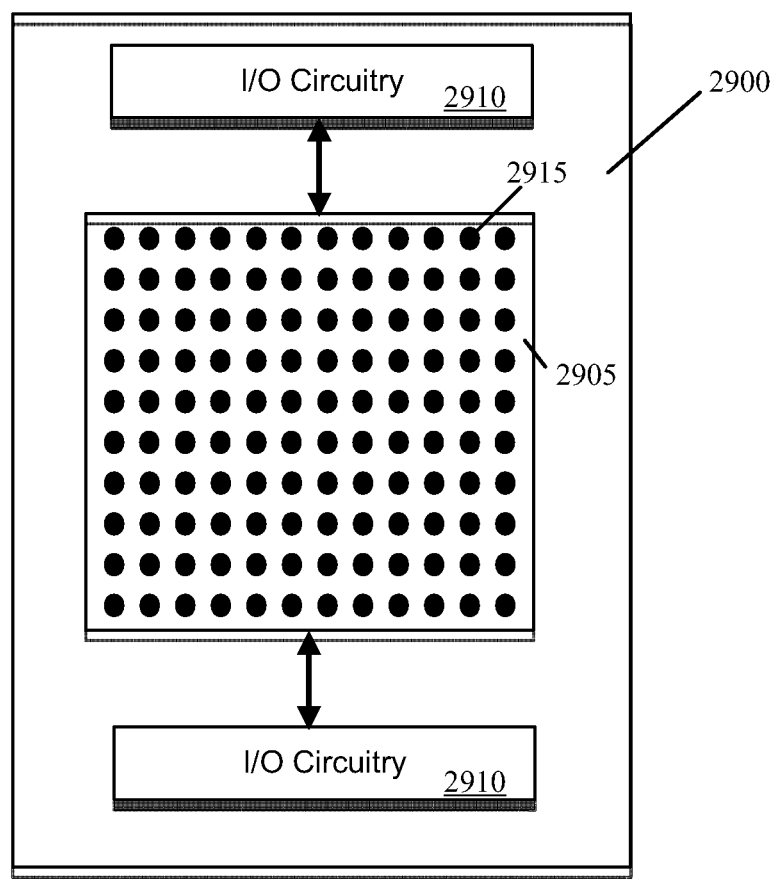
FIG. 29 illustrates a portion of a configurable IC of some embodiments of the invention.

FIG. 29 illustrates a portion of a configurable IC 2900 of some embodiments of the invention. As shown in this figure, this IC has a configurable circuit arrangement 2905 and I/O circuitry 2910. The configurable circuit arrangement 2905 can include any of the above described circuits, storage elements, and routing fabric of some embodiments of the invention. The I/O circuitry 2910 is responsible for routing data between the configurable nodes 2915 of the configurable circuit arrangement 2905 and circuits outside of this arrangement (i.e., circuits outside of the IC, or within the IC but outside of the configurable circuit arrangement 2905). As further described below, such data includes data that needs to be processed or passed along by the configurable nodes.

Figure 30:
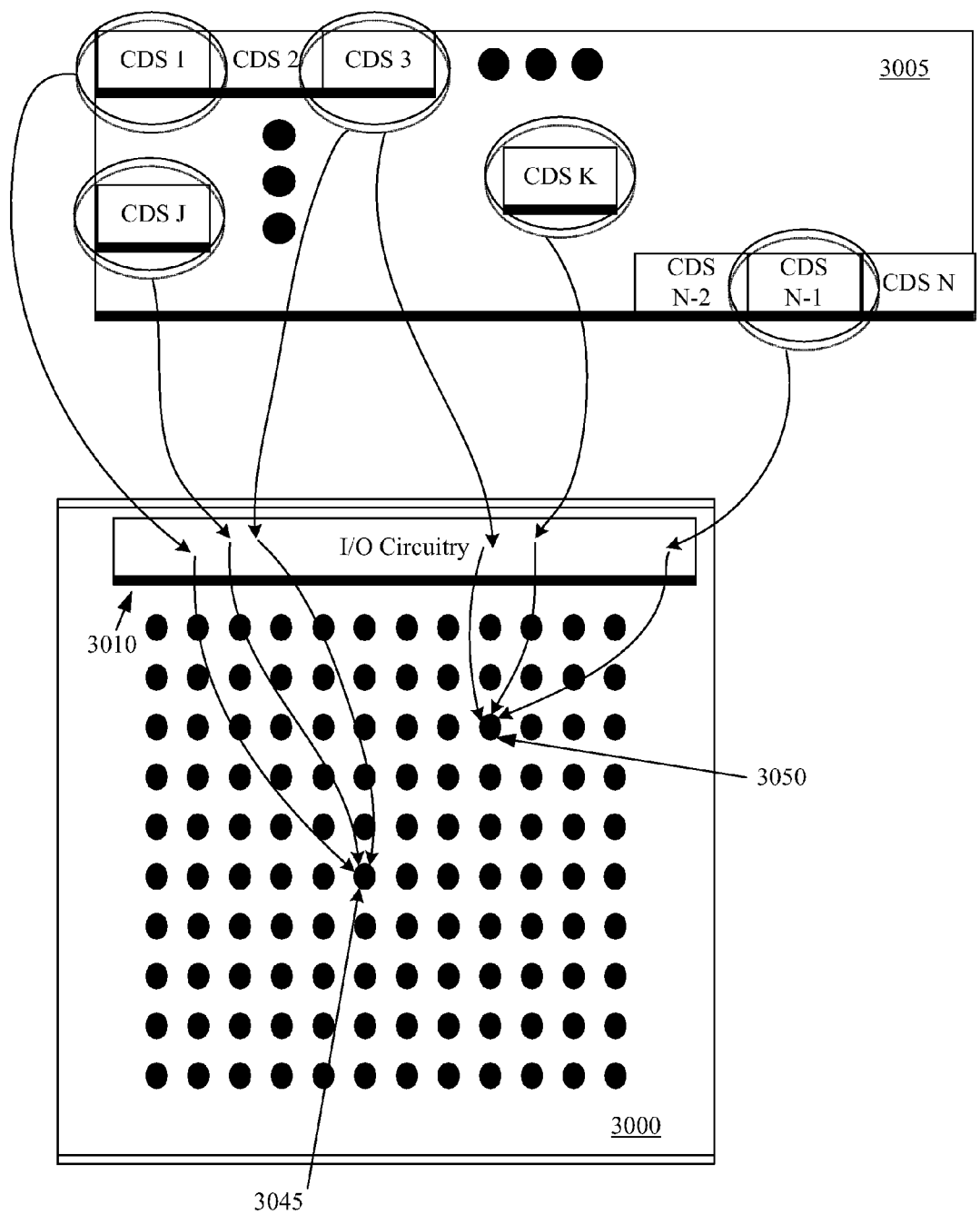
FIG. 30 illustrates configurable nodes receiving configuration data sets through I/O circuitry

The data also includes, in some embodiments, a set of configuration data that configures the nodes to perform particular operations. FIG. 30 illustrates a more detailed example of this. Specifically, this figure illustrates a configuration data pool 3005 for the configurable IC 3000. This pool includes N configuration data sets ("CDS"). As shown in FIG. 30, the input/output circuitry 3010 of the configurable IC 3000 routes different configuration data sets to different configurable nodes of the IC 3000. For instance, FIG. 30 illustrates configurable node 3045 receiving configuration data sets 1, 3, and J through the I/O circuitry, while configurable node 3050 receives configuration data sets 3, K, and N−1 through the I/O circuitry. In some embodiments, the configuration data sets are stored within each configurable node. Also, in some embodiments, a configurable node can store multiple configuration data sets for a configurable circuit within it so that this circuit can reconfigure quickly by changing to another configuration data set for a configurable circuit. In some embodiments, some configurable nodes store only one configuration data set, while other configurable nodes store multiple such data sets for a configurable circuit.

Figure 31:
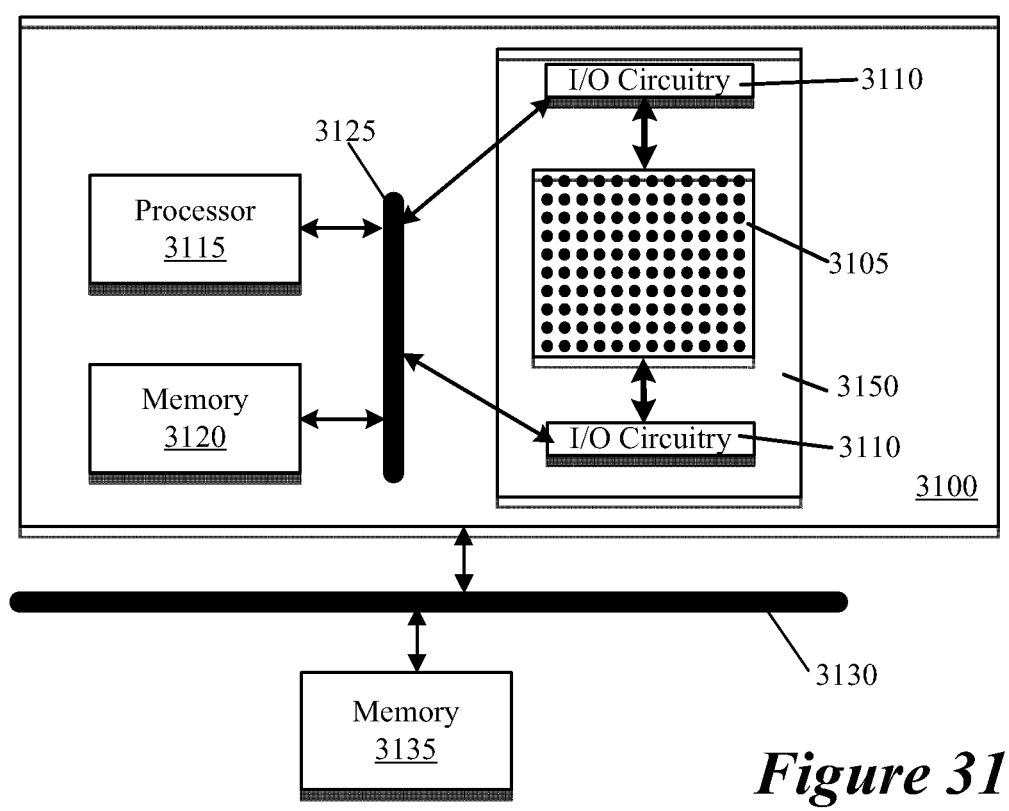
FIG. 31 illustrates a system on chip ("SoC") implementation of a configurable IC.

A configurable IC of the invention can also include circuits other than a configurable circuit arrangement and I/O circuitry. For instance, FIG. 31 illustrates a system on chip ("SoC") implementation of a configurable IC 3100. This IC has a configurable block 3150, which includes a configurable circuit arrangement 3105 and I/O circuitry 3110 for this arrangement. It also includes a processor 3115 outside of the configurable circuit arrangement, a memory 3120, and a bus 3125, which conceptually represents all conductive paths between the processor 3115, memory 3120, and the configurable block 3150. As shown in FIG. 31, the IC 3100 couples to a bus 3130, which communicatively couples the IC to other circuits, such as an off-chip memory 3135. Bus 3130 conceptually represents all conductive paths between the system components.

This processor 3115 can read and write instructions and/or data from an on-chip memory 3120 or an off-chip memory 3135. The processor 3115 can also communicate with the configurable block 3150 through memory 3120 and/or 3135 through buses 3125 and/or 3130. Similarly, the configurable block can retrieve data from and supply data to memories 3120 and 3135 through buses 3125 and 3130.

Figure 32:
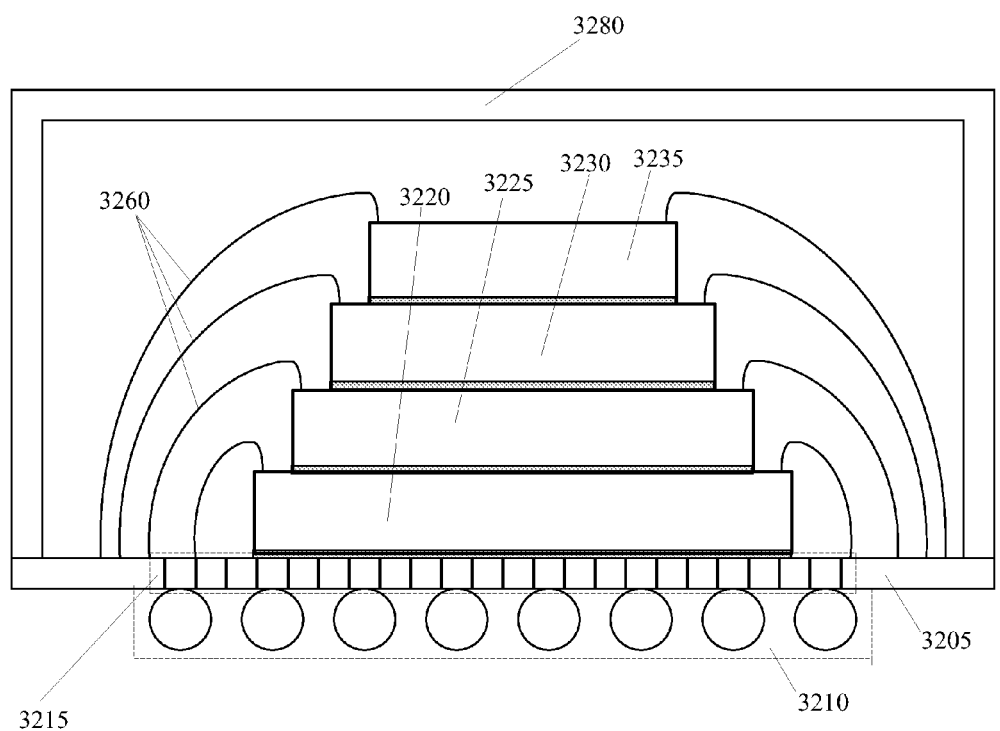
FIG. 32 illustrates a system in a package ("SiP").

Instead of, or in conjunction with, the system on chip ("SoC") implementation for a configurable IC, some embodiments might employ a system in package ("SiP") implementation for a configurable IC. FIG. 32 illustrates one such SiP 3200. As shown in this figure, SiP 3200 includes four ICs 3220, 3225, 3230, and 3235 that are stacked on top of each other on a substrate 3205. At least one of these ICs is a configurable IC that includes a configurable block, such as the configurable block 3150 of FIG. 31. Other ICs might be other circuits, such as processors, memory, etc.

As shown in FIG. 32, the IC communicatively connects to the substrate 3205 (e.g., through wire bondings 3260). These wire bondings allow the ICs 3220-3235 to communicate with each other without having to go outside of the SiP 3200. In some embodiments, the ICs 3220-3235 might be directly wire-bonded to each other in order to facilitate communication between these ICs. Instead of, or in conjunction with the wire bondings, some embodiments might use other mechanisms to communicatively couple the ICs 3220-3235 to each other.

As further shown in FIG. 32, the SiP includes a ball grid array ("BGA") 3210 and a set of vias 3215. The BGA 3210 is a set of solder balls that allows the SiP 3200 to be attached to a printed circuit board ("PCB"). Each via connects a solder ball in the BGA 3210 on the bottom of the substrate 3205, to a conductor on the top of the substrate 3205.

The conductors on the top of the substrate 3205 are electrically coupled to the ICs 3220-3235 through the wire bondings. Accordingly, the ICs 3220-3235 can send and receive signals to and from circuits outside of the SiP 3200 through the wire bondings, the conductors on the top of the substrate 3205, the set of vias 3215, and the BGA 3210. Instead of a BGA, other embodiments might employ other structures (e.g., a pin grid array) to connect a SiP to circuits outside of the SiP. As shown in FIG. 32, a housing 3280 encapsulates the substrate 3205, the BGA 3210, the set of vias 3215, the ICs 3220-3235, the wire bondings to form the SiP 3200. This and other SiP structures are further described in U.S. patent application Ser. No. 11/081,820, now issued as U.S. Pat. No. 7,530,044, entitled "Method for Manufacturing A Programmable System In Package", which is incorporated herein by reference.

Figure 33:
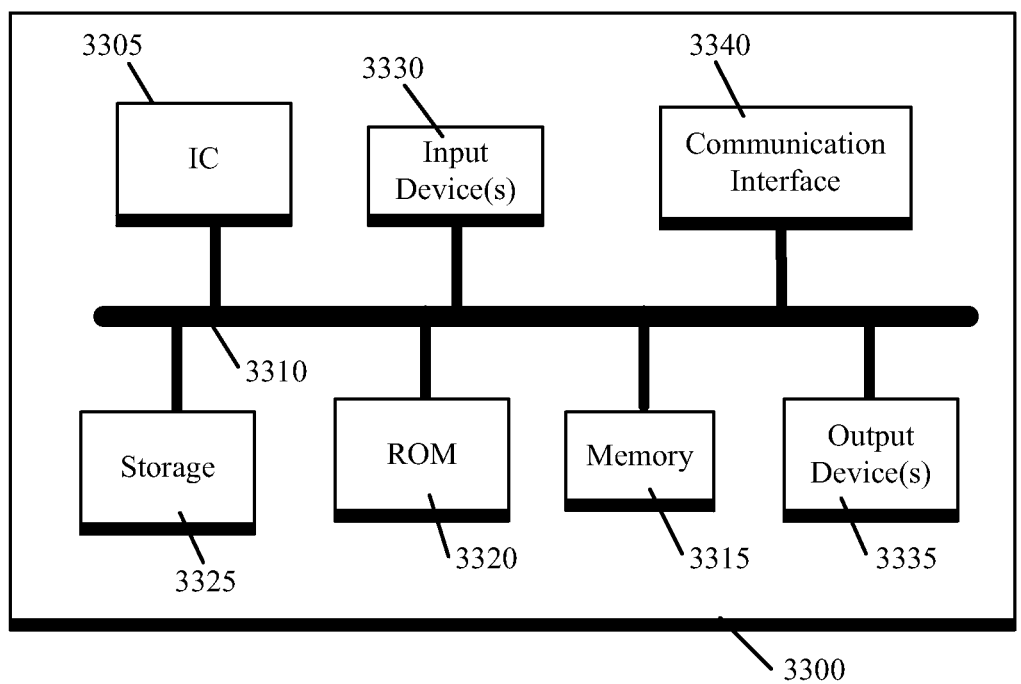
FIG. 33 conceptually illustrates an example of a computing system used for implementing the ICs of some embodiments.

FIG. 33 conceptually illustrates a more detailed example of a computing system 3300 that has an IC 3305, which includes a configurable circuit arrangement with configurable circuits, storage elements, and routing fabric of some embodiments of the invention that were described above. The system 3300 can be a stand-alone computing or communication device, or it can be part of another electronic device. As shown in FIG. 33, the system 3300 not only includes the IC 3305, but also includes a bus 3310, a system memory 3315, a read-only memory 3320, a storage device 3325, input device(s) 3330, output device(s) 3335, and communication interface 3340.

The bus 3310 collectively represents all system, peripheral, and chipset interconnects (including bus and non-bus interconnect structures) that communicatively connect the numerous internal devices of the system 3300. For instance, the bus 3310 communicatively connects the IC 3310 with the read-only memory 3320, the system memory 3315, and the permanent storage device 3325. The bus 3310 may be any of several types of bus structure including a memory bus or memory controller, a peripheral bus, and a local bus using any of a variety of conventional bus architectures. For instance, the bus 3310 architecture may include any of the following standard architectures: PCI, PCI-Express, VESA, AGP, Microchannel, ISA and EISA, to name a few.

From these various memory units, the IC 3305 receives data for processing and configuration data for configuring the ICs configurable logic and/or interconnect circuits. When the IC 3305 has a processor, the IC also retrieves from the various memory units instructions to execute. The read-only-memory (ROM) 3320 stores static data and instructions that are needed by the IC 3305 and other modules of the system 3300.

Some embodiments of the invention use a mass-storage device (such as a magnetic disk to read from or write to a removable disk or an optical disk for reading a CD-ROM disk or to read from or write to other optical media) as the permanent storage device 3325.

Other embodiments use a removable storage device (such as a flash memory card or memory stick) as the permanent storage device. The drives and their associated computer-readable media provide non-volatile storage of data, data structures, computer-executable instructions, etc. for the system 3300. Although the description of computer-readable media above refers to a hard disk, a removable magnetic disk, and a CD, it should be appreciated by those skilled in the art that other types of media which are readable by a computer, such as magnetic cassettes, digital video disks, and the like, may also be used in the exemplary operating environment.

Like the storage device 3325, the system memory 3315 is a read-and-write memory device. However, unlike storage device 3325, the system memory is a volatile read-and-write memory, such as a random access memory. Typically, system memory 3315 may be found in the form of random access memory (RAM) modules such as SDRAM, DDR, RDRAM, and DDR-2. The system memory stores some of the set of instructions and data that the processor needs at runtime.

The bus 3310 also connects to the input and output devices 3330 and 3335. The input devices enable the user to enter information into the system 3300. The input devices 3330 can include touch-sensitive screens, keys, buttons, keyboards, cursor-controllers, touch screen, joystick, scanner, microphone, etc. The output devices 3335 display the output of the system 3300. The output devices include printers and display devices, such as cathode ray tubes (CRT), liquid crystal displays (LCD), organic light emitting diodes (OLED), plasma, projection, etc.

Finally, as shown in FIG. 33, bus 3310 also couples system 3300 to other devices through a communication interface 3340. Examples of the communication interface include network adapters that connect to a network of computers, or wired or wireless transceivers for communicating with other devices. Through the communication interface 3340, the system 3300 can be a part of a network of computers (such as a local area network ("LAN"), a wide area network ("WAN"), or an Intranet) or a network of networks (such as the Internet). The communication interface 3340 may provide such connection using wireless techniques, including digital cellular telephone connection, Cellular Digital Packet Data (CDPD) connection, digital satellite data connection or the like.

While the invention has been described with reference to numerous specific details, one of ordinary skill in the art will recognize that the invention can be embodied in other specific forms without departing from the spirit of the invention. For example, many of the storage circuits can be used in ICs other than the ones described above, including ICs that do not include configurable circuits (e.g., pure ASICs, processors, etc.). Thus, one of ordinary skill in the art would understand that the invention is not to be limited by the foregoing illustrative details, but rather is to be defined by the appended claims.

What is claimed is:

1. An integrated circuit ("IC") comprising:
a group of reconfigurable circuits, each of the reconfigurable circuits for configurably performing a plurality of different operations in different reconfiguration cycles based on stored configuration data;
a select driver for selecting different sets of stored configuration data in different reconfiguration cycles for the group of reconfigurable circuits, wherein the select driver comprises a clock input for receiving clock signals, wherein the select driver selects a different set of stored configuration data in each reconfiguration cycle in which the select driver receives a clock signal; and
a gating circuit for selectively blocking a set of clock signals from reaching the clock input in a set of reconfiguration cycles controlled by configuration data of the gating circuit.

2. The IC of claim 1 further comprising a plurality of multiplexers (MUXs) for selectively providing the different sets of configuration data to the reconfigurable circuits.

3. The IC of claim 2, wherein at least one of the plurality of MUXs comprises a set of inputs that determine which of a plurality of stored configuration data values will be provided to the reconfigurable circuit.

4. The IC of claim 3, wherein the set of inputs are communicatively coupled to the select driver.

5. The IC of claim 2, wherein the MUXs are one-hot select MUXs.

6. The IC of claim 2, wherein the select driver selects different sets of stored configuration data by activating a selected set of inputs of the MUXs, wherein the inputs are communicatively coupled to a set of stored configuration data, wherein activating the selected set of inputs comprises communicatively coupling the set of inputs to a set of outputs of the MUXs.

7. The IC of claim 1, wherein the gating circuit comprises a set of configuration storage elements for storing configuration values that determine whether to block the clock signal, wherein each of the configuration values determines whether to block the clock signal in a particular reconfiguration cycle.

8. The IC of claim 1, wherein the select driver cyclically selects different sets of stored configuration data from among a sequence of sets of stored configuration data when receiving a plurality of clock signals, wherein selecting a different set of stored configuration data comprises switching from one stored configuration data set in the sequence to another stored configuration data set in the sequence.

9. The IC of claim 1, wherein the gating circuit comprises a set of logic circuits for imposing additional conditions on the blocking of the clock signal.

10. The IC of claim 9, wherein the additional conditions comprise a configuration value that determines whether to prevent the blocking in all reconfiguration cycles.

11. The IC of claim 1, wherein blocking the clock signal comprises preventing the clock signal from reaching the select driver, wherein preventing the clock signal from reaching the select driver prevents the select driver from selecting a different set of stored configuration data.

12. An integrated circuit ("IC") comprising: (i) a plurality of reconfigurable circuits, each of the reconfigurable circuits for configurably performing a plurality of different operations in different reconfiguration cycles; (ii) a plurality of select drivers, each select driver for reconfiguring a group of the reconfigurable circuits; and (iii) a plurality of gating circuits, each gating circuit associated with at least one of the select drivers, the gating circuit for selectively blocking the associated at least one select driver from reconfiguring the group of the reconfigurable circuits.

13. The IC of claim 12, wherein each of the select drivers comprises a set of select lines that determine which of a plurality of stored configurations are active in each of a plurality of reconfiguration cycles, wherein when the gating circuit blocks the associated select driver from reconfiguring the group, the select driver maintaining value on the set of select lines for at least two consecutive reconfiguration cycles.

14. The IC of claim 12 further comprising a plurality of reconfiguration cycle counters that each cyclically provides different signals that (i) determine which configuration of a gating circuit is active in each of a plurality of different reconfiguration cycles and (ii) determine which configuration the select driver selects in each of a plurality of reconfiguration cycles in which the select driver is not blocked from reconfiguring the group of reconfigurable circuits.

15. An electronic device comprising:
a memory device for storing configuration data; and
an integrated circuit ("IC") comprising:
a group of reconfigurable circuits, each of the reconfigurable circuits for configurably performing a plurality of different operations in different reconfiguration cycles based on the stored configuration data;
a select driver for selecting different sets of stored configuration data in different reconfiguration cycles for the group of reconfigurable circuits, wherein the select driver comprises a clock input for receiving clock signals, wherein the select driver selects a different set of stored configuration data in each reconfiguration cycle in which the select driver receives a clock signal; and
a gating circuit for selectively blocking a set of clock signals from reaching the clock input in a set of reconfiguration cycles controlled by configuration data of the gating circuit.

16. The electronic device of claim 15 further comprising a plurality of multiplexers (MUXs) for selectively providing different sets of configuration data to the reconfigurable circuits, wherein at least one of the plurality of MUXs comprises a set of inputs that determine which of a plurality of stored configuration data values will be provided to the reconfigurable circuit, wherein the set of inputs are communicatively coupled to the select driver.

17. The electronic device of claim 16, wherein the MUXs are one-hot select MUXs.

18. The electronic device of claim 16, wherein the select driver selects different sets of stored configuration data by activating a selected set of inputs of the MUXs, wherein the inputs are communicatively coupled to a set of stored configuration data, wherein activating the selected set of inputs comprise communicatively coupling the set of inputs to a set of outputs of the MUXs.

19. The electronic device of claim 15, wherein the gating circuit comprises a set of configuration storage elements for storing configuration values that determine whether to block the clock signal, wherein each of the configuration values determine whether to block the clock signal in a particular reconfiguration cycle.

20. The electronic device of claim 15, wherein the select driver cyclically selects different sets of stored configuration data from among a sequence of sets of stored configuration data when receiving a plurality of clock signals, wherein selecting a different set of stored configuration data comprises switching from one stored configuration data set in the sequence to another stored configuration data set in the sequence.

21. The electronic device of claim 15, wherein the gating circuit comprises a set of logic circuits for imposing additional conditions on the blocking of the clock signal, wherein the additional conditions comprise a configuration value that determines whether to prevent the blocking in all reconfiguration cycles.

22. The electronic device of claim 15, wherein blocking the clock signal comprises preventing the clock signal from reaching the select driver, wherein preventing the clock signal from reaching the select driver prevents the select driver from selecting a different set of stored configuration data.

23. An electronic device comprising:
a memory device for storing configuration data; and
an integrated circuit ("IC") comprising:
a plurality of reconfigurable circuits, each of the reconfigurable circuits for configurably performing a plurality of different operations in different reconfiguration cycles based on the stored configuration data;
a plurality of select drivers, each select driver for reconfiguring a group of the reconfigurable circuits; and
a plurality of gating circuits, each gating circuit associated with at least one of the select drivers, the gating circuit for selectively blocking the associated at least one select driver from reconfiguring the group of the reconfigurable circuits.

24. The electronic device of claim 23, wherein each of the select drivers comprises a set of select lines that determine which of a plurality of stored configurations are active in each of a plurality of reconfiguration cycles, wherein when the gating circuit blocks the associated select driver from reconfiguring the group, the select driver maintaining a value on the set of select lines for at least two consecutive reconfiguration cycles.

25. The electronic device of claim 23 further comprising a plurality of reconfiguration cycle counters that each cyclically provides different signals that (i) determine which configuration of a gating circuit is active in each of a plurality of different reconfiguration cycles and (ii) determine which configuration the select driver selects in each of a plurality of reconfiguration cycles in which the select driver is not blocked from reconfiguring the group of reconfigurable circuits.

* * * * *